United States Patent
Cohen et al.

(10) Patent No.: US 9,239,777 B1
(45) Date of Patent: *Jan. 19, 2016

(54) GENERATING TEST SCENARIO TEMPLATES FROM CLUSTERS OF TEST STEPS UTILIZED BY DIFFERENT ORGANIZATIONS

(71) Applicant: Panaya Ltd., Raanana (IL)

(72) Inventors: Yossi Cohen, Raanana (IL); Mati Cohen, Raanana (IL); Nurit Dor, Raanana (IL); Dror Weiss, Raanana (IL)

(73) Assignee: Panaya Ltd., Raanana (IL)

( * ) Notice: Subject to any disclaimer, the term of this patent is extended or adjusted under 35 U.S.C. 154(b) by 49 days.

This patent is subject to a terminal disclaimer.

(21) Appl. No.: 14/141,655

(22) Filed: Dec. 27, 2013

Related U.S. Application Data

(63) Continuation-in-part of application No. 13/103,078, filed on May 8, 2011, now Pat. No. 8,739,128.

(60) Provisional application No. 61/747,313, filed on Dec. 30, 2012, provisional application No. 61/814,305, filed on Apr. 21, 2013, provisional application No. 61/919,773, filed on Dec. 22, 2013.

(51) Int. Cl.
  *G06F 9/44* (2006.01)
  *G06F 13/10* (2006.01)
  *G06F 13/12* (2006.01)
  (Continued)

(52) U.S. Cl.
  CPC .................. *G06F 11/3684* (2013.01)

(58) Field of Classification Search
  CPC ............ G06F 11/3604; G06F 11/3684; G06F 11/3688; G06F 11/0793; G06F 11/3419; G06F 11/3433; G06F 8/10; G06F 8/30; G06F 9/4443; G06F 11/368; G06F 11/3692; G06F 11/3664; G06F 11/3672; G06F 11/3696
  See application file for complete search history.

(56) References Cited

U.S. PATENT DOCUMENTS 5,542,043 A * 7/1996 Cohen ................. G06F 11/3684
                                                                  714/739
5,629,878 A    5/1997 Kobrosly
(Continued)

OTHER PUBLICATIONS

Sara Sprenkle et al., An Empirical Comparison of Test Suite Reduction Techniques for User-session-based Testing of Web Applications, IEEE 2005, [Retrieved on Nov. 6, 2014]. Retrieved from the internet: <URL: http://ieeexplore.ieee.org/xpls/abs_all.jsp?arnumber=1510153&tag=1> 10 Pages (1-10).*

(Continued)

*Primary Examiner* — Don Wong
*Assistant Examiner* — Anibal Rivera
(74) *Attorney, Agent, or Firm* — Active Knowledge Ltd.

(57) ABSTRACT

System, method, and non-transitory medium for generating a test scenario template from a cluster of similar partial runs of test scenarios involves executing the following: identifying runs of test scenarios run by users on software systems that belong to different organizations; generating partial runs of the test scenarios by extracting from each run of a test scenario data pertaining to a proper subset of the plurality of test steps described in the run; clustering the partial runs of the test scenarios into clusters of similar partial runs; receiving a profile of a user; selecting, based on the profile, from among the clusters a certain cluster suitable for the user; and generating a test scenario template based on partial runs belonging to the certain cluster.

20 Claims, 17 Drawing Sheets

(51) Int. Cl.
*G06F 11/00* (2006.01)
*G06F 9/455* (2006.01)
*G06F 17/50* (2006.01)
*G06F 9/45* (2006.01)
*G06F 11/36* (2006.01)

(56) References Cited

U.S. PATENT DOCUMENTS

| | | | |
|---|---|---|---|
| 6,360,332 B1 | 3/2002 | Weinberg et al. | |
| 6,810,494 B2 * | 10/2004 | Weinberg | G06F 11/3688 714/32 |
| 6,865,692 B2 | 3/2005 | Friedman et al. | |
| 6,898,784 B1 | 5/2005 | Kossatchev et al. | |
| 7,032,212 B2 | 4/2006 | Amir et al. | |
| 7,395,170 B2 * | 7/2008 | Scott | G01R 31/31707 714/721 |
| 7,581,212 B2 | 8/2009 | West et al. | |
| 7,644,398 B2 * | 1/2010 | Cleaveland | G06F 11/3684 717/135 |
| 7,809,525 B2 | 10/2010 | Chagoly et al. | |
| 7,849,447 B1 | 12/2010 | Karis et al. | |
| 8,000,928 B2 * | 8/2011 | Scott | G01R 31/31707 714/721 |
| 8,266,592 B2 | 9/2012 | Beto et al. | |
| 2001/0020293 A1 * | 9/2001 | Uchihira | G06F 8/30 717/128 |
| 2005/0144593 A1 * | 6/2005 | Raghuvir | G06F 11/3688 717/124 |
| 2005/0166094 A1 * | 7/2005 | Blackwell | G06F 11/3664 714/38.14 |
| 2005/0204201 A1 * | 9/2005 | Meenakshisundaram | G06F 11/3664 714/38.1 |
| 2008/0086348 A1 | 4/2008 | Rao et al. | |
| 2008/0172652 A1 * | 7/2008 | Davia | G06F 11/3684 717/124 |
| 2008/0184206 A1 * | 7/2008 | Vikutan | G06F 11/3688 717/127 |
| 2008/0184219 A1 * | 7/2008 | Matsumoto | G06F 11/1433 717/170 |
| 2008/0255822 A1 * | 10/2008 | Adir | G06F 8/30 703/21 |
| 2009/0070746 A1 * | 3/2009 | Dhurjati | G06F 11/3676 717/128 |
| 2009/0106262 A1 | 4/2009 | Fallen et al. | |
| 2009/0144698 A1 * | 6/2009 | Fanning | G06F 8/75 717/120 |
| 2009/0183143 A1 | 7/2009 | Li et al. | |
| 2009/0300585 A1 * | 12/2009 | Meenakshisundaram | G06F 11/3664 717/124 |
| 2009/0313590 A1 * | 12/2009 | Emek | G06F 17/5022 716/106 |
| 2010/0192220 A1 | 7/2010 | Heizmann et al. | |
| 2010/0287534 A1 * | 11/2010 | Vangala | G06F 11/3612 717/124 |
| 2011/0173591 A1 * | 7/2011 | Prasad | G06F 8/10 717/126 |
| 2011/0321013 A1 * | 12/2011 | Raunstien | G06F 11/36 717/125 |
| 2013/0047141 A1 * | 2/2013 | Shann | G06F 8/30 717/128 |
| 2013/0111267 A1 * | 5/2013 | Beryoza | G06F 11/3688 714/32 |
| 2013/0152047 A1 * | 6/2013 | Moorthi | G06F 11/368 717/124 |
| 2014/0258989 A1 * | 9/2014 | Moon | G06F 11/3688 717/127 |

OTHER PUBLICATIONS

Sreedevi Sampath, A Scalable Approach to User-session based Testing of Web Applications through Concept Analysis, 2004.

Jinhua Li, Clustering User Session Data for Web Applications Test, 2011, Journal of Computational Information Systems.

G. Ruffo, R. Schifanella, and M. Sereno, WALTy: A User Behavior Tailored Tool for Evaluating Web Application Performance, 2004, Proceedings of the Third IEEE International Symposium on Network Computing and Applications.

Sanaa Alsmadi, Generation of Test Cases From Websites User Sessions, 2011, The 5th International Conference on Information Technology.

David Leon, A Comparison of Coverage-Based and Distribution-Based Techniques for Filtering and Prioritizing Test Cases.

* cited by examiner

US 9,239,777 B1

GENERATING TEST SCENARIO TEMPLATES FROM CLUSTERS OF TEST STEPS UTILIZED BY DIFFERENT ORGANIZATIONS

CROSS-REFERENCE TO RELATED APPLICATIONS

This Application is a Continuation-In-Part of application Ser. No. 13/103,078, filed May 8, 2011. This Application claims the benefit of U.S. Provisional Patent Application No. 61/747,313, filed Dec. 30, 2012, and U.S. Provisional Patent Application No. 61/814,305, filed Apr. 21, 2013. This application also claims the benefit of U.S. Provisional Patent Application No. 61/919,773, filed Dec. 22, 2013, the entire contents of which is herein incorporated by reference in its entirety for all that it teaches without exclusion of any part thereof.

The following co-pending U.S. Patent Applications, filed on Dec. 27, 2013: Ser. No. 14/141,514; Ser. No. 14/141,564; Ser. No. 14/141,623; Ser. No. 14/141,676; Ser. No. 14/141,726; Ser. No. 14/141,974, and the following co-pending U.S. PATENT APPLICATIONS, filed on Dec. 28, 2013: Ser. No. 14/142,768; Ser. No. 14/142,769; Ser. No. 14/142,770; Ser. No. 14/142,772; Ser. No. 14/142,774; Ser. No. 14/142,781; Ser. No. 14/142,783; may include related subject matter. The following U.S. Patents, filed on Dec. 27, 2013: U.S. Pat. No. 9,104,811; U.S. Pat. No. 9,104,815; U.S. Pat. No. 9,069,904; U.S. Pat. No. 9,092,579, and the following U.S. Patents, filed on Dec. 28, 2013: U.S. Pat. No. 9,134,961; U.S. Pat. No. 9,032,360 may include related subject matter.

BACKGROUND

Testing is an important part of the lifecycle of software. Software systems belonging to organizations require frequent testing to be performed in order to validate the systems' performance. This is especially true when new software modules are installed and/or when software modules undergo changes such as when they are updated or customized.

Software systems belonging to different organizations are typically configured differently because each organization has specific business processes it utilizes. Although the business processes may not be the same, they are made of similar building blocks (e.g., similar transactions may be used by different organizations). Thus, despite organization-specific differences in software systems of different organizations, it is often the case that testers belonging to the different organizations end up running the same, or quite similar, tests on their respective systems.

Despite the fact that different organizations often end up utilizing similar tests, it is often the case that each organization develops its own testing suite. Thus, knowledge such as best practices, and/or known system vulnerabilities, need to be rediscovered by each organization. The cumulative testing experience that may be aggregated from different organizations, the (testing) crowd wisdom, so to say, is simply not shared. However, even if organizations were to share their testing data, it still may be problematic to select and/or generate appropriate tests from the large body of testing data that may be available. Given that there may be many different tests for many software modules, it is often far from trivial to be able to effectively leverage testing data collected from different organizations for a certain user or a certain organization.

BRIEF SUMMARY

Some aspects of this disclosure involve methods, systems, and/or non-transitory computer-readable medium, which enable generation and/or suggestion of test scenario templates that are relevant to validating a software system. The templates may be generated based on data collected from crowd users (e.g., testers from other organizations), tasked with testing similar software systems. Optionally, utilization of templates enables organizations to leverage the wisdom of the testing crowd, by facilitating the import and export of testing data between organizations.

In one embodiment, a test scenario template is a model according to which a test scenario may be structured. A test scenario template may include one or more test steps, which instruct a user on an action to be performed as part of the test, such as where to enter a value, what button to push, what screen to select, or what transaction to run. Optionally, a test scenario template may include one or more default values used for running an instantiation of the test scenario template (e.g., default values for certain fields in a screen).

One aspect of this disclosure involves identifying subsets of test steps in runs of test scenarios and generating partial runs of test scenarios that contain data pertaining to the subsets of test steps. In some embodiments, the partial runs are clustered into clusters of similar partial runs. This may enable utilization of data from different organizations to generate test scenario templates for the certain organization. Thus, though the different organizations may not necessarily utilize systems that are very similar to systems of the certain organization, the fact that the different organizations use similar building blocks to the ones used by the certain organization (e.g., similar transactions), means that portions of tests may be utilized across the organizations.

Another aspect of this disclosure involves selecting a certain cluster containing similar partial runs based on a profile of a user. The certain cluster that is selected is found to be suitable to the user based on the profile of the user. For example, the profile may indicate certain test steps that are relevant to the user, and partial runs belonging to the certain cluster involve at least some of the certain test steps.

One aspect of this disclosure involves a computer system that is configured to generate a test scenario template from a cluster of similar partial runs of test scenarios. The computer system includes a test identifier that is configured to identify runs of test scenarios run by users on software systems that belong to different organizations; each run of a test scenario describes a plurality of test steps. Additionally, the computer system includes a subset extractor that is configured to: receive a run of a test scenario and to generate from the received run a partial run of the test scenario by extracting from the received run data pertaining to a proper subset of the plurality of test steps described in the received run. The computer system also includes a clustering module, cluster selector, and template generator. The clustering module is configured receive partial runs of test scenarios generated from the runs of the test scenarios and to cluster the partial runs into clusters of similar partial runs. The cluster selector is configured to receive a profile of a user and, based on the profile, to select from the clusters a certain cluster suitable for the user. The certain cluster includes a first partial run of a first test scenario that is associated with a first organization belonging to the different organizations, and a second partial run of a second test scenario that is associated with a second organization belonging to the different organizations. The template generator is configured to generate a test scenario template based on the first and second partial runs.

In one embodiment, the computer system optionally includes a monitoring module that is configured to monitor activity of the users on software systems belonging to the different organizations and to provide data obtained from monitoring the activity of the users to the test identifier. In another embodiment, the computer system optionally includes a data cleaner that is configured to remove from the test scenario template proprietary data associated with at least one of the first organization and the second organization. In yet another embodiment, the computer system optionally includes a user interface that is configured to suggest to the user to run an instantiation of the test scenario template.

Another aspect of this disclosure involves a computer implemented method for generating a test scenario template from a cluster of similar partial runs of test scenarios. Executing the method may involve performing the following: Identifying runs of test scenarios run by users on software systems that belong to different organizations. Each run of a test scenario describes a plurality of test steps. Generating partial runs of the test scenarios by extracting from each run of a test scenario data pertaining to a proper subset of the plurality of test steps described in the run. Clustering the partial runs of the test scenarios into clusters of similar partial runs. Receiving a profile of a user. Selecting, based on the profile, from among the clusters a certain cluster suitable for the user. The certain cluster includes a first partial run of a first test scenario that is associated with a first organization belonging to the different organizations, and a second partial run of a second test scenario that is associated with a second organization belonging to the different organizations. And generating a test scenario template based on the first and second partial runs.

In one embodiment, executing the method may optionally involve monitoring activity of the users on software systems belonging to the different organizations and providing data obtained from the monitoring to be used in the identifying of the runs of the test scenarios. Additionally or alternatively, executing the method may optionally involve suggesting to the user to run an instantiation of the test scenario template. In another embodiment, executing the method may optionally involve removing proprietary data associated with at least one of the different organizations from at least one of the partial runs of test scenarios. Additionally or alternatively, executing the method may optionally involve customizing the test scenario template for the user by adding to the test scenario template proprietary data relevant to the user.

Another aspect of this disclosure involves a non-transitory computer-readable medium for use in a computer to generate a test scenario template from a cluster of similar partial runs of test scenarios. The computer includes a processor, and the non-transitory computer-readable medium includes the following program code: Program code for identifying runs of test scenarios run by users on software systems that belong to different organizations; each run of a test scenario describes a plurality of test steps. Program code for generating partial runs of the test scenarios by extracting from each run of a test scenario data pertaining to a proper subset of the plurality of test steps described in the run. Program code for clustering the partial runs of the test scenarios into clusters of similar partial runs. Program code for receiving a profile of a user. Program code for selecting, based on the profile, from among the clusters a certain cluster suitable for the user. The certain cluster includes a first partial run of a first test scenario that is associated with a first organization belonging to the different organizations, and a second partial run of a second test scenario that is associated with a second organization belonging to the different organizations. And program code for generating a test scenario template based on the first and second partial runs.

In one embodiment, the non-transitory computer-readable medium optionally stores program code for monitoring activity of the users on software systems belonging to the different organizations and providing data obtained from the monitoring to be used in the identifying of the runs of the test scenarios. In one embodiment, the non-transitory computer-readable medium optionally stores program code for suggesting to the user to run an instantiation of the test scenario template. In one embodiment, the non-transitory computer-readable medium optionally stores program code for removing proprietary data associated with at least one of the different organizations from at least one of the runs of test scenarios.

BRIEF DESCRIPTION OF THE DRAWINGS

The embodiments are herein described, by way of example only, with reference to the accompanying drawings. In the drawings.

DETAILED DESCRIPTION

Figure 1:
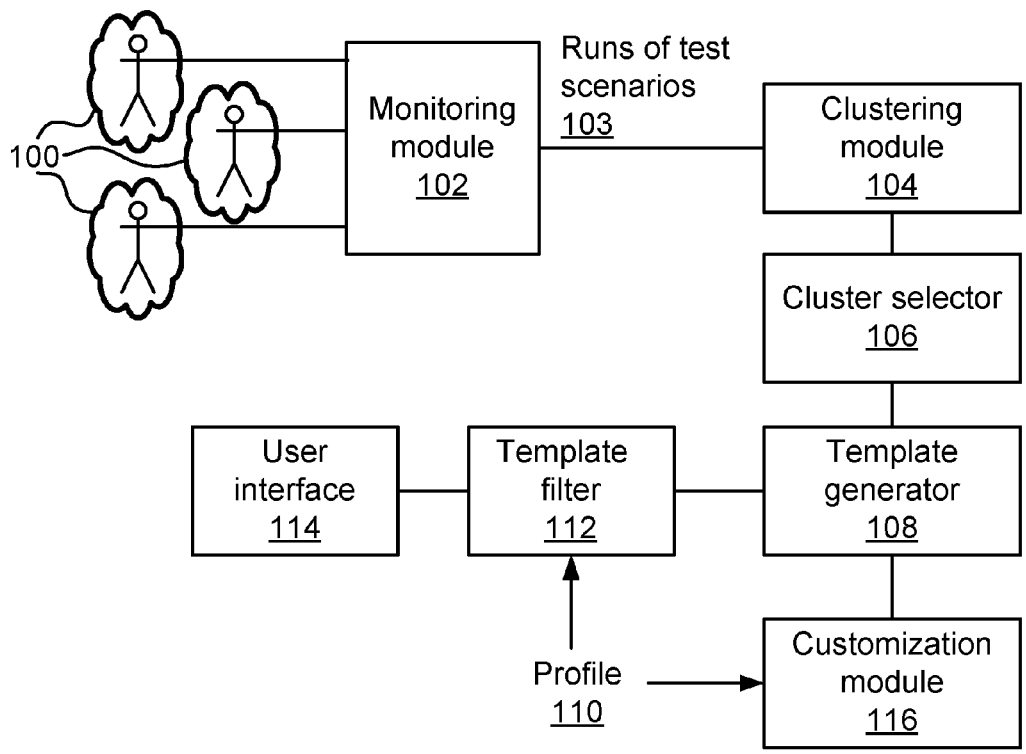
FIG. 1 illustrates one embodiment of a computer system configured to generate a test scenario template.

The term "transaction" is defined as a computer program, such as SAP ERP transaction or Oracle Application Form. In one example, a transaction may enable a user to access a certain functionality and/or may be called by filling its code in a box in a screen and/or by selecting it from a menu. In another example, a transaction is a logical portion of work, performed by a processor, involving the execution of one or more SQL statements.

The term "test step" refers to one or more actions performed via a User Interface (UI) as part of running a test scenario. In some cases, performing actions via a user interface may be achieved by interacting with the user interface, and/or by interacting with an Application Program Interface (API) related to the user interface.

The terms "a description of a run of a test scenario", also referred to as "a run of a test scenario", refer to data pertaining to running a test scenario on a software system (e.g., inputs, outputs, and/or intermediate data generated prior to running the test scenario, data generated during its run, and/or data generated as a result of running the test scenario). In one example, a run of test scenario may be obtained from monitoring a user running the test scenario on a software system. In the interest of brevity, in this disclosure, a term like "run of a test scenario" may be replaced with the shorter "run", where it is clear from the context. A run of a test scenario may be referred to as being "run by a user". This means that data included in the run of the test scenario is related to, or generated from, activity of the user on a software system, in which test steps of the test scenario were executed. Optionally, at least some of the data included in the run of the test scenario is derived from monitoring the activity of the user, which is related to execution of the test steps. Additionally, a run of a test scenario may be referred to as being associated with an organization, meaning that the run of the test scenario was run by a user belonging to the organization. Optionally, the user belonging to the organization ran the test scenario, at least in part, on a software system that belongs to the organization. Moreover, if it is mentioned, for example, that runs of test scenarios are received or clustered, it is meant that the objects being received may be processed descriptions of the runs of test scenarios (e.g., describing various attributes of the runs of the test scenarios), and not necessarily the actual raw recorded data that was initially obtained from monitoring users running the test scenarios.

A run of a test scenario may be considered an instantiation of the test scenario. That is, a certain test scenario may be run several times. For example, a test scenario may be run by different users, run on different systems, and/or run by the same user on the same system at different times. Each time the test scenario is run, that may be considered an event of instantiating the test scenario, and each run of the test scenario may be considered an instantiation of the test scenario.

In some embodiments, runs of test scenarios are identified from data obtained from monitoring users. Optionally, monitoring users may involve detecting, recording, and/or analyzing information entered by the users to computer systems and/or information presented to the users by the computer systems. Additionally or alternatively, monitoring may involve logging programs that were executed by the users, values utilized by the programs, memory content of programs and/or network traffic related to activities taken by the users. Optionally, a run of a test scenario may include data obtained from monitoring that underwent processing, summarization and/or analysis. Thus, a run of a test scenario need not necessarily include all data obtained from monitoring the running of the test scenario, and/or include data obtained from the monitoring in the same form as it was originally collected in.

A run of a test scenario may include descriptions of various aspects of running the test scenario such as: (i) the identity and/or composition (e.g., field types and/or identifiers) of a user interface (UI) screens the user manipulated and/or was exposed to while running the test scenario; (ii) user interactions with a system (e.g., actions performed by the user) (iii) transactions executed; (iii) behavior of the system during the test scenario (e.g., content of network transmissions, procedure calls, requests made to components of the system); and/or (iv) representations of the state of the system at various stages before, during, and/or after the test scenario is run. Additionally, a run of a test scenario may include data extracted from the test scenario and/or template of which the run is an instantiation. For example, the run may include values taken from a script according to which the run is executed and/or default values that appeared in template of which the run is an instantiation. The run may even include portions, or the entire scope, of the test scenario and/or the template of which the run is an instantiation.

A test scenario that is run by a user may be characterized according to its degree of automation, depending on type of involvement required of the user. In cases where the user is required to enter most of the values (e.g., field values on a screen), the run of the test scenario may be considered to be a manual run. In other cases, where the system provides some of the values (e.g., automatically fills values in no more than 95% of the fields on a screen/transaction/business process), but the user is still required to provide other values (e.g. enter values to fields that remain without values in the screen/transaction/business process), the run of the test scenario may be considered to be a semiautomatic run. In cases where little to no user intervention is needed (e.g., the script for running a test includes more than 95% of the values to be entered to the UI for the test, and is read by the system), the run of the test scenario may be considered to be an automatic run.

The term "test scenario template" refers to a model according to which a test scenario may be structured. A test scenario template may include one or more test steps, which instruct a user on an action to perform as part of the test, such as where to enter a value, what button to push, what screen to select, or what transaction to run. Optionally, a test scenario template may include one or more default values used for running an instantiation of the test scenario template (e.g., default values for certain fields in a screen). Additionally or alternatively, a test scenario template may be missing one or more values that are required for running an instantiation of the test scenario template; in such a case, a user running the instantiation of a template may provide the one or more missing values. In the interest of brevity, in this disclosure, a term like "test scenario template" may be replaced with the shorter "template", where it is clear from the context.

A run of a test scenario based on a test scenario template may be considered an instantiation of the test scenario template. For example, different users may run test scenarios based on a certain template; each time one of the users runs a test scenario based on the certain template, the corresponding run of that test scenario is considered an instantiation of the certain template. Similarly, if a user runs multiple test scenarios based on a template, where each time a test scenario was run it was run on a same software system, each of the runs of the test scenarios is considered a separate instantiation of the certain template. Optionally, a test scenario template may be considered associated with an organization if a user belonging to the organization ran an instantiation of the template and/or is intended to run an instantiation of the template. Additionally or alternatively, a test scenario template may be considered associated with an organization if the template was generated based on one or more runs of test scenarios that are associated with the organization.

As used herein, the term "software system" refers to a computer system that has software components (e.g., software modules that include programs). A software system may involve hardware (e.g., servers with processors) on which the software may run. The hardware may be dedicated hardware for the software system (e.g., servers sitting at an organization to which the software systems belong). Additionally or alternatively, hardware involved in a software system may be allocated on demand (e.g., cloud-based servers that are utilized by the software system as needed by it).

FIG. 1 illustrates one embodiment of a computer system configured to generate a test scenario template. The illustrated embodiment includes at least a monitoring module 102, a clustering module 104, a cluster selector 106, and a template generator 108.

The monitoring module 102 is configured to monitor users 100 belonging to different organizations to identify runs of test scenarios 103 run on software systems belonging to the different organizations. Optionally, the monitoring is done at least in part on the software systems belonging to the different organizations. For example, the monitoring module 102 may include components that are installed on the software systems of the different organizations and collects data generated while the users 100 are running the test scenarios. Additionally or alternatively, the monitoring module 102 may operate remotely from the software systems of the different organizations. For example, the monitoring module may be implemented, at least in part, using programs running on a cloud-based server that receive information related to activity of the users 100 on the software systems of the different organizations.

The clustering module 104 is configured to cluster the runs of the test scenarios 103 to clusters that include similar runs of test scenarios. Optionally, the clusters may be of various sizes, and include runs of various users belonging to different organizations. Optionally, the clustering module 104 performs processing of the runs prior to clustering, for example, it extracts field values from screens in runs. Optionally, the clustering module 104 may receive the runs after they undergo processing. For example, the runs may be represented as vectors of features on which a clustering algorithm utilized by the clustering module 104 may operate. Optionally, the clustering module 104 is configured to process and utilize for the clustering one or more of the following logged activities: a list of users who ran the test scenarios, an analysis of access to a database, messages returned from executed transactions, values returned by fields, and procedures utilized by a test scenario.

The cluster selector 106 is configured to select from the clusters a certain cluster. The selection of the certain cluster may be done according to various parameters, such the cluster's size, the number organizations associated with runs belonging to the cluster, and/or attributes of transactions executed in the runs belonging to the cluster. In one embodiment, the certain cluster selected by the cluster selector 106 includes a first run of a first test scenario and a second run of a second test scenario. Optionally, the first run is associated with a first organization belonging to the different organizations and the second run is associated with a second organization belonging to the different organizations. Additionally, the first run is not identical to the second run, and the first organization is not the second organization. In this embodiment, the fact that the certain cluster includes runs associated from different organizations may be indicative of the fact that the test scenarios test business processes and/or transactions that are likely also to be used by organizations other than the first and second organizations.

The template generator 108, is configured to generate a test scenario template based on one or more runs belonging to the certain cluster. In one embodiment, the certain cluster contains the first run of a first test scenario and the second run of a second test scenario, and test scenario template is generated by the template generator 108 based on the first and second runs. For example, the template generator 108 includes transactions identified in the first and/or second runs in the template. Additionally, the generated template may identify a transaction used in the first and second runs, and possible values for running the transaction. Optionally, the identified transaction is a transaction that was executed in both the first and second runs, and the possible values for running the identified transaction are obtained directly from the first and/or second runs, or derived from the first and/or second runs. Optionally, at least one of the possible values for running the transaction does not appear in each of the first and second runs. Optionally, the test scenario template includes a combination of the possible values, and the combination does not appear in any of the first and second runs. Optionally, the template generator 108 is configured to receive the certain cluster from the clustering module 106 and to select the first and second runs from the certain cluster.

In one embodiment, the template generator 108 is also configured to remove from the test scenario template proprietary data captured by the monitoring module. Optionally, data captured by the monitoring module is considered proprietary if it is captured from less than a predetermined number of the users. For example, data is proprietary if it appears in runs of less than 5 users or less than 5% of the users. Optionally, the template generator 108 utilizes a data cleaner module to remove the proprietary data.

In one embodiment, the computer system may optionally include a template filter 112. The template filter 112 is configured to receive a profile 110 of a certain user and to check whether the test scenario template is relevant to the certain user based on the profile 110. For example, the template filter 112 may check whether the template involves modules that the profile 110 indicates that the certain user typically uses. In another example, the template filter 112 may consult the profile 110 to check whether the user has permission to runs certain transactions included in the template.

In one embodiment, the test scenario template includes values, captured by the monitoring module 102, which were used by at least one of the users. The template generator 108 is further configured to remove from the test scenario template a value that is expected to be irrelevant to the certain user. Optionally, the template generator 108 receives the profile 110 and determines relevancy of the values based on the profile 110. For example, if the template includes values that are specific to a certain field of operations (e.g., insurance business), however the profile 110 indicates that the user is in another field of operations (e.g., auto manufacturing), then insurance related values may be removed from the template.

In one embodiment, the computer system may optionally include a user interface 114 configured to suggest a relevant test scenario template to the certain user. Optionally the relevant template is selected by the template filter 112. Optionally, the user interface 114 is coupled to the template filter 112. For example, they both involve software running on a same server accessed by the certain user. Alternatively, the template filter 112 may operate remotely from the user interface 114. For example, the template filter 112 may be part of a cloud-based service running on a remote server, while the user interface 114 includes hardware (e.g., a terminal) located at a site where the certain user runs test scenarios.

In one embodiment, the computer system may optionally include a customization module 116 that is configured to customize the test scenario template by adding thereto proprietary data relevant to a certain user for whom the test scenario template is customized. Optionally, the customization module performs at least some of the customization based on the profile 110 and the template is customized for the certain user. Alternatively, the template may be customized for a generic user belonging to a specific organization. Optionally, the customization module 116 may receive a profile of the specific organization and/or a profile of a typical user belonging to the specific organization, and perform the customization based on the profile or profiles.

In one embodiment, the template generator 108 is configured to calculate a cohesion rank describing how close to each other are runs of test scenarios associated with different organizations. Optionally, the test scenarios involve screens that include fields, and the cohesion rank is proportional to percentage of the fields that are common to the screens that are included in runs of test scenarios belonging to a cluster.

It is to be noted that there may be considerable flexibility when it comes implementing computer systems such as the systems modeled according to FIG. 1. Thus, various embodiments may implement components of the computer system illustrated in FIG. 1 in various ways. For example, in some embodiments one or more of the following may be implemented utilizing the same software modules, and/or software running on the same server and/or processor: the monitoring module 102, the clustering module 104, the cluster selector 106, the template generator 108, and the template filter 112. Additionally, one or more of the aforementioned components may be implemented on a remote server, such as a cloud-based server. In one example, clustering module 104 and the cluster selector 106 are both implemented as software running on the same server. In another example, the clustering module 104, cluster selector 106, and the template generator 108 are implemented as a cloud-based service that receives runs of test scenarios from the users 100 belonging to the different organizations, and generates templates that may be offered new users. In this example, the template filter 112 may also be part of the cloud-based service, and may be used to suggest to users certain templates that are appropriate for them.

Figure 2:
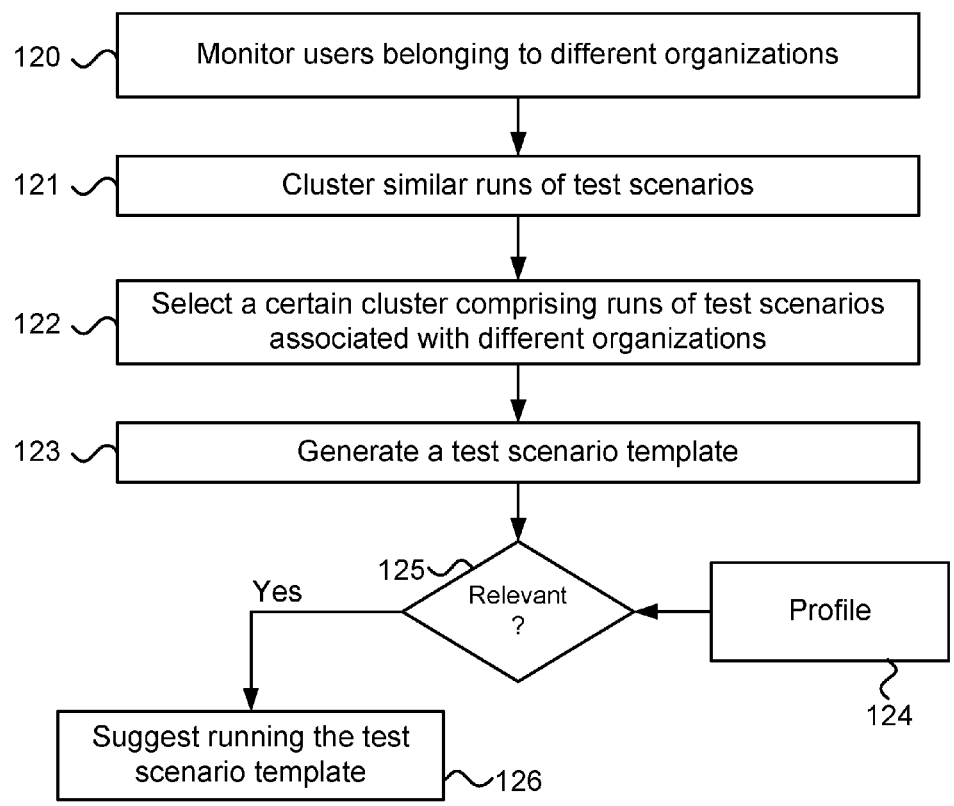
FIG. 2 illustrates one embodiment of a computer implemented method for generating a test scenario template.

FIG. 2 illustrates one embodiment of a computer implemented method for generating a test scenario template. The illustrated embodiment includes the following steps:

In step 120, monitoring users belonging to different organizations to identify runs of test scenarios run on software systems belonging to the different organizations.

In step 121, clustering the runs of the test scenarios to clusters that include similar runs of test scenarios.

In step 122, selecting, from among the clusters, a certain cluster that includes a first run of a first test scenario, associated with a first organization belonging to the different organizations, and a second run of a second test scenario, associated with a second organization belonging to the different organizations. In this embodiment, the first run is not identical to the second run, and the first organization is not the second organization.

And in step 123, generating a test scenario template representing the certain cluster, based on the first and second runs. Optionally, the test scenario template identifies a transaction used in the first and second runs, and possible values for running the transaction. For example, the template may provide an identifier of a transaction and/or code for executing the transaction. Optionally, at least one of the possible values for running the transaction does not appear in each of the first and second runs. Optionally, the test scenario template includes a combination of the possible values, and the combination does not appear in any of the first and second runs. Optionally, the test scenario template includes values, captured during the monitoring, which appear in at least one of the first and second runs. Optionally, the template is generated based on the first test scenario and/or the second test scenario.

In one embodiment, the method illustrated in FIG. 2 may also include additional optional steps: an optional step involving receiving a profile 124 of a certain user; in optional step 125 testing whether the test scenario template is relevant to the certain user based on the profile 124; and in optional step 126, if the template is found to be relevant, suggesting to the certain user to utilize the test scenario template. Optionally, the test scenario template includes values, captured during the monitoring, which appear in at least one of the first and second runs. Generating the template may be followed by, and/or include, a step of removing from the test scenario template a value that is expected to be irrelevant to the certain user. Optionally, determining whether the value is irrelevant is done based on the profile of the certain user.

A test scenario template may be processed after being generated in order to remove certain data that appears in it. In one embodiment, the method illustrated in FIG. 2 may also include an optional step of removing proprietary data related to one or more of the users from the generated template. Optionally, the proprietary data was captured from monitoring the users. Optionally, data captured from monitoring the users is considered proprietary if it appears in runs of less than a predetermined number of the users. For example, if a certain value appears in runs of less than 5% of the users, it may be considered proprietary.

Clustering runs may rely on various notions of similarity. In one embodiment, similar runs of test scenarios are characterized by having at least one of: essentially the same fields, essentially the same field values, similar combinations of fields, similar combinations of field values, similar execution of transactions, similar user interactions, similar requests, similar calls to procedures, and similar executions of procedures.

In another embodiment, the clustering of the runs in step 121 is based on counting the number of similar fields used in screens corresponding to the runs; the more similar fields, the more similar the runs of the test scenarios are considered to be.

In yet another embodiment, the clustering of the runs in step 121 is based on similarity between order of displaying similar fields in screens corresponding to the runs; the closer the orders, the more similar the runs are considered to be.

In still another embodiment, the clustering of the runs in step 121 is based on similarity between executed procedures associated with the test scenarios. Optionally, the clustering is also based on the order of executing the procedures. Additionally or alternatively, the clustering may be based on transactions executed as part of runs of test scenarios.

Monitoring the users in step 120 may involve various activities. In one embodiment, monitoring the users includes monitoring transactions in the identified runs that were tested by the users. Additionally or alternatively, monitoring the users may include monitoring procedures involved in testing of the transactions. In one example, the monitoring is screen-based UI monitoring (e.g., monitoring content presented to a user on a screen and/or monitoring data entered by the user such as selections on the screen). In another example, monitoring involves recording a value provided by a user (e.g., a value entered with a keyboard). In yet another example, the monitoring includes recording programs that were executed and the corresponding invocation values. In still another example, the monitoring includes monitoring network traffic (e.g., recording messages exchanged between system modules).

Coverage, such as coverage of transactions or business processes, which may be achieved by utilizing a template, may be a consideration, in some embodiments, when it comes to deciding which templates to generate and/or which template to suggest to a user. Additionally, coverage may be estimated for a group of templates. In one embodiment, the computer implemented method illustrated in FIG. 2 may include an optional step of receiving a value representing a required coverage for a certain user, and achieving the required coverage with a substantially minimal number of test scenario templates by estimating coverage of testing achieved by many templates before the step of suggesting the certain user to utilize at least one of the templates. Optionally, the computer implemented method illustrated in FIG. 2 may include an optional step of calculating the required coverage based on a usage information of the certain user. For example, usage information of the certain user may be obtained from the profile 110.

There may be various templates and/or combinations of templates that can achieve a required coverage for a user; thus, additional factors may be considered when selecting templates to achieve the required coverage. In one embodiment, achieving a required coverage for a certain user may be done by an additional factor: the run time required to runs instantiations of templates. Optionally, the required coverage is achieved by selecting templates that require the shortest time to run for a user that runs test scenarios based on templates of test scenarios that achieve the required coverage. Optionally, selection of the templates is done in this case by estimating time to achieve a required coverage for the certain user by many templates before the step of suggesting the certain user to utilize at least one of the templates. For example, various subsets of templates are considered to determine if they achieve the required coverage and how long they take to run. A subset of templates that both achieves the required coverage and has a minimal running time may then be selected for the certain user. Optionally, the shortest time is achieved by suggesting templates relevant to test scenarios that are expected to be used by the certain user, and spreading the suggested templates to approximately achieve a uniform coverage of the test scenarios with the suggested templates.

In one embodiment, the computer implemented method illustrated in FIG. 2 may include an optional step of estimating the importance of a test scenario for a certain user. Following that, the method may include an optional step of suggesting to the certain user templates corresponding to the most important test scenarios essentially first. Optionally, the importance of a certain test scenario is determined by frequency in which the certain test scenario is used relative to frequency in which other test scenarios are used. For example, the more frequently a test scenario is used, the more important its corresponding template may be considered. Optionally, the importance of a certain test scenario is determined by characteristics of users of the certain test scenario compared to characteristics of users of other test scenarios. For example, if a certain test scenario is used primarily by testers of management-related modules, it may be considered more important than a test scenario that is used primarily by a tester of modules that involve a product-related website. Optionally, the importance of a certain test scenario is determined by financial value associated with the certain test scenario compared to financial value associated with other test scenarios. For example, a test scenario involving completing a sale may have higher financial value than a test scenario that involves data mining the internet to find email addresses of potential customers.

In one embodiment, a non-transitory computer-readable medium stores program code that may be used by a computer to generate a test scenario template. The computer includes a processor, and the non-transitory computer-readable medium stores the following program code:

Program code for monitoring users belonging to different organizations to identify runs of test scenarios run on software systems belonging to the different organizations.

Program code for clustering the runs of the test scenarios to clusters that include similar runs of test scenarios. Optionally, the program code for clustering includes instructions or processing one or more of the following logged activities: list of users who ran the test scenarios, analysis of access to a database, messages returned from executed transactions, values returned by fields, and procedures utilized by a test scenario.

Program code for selecting from the clusters a certain cluster that includes a first run of a first test scenario and a second run of a second test scenario. Optionally, the first run is associated with a first organization belonging to the different organizations, the second run is associated with a second organization belonging to the different organizations, the first run is not identical to the second run, and the first organization is not the second organization.

And program code for generating, based on the first and second runs, a test scenario template representing the certain cluster. The test scenario template identifies a transaction used in the first and second runs, and possible values for running the transaction. Optionally, at least one of the possible values for running the transaction does not appear in each of the first and second runs. Optionally, the test scenario template includes a combination of the possible values, and the combination does not appear in any of the first and second runs.

In one embodiment, the non-transitory computer-readable medium optionally stores program code for receiving a profile of a certain user, program code for testing whether the test scenario template is relevant to the certain user based on the user profile, and program code for suggesting to the certain user to utilize the test scenario template based on the profile if the test scenario template is deemed relevant to the certain user. Optionally, the test scenario template includes values, captured during the monitoring, which were used by at least one of the users. The non-transitory computer-readable medium may also store program code for removing from the test scenario template a value that is expected to be irrelevant to the certain user.

In one embodiment, the non-transitory computer-readable medium optionally stores program code for removing from the test scenario template proprietary data captured from monitoring the users. Optionally, data captured from monitoring the users is considered proprietary if it is captured from less than a predetermined number of the users.

In one embodiment, the non-transitory computer-readable medium optionally stores program code for calculating a cohesion rank describing how close to each other are runs of test scenarios from different organizations. Optionally, the runs of test scenarios include screens that have fields, and the cohesion rank describes a percentage of the fields that are common to the screens that are included in runs of test scenarios belonging to a cluster.

Figure 3:
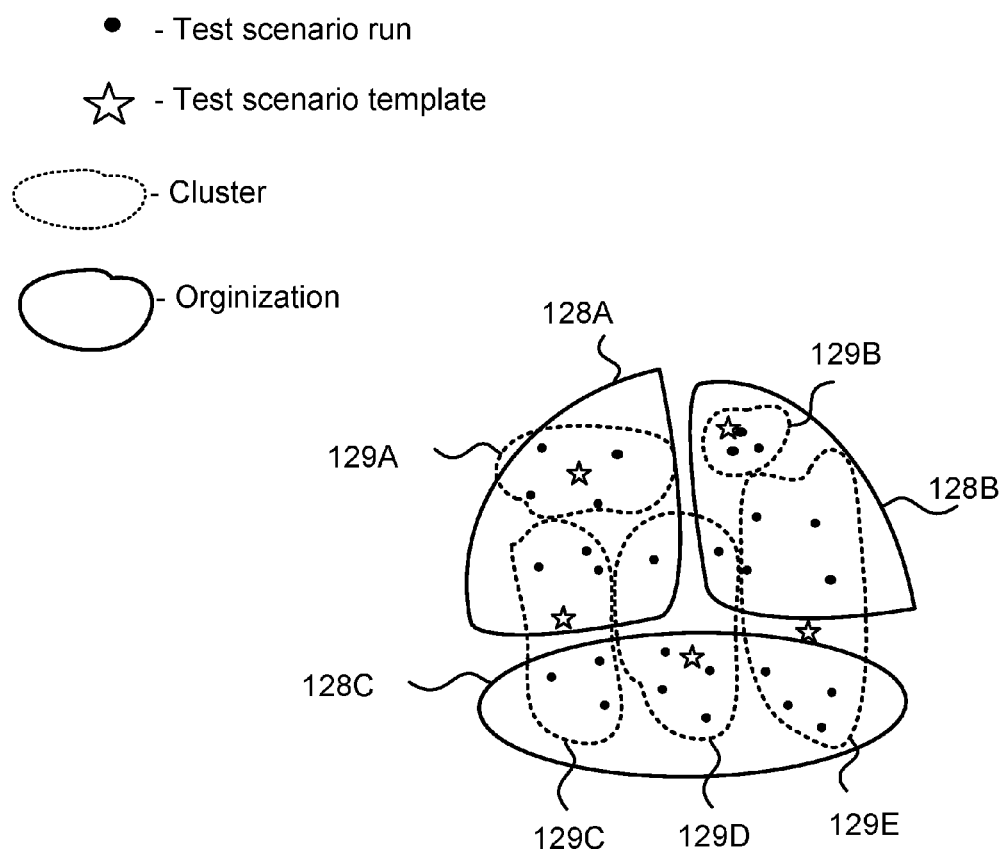
FIG. 3 is a schematic illustration of runs of test scenarios, clusters, and templates.

FIG. 3 is a schematic illustration of runs of test scenarios (represented by dots) of three different organizations (128A-C). The runs are clustered into five different clusters of similar runs of test scenarios (129A-E). Each cluster is represented by a test scenario template (illustrated by a start symbol). Some of the clusters span runs of multiple organizations (e.g., 129C-E), while other include runs from a single organization (129A,B). In addition, the templates need not be exact derivations of test scenarios; in this illustration, the fact that the stars (templates) do not overlap with the dots (runs), illustrates that the content of the templates is not derived completely from any one of the runs. For example, this may be due to the templates containing combinations of values obtained from multiple runs.

Figure 4:
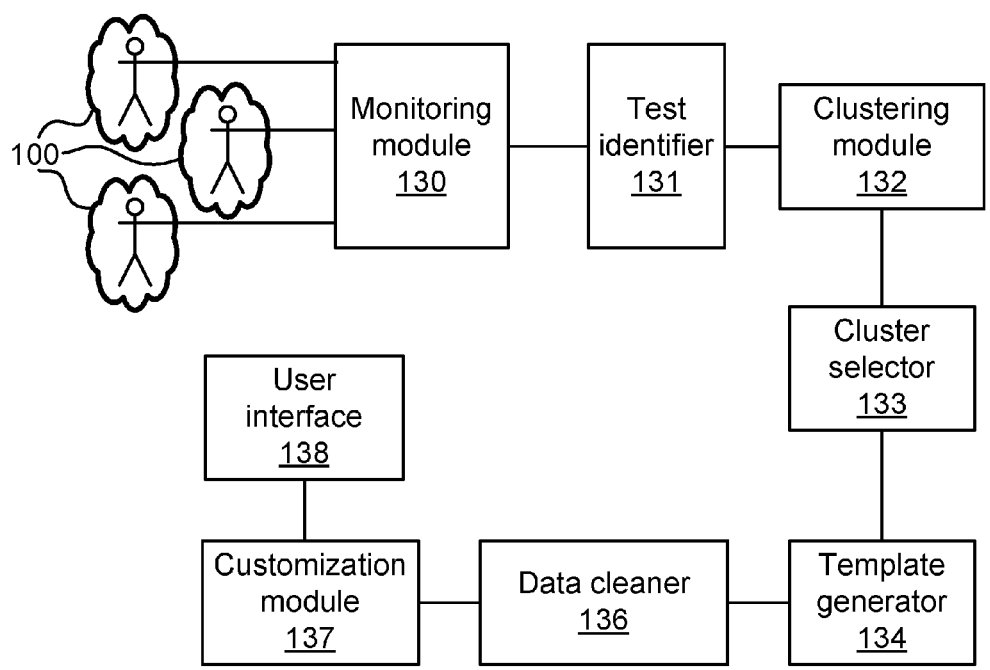
FIG. 4 illustrates one embodiment of a computer system to generate a customized test scenario template.

FIG. 4 illustrates one embodiment of a computer system to generate a customized test scenario template based on runs of test scenarios run by users belonging to different organizations. The illustrated embodiment includes at least a test identifier 131, a clustering module 132, a cluster selector 133, a template generator 134, a data cleaner 136, and a customization module 137.

The test identifier 131 is configured to identify runs of test scenarios run by the users on software systems that belong to the different organizations. Optionally, the test identifier 131 receives data obtained from monitoring the users 100. Optionally, the runs of test scenarios identify transactions that are run as part of the test scenarios and possible values that may be used by the transactions. For example, the template may provide an identifier of the transaction and/or code for executing the transaction.

The clustering module 132 is configured to cluster the runs of the test scenarios to clusters that include similar runs of test scenarios. Optionally, the clustering module 132 is configured to process one or more of the following logged activities: a list of users who ran the test scenarios, an analysis of access to a database, messages returned from executed transactions, values returned by fields, and procedures utilized by a test scenario.

The cluster selector 133 is configured to select from among the clusters a certain cluster that includes a first run of a first test scenario, associated with a first organization belonging to the different organizations, and a second run of a second test scenario, associated with a second organization belonging to the different organizations. In this embodiment, the first run may not identical to the second run (e.g., they have different values to certain fields), and the first organization is not the second organization. Optionally, the cluster selector 133 is also configured to receive a profile of the certain user, and to select a cluster appropriate for the certain user based on the profile and at least one of the following: coverage of the clusters, importance of the clusters, and ranking of the clusters. For example, the cluster selector 133 may be more likely to select a first cluster, which has a high ranking, than a second cluster that has a lower ranking than the first. Similarly, the cluster selector 133 may be more likely to select a cluster that includes runs of test scenario, which based on the profile of the certain user, may offer higher coverage for the certain user.

The template generator 134 is configured to generate a test scenario template based on the first and second runs. Optionally, the first and second runs are runs of the same test scenario. Alternatively, the first and second runs may be runs of different test scenarios (however, the different test scenarios likely possess some degree of similarity since the first and second runs were placed in the same cluster by the clustering module 132). Optionally, the template identifies a transaction used in the first and second runs, and possible values for running the transaction. For example, the template may include identifiers of transactions and/or code that runs the transactions. Additionally, the template may include values for running the transaction such as default input values that the transaction can use. Optionally, at least one of the possible values for running the transaction does not appear in each of the first and second runs. Optionally, the test scenario template includes a combination of the possible values, and the combination does not appear in any of the first and second runs.

The data cleaner 136 is configured to remove from the test scenario template proprietary data associated with at least one of the first organization and the second organization. Optionally, most output fields of the first and second runs are removed, and as a result, the test scenario template does not include expected values for most test steps. Optionally, the output fields may be removed by the data cleaner 136 and/or the template generator 134, the customization module 137, and/or by another suitable module or combination of modules.

In one embodiment, a value in a test scenario template may be considered proprietary and consequently removed from the template. Optionally, the proprietary value is removed by the data cleaner 136. Optionally, a decision on whether a value is proprietary may be based on at least one of: a number of runs of test scenarios in the certain cluster in which the value appears, and a number of different organizations associated with the runs of the test scenarios in which the value appears. Optionally, if the number of runs in which the value appears is below a certain threshold and/or the number of organizations associated with runs in which the certain value appears is below a certain threshold then the data cleaner 136 may remove the certain value from the template.

In one embodiment, the data cleaner 136 may enable or restrict the customization module 137 from utilizing a certain value based on whether or not the certain value is considered proprietary. The decision on whether or not the certain value is proprietary may also be based on at least one of: the number of runs of test scenarios in which the certain value appears, and the number of different organizations associated with the runs of the test scenarios in which the certain value appears. For example, if the number of runs in which the certain value appears reaches a predetermined threshold, the certain value may be considered non-proprietary, and as such is allowed to be used for customization. In another example, if the number of organizations associated with the runs in which the selected value appears reaches a predetermined threshold, this may indicate that the selected value is non-proprietary; it is not likely to be able to identify an organization associated with a run from which the selected value was taken.

The customization module 137 is configured to customize the test scenario template by adding to the test scenario template proprietary data relevant to a certain user for whom the test scenario template is customized. Optionally, at least some of the data added to the template by the customization module replaces proprietary data that has been removed from the template (e.g., by the data cleaner).

In one example, the proprietary data may be entered by the certain user (e.g., after being prompted to provide it). In another example, proprietary data is automatically acquired, e.g., by querying a database for information relevant to the user such as information obtained from a user profile. In yet another example, proprietary data used in customization is obtained from a database the holds information about the organization to which the certain user belongs.

In one embodiment, the certain user for whom the test scenario template is customized is a generic user belonging to a specific organization. Optionally, the specific organization may be one of the different organizations, or a new organization that does not belong to the different organizations.

There may be various relationships between the customization module 137 and the data cleaner 136. In one embodiment, the customization module 137 and the data cleaner 136 are realized, at least in part, by the same software module. For example, a certain program may perform both removal of at least some of the proprietary data from a template, and additionally, the module may perform at least some of customization of the template.

In some embodiments, the data cleaner 136 operates on the template before the customization module 137 receives the template. While in other embodiments, the order may be reversed; first the template may customized by the customization module 137, and then proprietary data may be removed by the data cleaner 136.

In one embodiment, the system illustrated in FIG. 4 optionally includes a monitoring module 130 that is configured to monitor the users 100 belonging to the different organizations and to provide data obtained from monitoring the users 100 to the test identifier 131.

In another embodiment, the system illustrated in FIG. 4 optionally includes a user interface 138 configured to suggest to the certain user to run an instantiation of the customized test scenario template. Optionally, the user interface 138 may initiate the instantiation of the customized test scenario template. For example, the user interface 138 may present a first screen of the customized test scenario template and prompt the user to take a certain action to proceed with execution of the customized template.

In one embodiment, the data cleaner 136 is configured to: select a value from the test scenario template, and remove the selected value from the test scenario template if the selected value appears in less than a first predetermined number of the runs of test scenarios in the certain cluster or the selected value appears in runs of test scenarios in the certain cluster that are associated with less than a second predetermined number of different organizations. Optionally, both the first predetermined number and the second predetermined number are greater than one.

In another embodiment, the data cleaner 136 is configured to: select a value from a run of a test scenario; check whether the value appears in at least a first predetermined number of the runs of the test scenarios; check whether the value appears in runs of test scenarios associated with at least a second predetermined number of different organizations; and if both conditions are positive, enable the customization module to utilize the selected value for customizing the test scenario template. Optionally, the data cleaner is further configured not to enable customization of the test scenario template to utilize the selected value if at least one of the conditions is negative.

It is to be noted that different embodiments may implement components of the computer system illustrated in FIG. 4 in different ways. For example, in some embodiments one or more of the following may be implemented utilizing the same software modules, and/or software modules running on the same server: the monitoring module 130, the test identifier 131, the clustering module 132, the cluster selector 133, the template generator 134, the data cleaner 136, and the customization module 137. Additionally, one or more of the aforementioned components may be implemented on a remote server, such as a cloud-based server. In one example, clustering module 132 and the cluster selector 133 are both implemented as software running on the same server. In another example, the clustering module 132, cluster selector 133, and the template generator 134 are implemented as a cloud-based service that receives runs of test scenarios from the users 100 belonging to the different organizations, and generates templates that may be offered new users. In this example, the data cleaner 136 and/or the customization module 137 may also be part of the cloud-based service, and may be used to prepare a template to be utilized by users.

Figure 5:
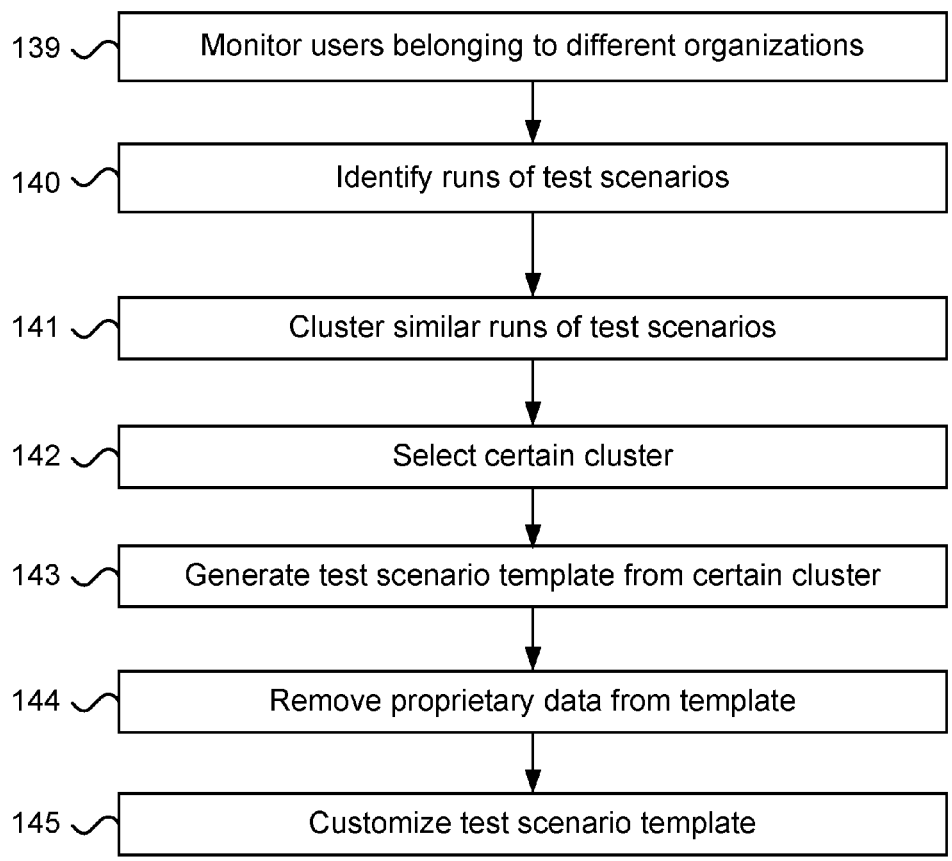
FIG. 5 illustrates one embodiment of a computer implemented method for generating a customized test scenario template.

FIG. 5 illustrates one embodiment of a computer implemented method for generating a customized test scenario template based on runs of test scenarios run by users belonging to different organizations. The illustrated embodiment of the method includes the following steps:

In step 140, identifying runs of test scenarios run by the users on software systems that belong to the different organizations.

In step 141, clustering the runs of the test scenarios to clusters that include similar runs of test scenarios. In one example, the runs of test scenarios in the certain cluster include five non-identical runs of test scenarios, each associated a different organization. Optionally, similar runs of test scenarios are characterized by having at least one of: essentially the same fields, essentially the same field values, similar combinations of fields, similar combinations of field values, similar execution of transactions, similar user interactions, similar requests, similar calls to procedures, similar executions.

In step 142, selecting, from among the clusters, a certain cluster that includes a first run of a first test scenario, associated with a first organization belonging to the different organizations, and a second run of a second test scenario, associated with a second organization belonging to the different organizations. Optionally, the first run is not identical to the second run, and the first organization is not the second organization. Optionally, the first test scenario is identical to the second test scenario. Alternatively, the first test scenario may be different from the second test scenario.

In step 143, generating a test scenario template associated with the certain cluster based on the first and second runs. Optionally, the template is also generated, at least in part, based on the first test scenario and/or the second test scenario. Optionally, the test scenario template identifies a transaction used in the first and second runs, and possible values for running the transaction. Optionally, at least one of the possible values for running the transaction does not appear in each of the first and second runs. Optionally, the test scenario template includes a combination of the possible values, and the combination does not appear in any of the first and second runs.

In step 144, removing from the test scenario template proprietary data associated with at least one of the first organization and the second organization. Optionally, most of the output fields of the first and second runs are removed. As a result, the test scenario template does not include expected values for most test steps.

And in step 145, customizing the test scenario template by adding to the test scenario template proprietary data relevant to a certain user for whom the test scenario template is customized. Optionally, the certain user for whom the test scenario template is customized is a generic user belonging to a specific organization.

In one embodiment, the computer implemented method includes step 139, which involves monitoring the users and providing data obtained from the monitoring for use in the identifying of the runs of test scenarios.

In one embodiment, step 144 may be performed after step 145; that is first customizing of the template is performed, and then proprietary data is removed; while in other embodiments, the order may be first to remove proprietary data (step 144) and then to customize (step 145).

In one embodiment, prior to selecting the certain cluster in step 142, a profile of a certain user is received, and selecting the certain cluster is done, at least in part, based on the profile so the certain cluster is appropriate for the certain user. Optionally, at least one of the following factors is considered in along with information in the profile: coverage of the clusters, importance of the clusters, and ranking of the clusters. Optionally, at least one of the factors is computed for at least some of the clusters with respect to the profile. For example, the coverage of the clusters is computed with respect to an indication in the profile regarding the modules and/or business processes utilized by the user. Similarly, importance of the clusters may be computed with respect to the number of modules, tested by runs in a cluster, which are utilized often by the user.

In one embodiment, step 144 which involves removing from the test scenario template proprietary data, involves selecting a value derived from the test scenario template. Optionally, the certain value is derived from at least one of the first and second runs. Following that, removing the selected value from the test scenario template if the selected value appears in less than a first predetermined number of the runs of test scenarios in the certain cluster or the selected value appears in runs of test scenarios in the certain cluster that are associated with less than a second predetermined number of different organizations. In this embodiment, both the first predetermined number and the second predetermined number are greater than one.

In one embodiment, step 144 which involves removing from the test scenario template proprietary data includes: selecting a value appearing in at least one of the first run and the second run; testing whether the value appears in at least a first predetermined number of the runs in the certain cluster; testing whether the value appears in runs in the certain cluster that are associated with at least a second predetermined number of different organizations; and if both conditions are positive, enabling customization of the test scenario template to utilize the selected value. Optionally, if at least one of the aforementioned conditions is negative, customization of the test scenario template is not allowed to utilize the selected value.

In one embodiment, the computer implemented method illustrated in FIG. 5 includes an optional step of suggesting to the certain user to run an instantiation of the generated customized test scenario template. Optionally, the suggestion to run the instantiation is done via the user interface 138.

In one embodiment, clustering the runs in step 141 involves processing one or more of the following logged activities: a list of users who ran the test scenarios, an analysis of access to a database, messages returned from executed transactions, values returned by fields, and procedures utilized by a test scenario. Optionally, clustering of the runs in step 141 is based on counting the number of similar fields used in screens corresponding to the runs; the more similar fields, the more similar the runs of the test scenarios are considered to be. Additionally or alternatively, clustering of the runs in step 141 may be based on similarity between order of displaying similar fields in screens corresponding to the runs; the closer the orders, the more similar the runs are considered to be. Additionally or alternatively, clustering of the runs in step 141 may be based on similarity between executed procedures associated with the test scenarios. Optionally, the clustering may also be based on the order of executing the procedures and/or on transactions executed as part of runs of test scenarios.

Figure 6:
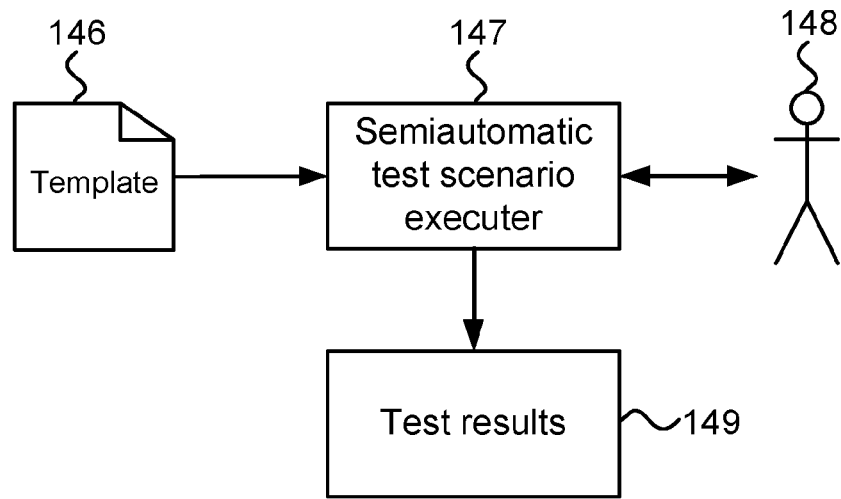
FIG. 6 illustrates one embodiment involving a user that performs a semiautomatic run of a test scenario that is an instantiation of a test scenario template.

FIG. 6 illustrates one embodiment in which a user 148 performs a semiautomatic run of a test scenario that is an instantiation of a test scenario template 146. The template 146 is provided to the semiautomatic test scenario executer 147 which is a system capable of communicating with the user 148. When faced with a value missing from the template 146, but needed for running the test scenario, the semiautomatic test scenario executer prompts the user 148 to provide a value. After providing the value, the semiautomatic executer continues with the run. Optionally, the semiautomatic executer 147 may require the user to enter multiple values, possibly at multiple times. After completing the run, the semiautomatic test scenario executer generates test results 149. Optionally, values provided by the user 148 to the semiautomatic executer 147 may be utilized in order to customize the template 146. Thus, additional runs of the template 146 and/or runs of other related templates, which can utilize the provided values, may not require user intervention and may run automatically.

Figure 7:
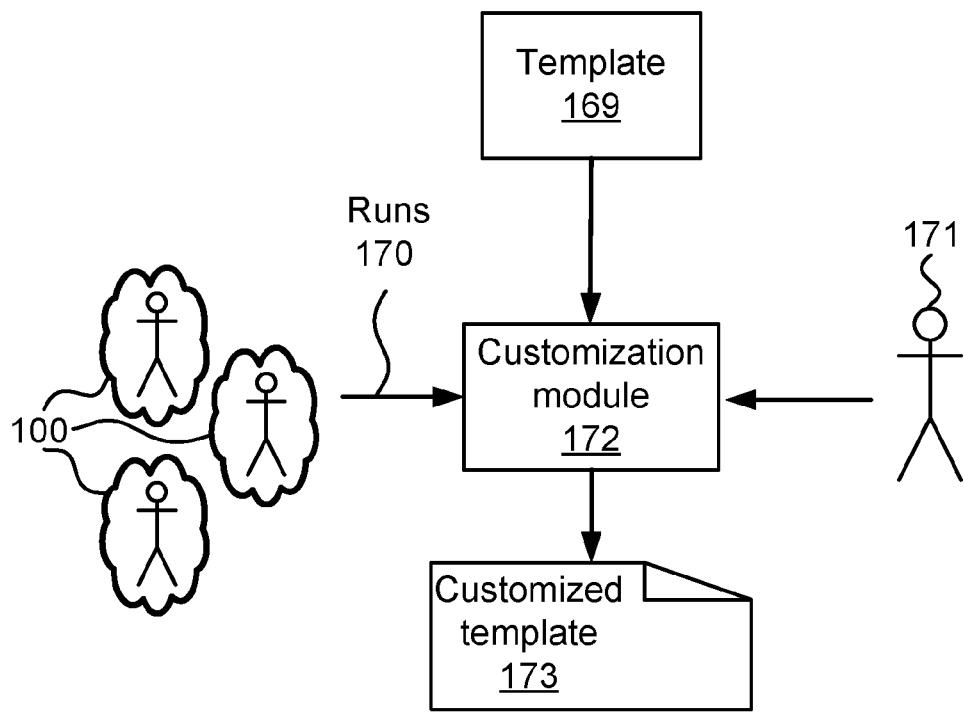
FIG. 7 illustrates one embodiment involving a test scenario template being customized using a customization module.

FIG. 7 illustrates one embodiment in which a test scenario template 169 is customized by a user 171, using a customization module 172. Certain values for the customization of the template 169 are provided by the user 171, while other values are obtained by analyzing the runs 170 of test scenarios of the users 100 which ran the test scenarios on software systems belonging to different organizations. In one example, the customization module 172 attempts to extract needed values from the runs 170. If the customization module 172 is unable to extract certain needed values, the user 171 is prompted to enter the certain needed values. After, receiving values (e.g., default values and/or proprietary data) to add to the template 169, the customization module 172 generates a customized template 173.

In one embodiment, a non-transitory computer-readable medium stores program code that may be used by a computer to generate a customized test scenario template based on runs of test scenarios run by users belonging to different organizations. The computer includes a processor, and the non-transitory computer-readable medium stores the following program code:

Program code for monitoring the users belonging to the different organizations to identify runs of test scenarios run on similar software systems belonging to the different organizations.

Program code for clustering the runs to clusters that include similar runs of test scenarios.

Program code for selecting from the clusters a certain cluster that includes: a first run of a first test scenario associated with a first organization belonging to the different organizations, and a second run of a second test scenario associated with a second organization belonging to the different organizations; the first run is not identical to the second run, and the first organization is not the second organization.

Program code for generating a test scenario template representing the certain cluster, based on the first and second runs. Optionally, the test scenario template identifies a transaction used in the first and second runs, and possible values for running the transaction. Optionally, at least one of the possible values for running the transaction does not appear in each of the first and second runs. Optionally, the test scenario template includes a combination of the possible values, and the combination does not appear in any of the first and second runs.

Program code for removing from the test scenario template proprietary data associated with at least one of the first organization and the second organization. Optionally, the program code involves removing most of the output fields of the first and second runs, and as a result, the test scenario template does not include expected values for most test steps.

And program code for generating a customized test scenario template by adding thereto proprietary data relevant to a certain user for whom the test scenario template is customized.

In one embodiment, the non-transitory computer-readable medium optionally stores program code for receiving a profile of the certain user, and selecting a cluster appropriate for the certain user based on the profile and at least one of the following: coverage of the clusters, importance of the clusters, and ranking of the clusters.

In one embodiment, the program code for removing from the test scenario template proprietary data associated with at least one of the first organization and the second organization includes: program code for selecting a value derived from the test scenario template, wherein said value is derived from at least one of the first and second runs. And in addition, program code for removing the selected value from the test scenario template if the selected value appears in less than a first predetermined number of the runs of test scenarios in the certain cluster or the selected value appears in runs of test scenarios in the certain cluster associated with less than a second predetermined number of different organizations. Optionally, both the first predetermined number and the second predetermined number are greater than one.

In one embodiment, the program code for removing from the test scenario template proprietary data associated with at least one of the first organization and the second organization includes program code for: selecting a value that appears in at least one of the first run and the second run; testing whether the value appears in at least a first predetermined number of the runs in the certain cluster; testing whether the value appears in runs in the certain cluster that are associated with at least a second predetermined number of different organizations; and if both conditions are positive, enabling customizing of the test scenario template to utilize the selected value. Optionally, the non-transitory computer-readable medium may also store program code for not enabling customization of the test scenario template to utilize the selected value if at least one of the conditions is negative.

In one embodiment, the non-transitory computer-readable medium may also store program code for suggesting to the certain user to run an instantiation of the generated customized test scenario template.

Figure 8:
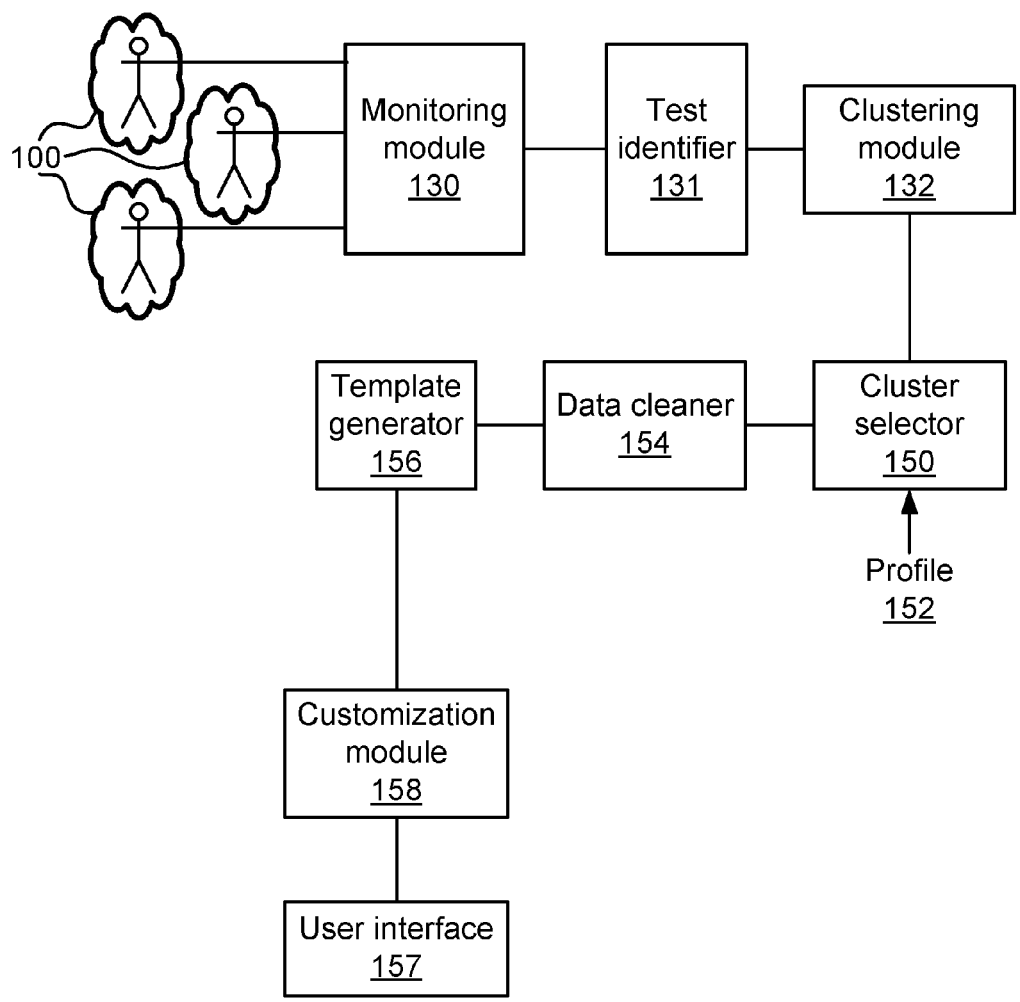
FIG. 8 illustrates one embodiment of a computer system configured to generate a test scenario template based on a user profile.

FIG. 8 illustrates one embodiment of a computer system configured to generate a test scenario template based on a user profile. The illustrated embodiment includes at least a test identifier 131, a clustering module 132, a cluster selector 150, a data cleaner 154, and a template generator 156.

The test identifier 131 is configured to identify runs of test scenarios run by users on software systems that belong to different organizations. Optionally, the users belong to different organizations.

The clustering module 132 is configured to cluster the runs of the test scenarios to clusters that include similar runs of test scenarios. Optionally, the clustering module 132 is configured to process one or more of the following logged activities: a list of users who ran the test scenarios, an analysis of access to a database, messages returned from executed transactions, values returned by fields, and procedures utilized by a test scenario. Optionally, the clusters may be of various sizes, and include runs of various users belonging to different organizations. Optionally, the clustering module 132 performs processing of the runs prior to clustering; for example, it extracts field values from screens in runs. Optionally, the clustering module 132 may receive the runs after they undergo processing. For example, the runs may be represented as vectors of features on which a clustering algorithm utilized by the clustering module 132 may operate.

The cluster selector 150 is configured to receive a profile 152 of a first user, and to select, from among the clusters, a certain cluster that suits the profile. In this embodiment, the certain cluster may include a first run of a first test scenario, associated with a first organization belonging to the different organizations, and a second run of a second test scenario, associated with a second organization belonging to the different organizations. Additionally, the first run is not identical to the second run, and the first organization is not the second organization.

In one embodiment, in addition to considering the profile 152, selection of a cluster may be done, at least in part, according to various parameters, such the cluster's size, the number organizations associated with runs belonging to the cluster, and/or attributes of transactions executed in the runs belonging to the cluster. Optionally, the more runs belong to a cluster and/or the larger the number of organizations associated with runs that belong to the cluster, the likelier the cluster selector 150 is to select the cluster to be the certain cluster.

The data cleaner 154 is configured to remove from the first run proprietary data associated with the first organization. Optionally, the data cleaner 154 is also configured to remove from the second run proprietary data associated with the second organization. Optionally, the data cleaner 154 is also configured to remove a selected value from the first run based on at least one of: number of runs of test scenarios in which the value appears, and number of different organizations associated with the runs of the test scenarios in which the value appears. Optionally, most output fields of the first and second runs are removed by the data cleaner 154, and as a result, the test scenario template does not include expected values for most test steps.

The template generator 156 is configured to generate a test scenario template based on the first and second runs. Optionally, the test scenario template identifies a transaction used in the first and second runs, and possible values for running the transaction. Optionally, at least one of the possible values for running the transaction does not appear in each of the first and second runs. Optionally, the test scenario template includes a combination of the possible values, and the combination does not appear in any of the first and second runs.

In one embodiment, the data cleaner 154 may be configured to remove proprietary data from the template. Optionally, the data cleaner 154 removes from the template proprietary data associated with the first and/or second organizations. Optionally, the data cleaner 154 may be implemented as part of the template generator 156. For example, removal of proprietary data may be part of the process of generating the template.

In one embodiment, the computer system optionally includes a customization module 158. The customization module 158 is configured to customize the test scenario template for the first user by adding to the test scenario template proprietary data relevant to the first user. Optionally, customization module 158 is also configured to obtain the proprietary data relevant to the first user from a previously monitored run of test scenario associated with the first user, and substitute a non-empty subset of the removed proprietary data with the obtained data. Additionally or alternatively, the customization module may be configured to extract proprietary data relevant to the customization of the template from the profile 152. Additionally or alternatively, the customization module 158 may be configured to obtain the proprietary data relevant to the first user from parsing a manual test scenario associated with the first user for obtaining a value associated with the first user, and substituting a non-empty subset of the removed proprietary data with the obtained value. Additionally or alternatively, the customization module 158 may be configured to obtain the proprietary data relevant to the first user from analyzing a database of the software system associated with the first user to obtain a value associated with the first user, and substituting a non-empty subset of the removed proprietary data with the obtained value.

In one embodiment, the customization module 158 is also configured to: provide the test scenario template to a second user, prompt the second user to provide a missing value, and record an input value provided by the second user. Optionally, the first user and the second user are the same user.

In one embodiment, the computer system optionally includes a user interface 157 configured to suggest to the first user to run an instantiation of the test scenario template. Optionally, the template suggested to the first user is customized by the customization module 158. For example, the template suggested to the user includes proprietary data relevant to the first user (e.g., one or more values taken from the profile 152).

In another embodiment, the computer system optionally includes a monitoring module 130. The monitoring module is configured to monitor the users 100 belonging to the different organizations and to provide data obtained from monitoring the users to the test identifier 131.

In one embodiment, the profile 152 of the first user includes transactions (e.g., code of the transactions or identifiers of the transactions) executed by the first user and the cluster selector 150 is also configured to select, from among the clusters, a certain cluster which contains runs of test scenarios that involve similar transactions to the transactions executed by the first user. Additionally or alternatively, the profile 152 of the first user may include values used by the first user during execution of transactions, and the cluster selector is configured to select, from among the clusters, a certain cluster which contains runs of test scenarios that involve similar values to the values used by the first user.

It is to be noted that different embodiments may implement components of the computer system illustrated in FIG. 8 in different ways. For example, in some embodiments one or more of the following may be implemented utilizing the same software modules, and/or software modules running on the same server: the monitoring module 130, the test identifier 131, the clustering module 132, the cluster selector 150, the template generator 156, the data cleaner 154, and the customization module 158. Additionally, one or more of the aforementioned components may be implemented on a remote server, such as a cloud-based server. In one example, clustering module 132 and the cluster selector 150 are both implemented as software running on the same server. In another example, the clustering module 132, cluster selector 150, the data cleaner 154, and the template generator 156 are implemented as a cloud-based service that receives runs of test scenarios from the users 100 belonging to the different organizations, and generates templates that may be offered new users. In this example, the customization module 158 may also be part of the cloud-based service, and may be used to prepare a template to be utilized by users. Optionally, the customization module 158 and the data cleaner 154 may be both implemented as modules of the template generator.

Figure 9:
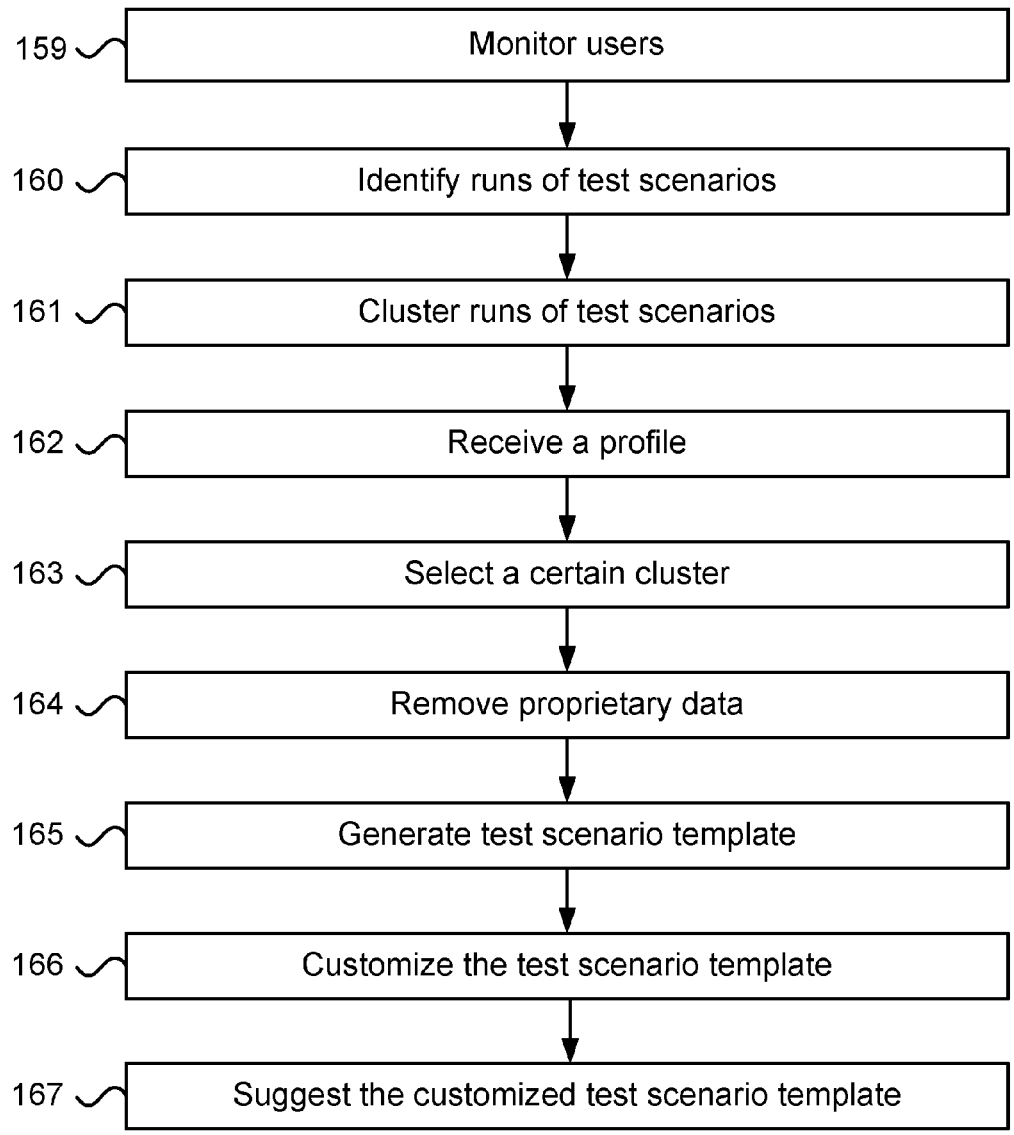
FIG. 9 illustrates one embodiment of a computer implemented method for generating a customized test scenario template based on a user profile.

FIG. 9 illustrates one embodiment of a computer implemented method for generating a customized test scenario template based on a user profile. The illustrated embodiment includes the following steps:

In step 160, identifying runs of test scenarios run by users belonging to different organizations on software systems that belong to the different organizations.

In step 161, clustering the runs of the test scenarios to clusters that include similar runs of test scenarios.

In step 162, receiving a profile of a first user. Optionally, the profile of the first user includes transactions (e.g., code of the transactions or identifiers of the transactions) executed by the first user and the selecting from the clusters of the certain cluster is done by examining transactions involved in runs in the clusters to identify a cluster containing test scenarios that involve similar transactions to the transactions executed by the first user. Optionally, the profile of the first user includes values used by the first user during execution of transactions, and the selecting of the certain cluster is done by examining values involved in runs in the clusters to identify a cluster containing test scenarios that involve similar values to the values used by the first user.

In step 163, selecting, from among the clusters, a certain cluster that suits the profile. In this embodiment, the certain cluster includes a first run of a first test scenario, associated with a first organization belonging to the different organizations, and a second run of a second test scenario, associated with a second organization belonging to the different organizations; the first run is not identical to the second run, and the first organization is not the second organization.

In step 164, removing from the first run proprietary data associated with the first organization. Optionally, step 164 may also involve removing from the second run proprietary data associated with the second organization. Optionally, most output fields of the first and second runs are removed, and as a result, the test scenario template does not include expected values for most test steps.

And in step 165, generating a test scenario template based on the first and second runs. Optionally, generation of the test scenario template is also based on the first test scenario and/or the second test scenario. Optionally, the test scenario template identifies a transaction used in the first and second runs, and possible values for running the transaction. Optionally, at least one of the possible values for running the transaction does not appear in each of the first and second runs. Optionally, the test scenario template includes a combination of the possible values, and the combination does not appear in any of the first and second runs.

In one embodiment, removing from the first run proprietary data associated with the first organization in step 165 includes: selecting a value from the first run, and removing the selected value if the selected value appears in less than a first predetermined number of runs of test scenarios or the selected value appears in runs of test scenarios associated with less than a second predetermined number of different organizations. Both the first predetermined number and the second predetermined number may be greater than one.

In one embodiment, the computer implemented method includes an additional optional step 159, which involves monitoring the users belonging to different organizations and providing data collected in the monitoring for the identifying of the runs of test scenarios.

In one embodiment, the computer implemented method includes an additional optional step 166, which involves customizing the test scenario template for the first user by adding to the test scenario template proprietary data relevant to the first user. Optionally, customizing the test scenario template involves obtaining a value from a run of a previously monitored test scenario associated with the first user, and substituting a non-empty subset of the removed proprietary data with the obtained value. Optionally, customizing the test scenario template may involve parsing a manual test scenario associated with the first user in order to obtain a value associated with the first user, and substituting a non-empty subset of the removed proprietary data with the obtained value. Optionally, customizing the test scenario template may involve analyzing a database of the software system associated with the first user to obtain a value associated with the first user, and substituting a non-empty subset of the removed proprietary data with the obtained value. Optionally, customizing the test scenario template may involve extracting proprietary data useful for customization of the template from a profile of the first user.

In one embodiment, customizing the test scenario template in step 166 involves: providing the test scenario template to a second user, prompting the second user to provide a missing value, and recording an input value provided by the first user. Optionally, the first user and the second user may be the same user.

In one embodiment, the computer implemented method may include an additional optional step 167 involving suggesting to the first user to run an instantiation of the customized test scenario template. For example, the user interface 157 may utilized to present the template to the first user.

In one embodiment, a non-transitory computer-readable medium stores program code that may be used by a computer to generate a customized test scenario template based on a user profile. The computer includes a processor, and the non-transitory computer-readable medium stores the following program code:

Program code for monitoring users belonging to different organizations to identify runs of test scenarios run on software systems belonging to the different organizations.

Program code for clustering the runs of test scenarios to clusters that include similar runs of test scenarios;

Program code for receiving a profile of a first user.

Program code for selecting, from among the clusters, a certain cluster that suits the profile. In this embodiment, the certain cluster includes a first run of a first test scenario, associated with a first organization belonging to the different organizations, and a second run of a second test scenario, associated with a second organization belonging to the different organizations; the first run is not identical to the second run, and the first organization is not the second organization.

Program code for removing from the first run proprietary data associated with the first organization. Additionally or alternatively, the program code may involve removing from the second run proprietary data associated with the second organization. Optionally, the program code for removing proprietary data involves removing most of the output fields of the first and second runs; and as a result, the test scenario template does not include expected values for most test steps.

And program code for generating a test scenario template based on the first and second runs. Optionally, the test scenario template identifies a transaction used in the first and second runs, and possible values for running the transaction. Optionally, at least one of the possible values for running the transaction does not appear in each of the first and second runs. Optionally, the test scenario template includes a combination of the possible values, and the combination does not appear in any of the first and second runs.

In one embodiment, the non-transitory computer-readable medium optionally stores program code for monitoring the users belonging to different organizations and providing data collected in the monitoring for the identifying of the runs of test scenarios.

In one embodiment, the profile of the first user includes descriptions of transactions executed by the first user. Optionally, the program code for the selecting of the certain cluster includes computer code for examining transactions involved in runs in the clusters in order to identify a cluster containing test scenarios that involve similar transactions to the transactions executed by the first user.

In another embodiment, the profile of the first user includes values used by the first user during execution of transactions, and the computer code for the selecting of the certain cluster includes computer code for examining values involved in runs in the clusters in order to identify a cluster containing test scenarios that involve similar values to the values used by the first user.

In one embodiment, the program code for removing from the first run proprietary data associated with the first organization includes: program code for selecting a value from the first run, and program code for removing the selected value if the selected value appears in less than a first predetermined number of runs of test scenarios or the selected value appears in runs of test scenarios associated with less than a second predetermined number of different organizations; both the first predetermined number and the second predetermined number are greater than one.

In one embodiment, the non-transitory computer-readable medium optionally stores program code for customizing the test scenario template for the first user by adding to the test scenario template proprietary data relevant to the first user. Optionally, the program code for customizing the test scenario template for the first user includes: program code for obtaining the proprietary data relevant to the first user from a previously monitored run of test scenario associated with the first user, and program code for substituting a non-empty subset of the removed proprietary data with the obtained value. Optionally, the program code for customizing the test scenario template for the first user includes: program code for obtaining the proprietary data relevant to the first user from parsing a manual test scenario associated with the first user, for obtaining a value associated with the first user, and program code for substituting a non-empty subset of the removed proprietary data with the obtained value. Optionally, the program code for customizing the test scenario template for the first user includes: program code for obtaining the proprietary data relevant to the first user from analyzing a database of the software system associated with the first user to obtain a value associated with the first user, and program code for substituting a non-empty subset of the removed proprietary data with the obtained value. Optionally, the program code for customizing the test scenario template for the first user includes program code for extracting proprietary data that may be useful for customization of the template from a profile of the first user.

Figure 10:
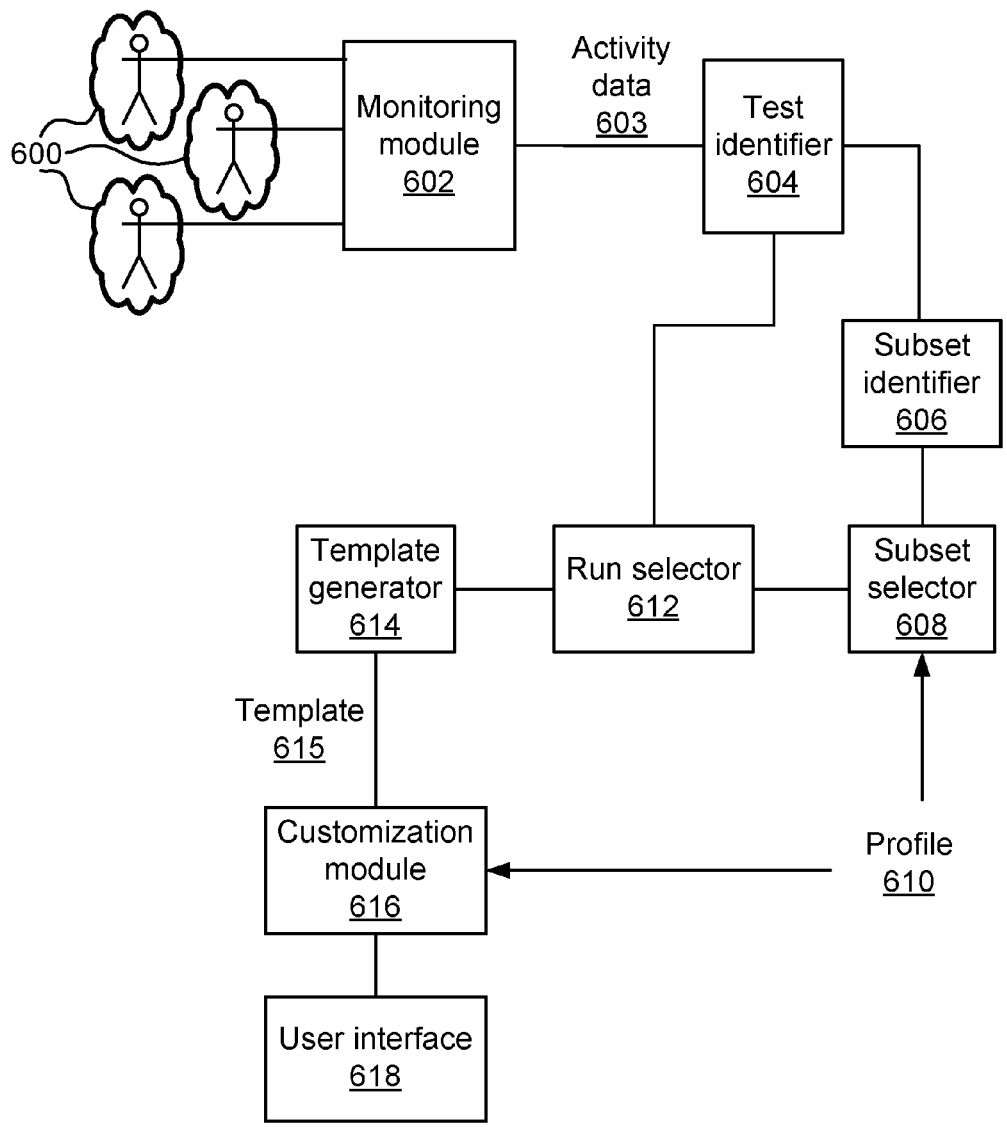
FIG. 10 illustrates one embodiment of a computer system configured to generate a test scenario template from runs of test scenarios that include a subset of test steps.
Figure 11:
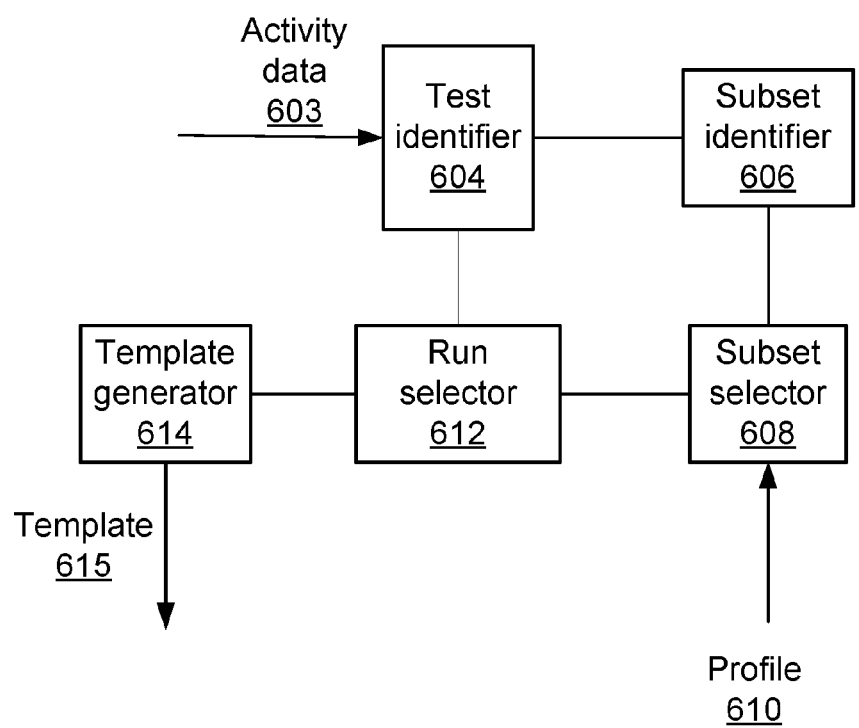
FIG. 11 illustrates one embodiment of a computer system configured to generate a test scenario template from runs of test scenarios that include a subset of test steps.

FIG. 10 and FIG. 11 illustrate embodiments of a computer system configured to generate a test scenario template from runs of test scenarios that include a subset of test steps. The computer system includes at least the test identifier 604, a subset identifier 606, a subset selector 608, a run selector 612, and a template generator 614.

The test identifier 604 is configured to identify runs of test scenarios run by users on software systems that belong to different organizations. Optionally, the users belong to the different organizations. Optionally, the test identifier 604 receives activity data 603 obtained from monitoring the users. In one example, the identified runs include at least a first run that was run by a first user belonging to a first organization and a second run that was run by a second user belonging to a second organization, and the first organization is not the second organization and the first user is not the second user.

In one embodiment, a test scenario may be characterized as including test steps; running the test scenario involves executing the test steps, and a run of the test scenario may describe the test steps. For example, each run of a test scenario may include a description of the test steps that were executed as part of running the test scenario (e.g., code executed in the test steps, values utilized by the test steps, and/or identifiers of the test steps). Optionally, since different test scenarios may include different test steps, runs of the different test scenarios may describe different subsets of test steps that were executed when running the different test scenarios. Additionally, in some cases, runs of the same test scenario may follow different control paths (e.g., due to different system behavior). Thus, in such cases, different runs of the same test scenario may describe different subsets of test steps.

The subset identifier 606 is configured to identify subsets of test steps that are frequently described in the runs of the test scenarios. Optionally, subsets may be frequently described in the runs because the test steps are frequently executed in the runs. Optionally, based on analysis of the runs, the subset identifier 606 is able to determine, for at least some of the runs of the test scenarios, at least some of the test steps that are executed while running the test scenarios. Optionally, a test step may identified by various means, such as via a name of the test step, an identifier (e.g., an identification number and/or hash value that represents the test step), code executed by the test step, and/or a description of a value associated with the test step (e.g., a value provided as input for the test step). Optionally, each run of the at least some runs, is associated with at least one subset of test steps that are described in the run and/or that were executed in the run. Optionally, a run may be associated with a number of subsets of test steps that may or may not overlap to some extent. For example, some subsets from a run may have certain test steps in common, while other subsets from the run may not have any test steps in common. Optionally, each subset includes a fixed number of test steps (e.g., three test steps). Alternatively, subsets of test steps may be of various sizes.

In one embodiment, the subset identifier 606 assigns identifiers to subsets of test steps. For example, the subsets may be stored in a database, and each run of a test scenario may be associated with one or more entries in the database that correspond to one or more subsets of test steps. Optionally, a subset of test steps may be identified by a hash value (e.g., a hash function value that is given to an input that includes a description of the test steps). Optionally, the identifiers of the subsets may be utilized to identify subsets that are frequently described in runs. For example, a database that stores subsets of test steps may have fields that store a value representing how many times the subsets of test steps were described in runs. When a new run is processed, values corresponding to subsets found in the run are incremented; thus after processing multiple runs, it may be possible to determine which subsets are frequently described by evaluating the values in the fields. In another example, entries in a hash table that accept as keys subsets of test steps, and/or identifiers of subsets of test steps, may have values that correspond to the number of times the subsets were described in runs and/or the number of organizations associated with runs in which the subsets of test steps were described. Thus, scanning the values in the hash table may help identify frequently described subsets.

Based on the test step associated with the at least some runs, the subset identifier 606 may determine which of the subsets of test steps are frequently described in the runs of the test scenarios. In one example, a subset of test steps is considered to be frequently described if its test steps are described in at least a predetermined number of the runs. In another example, a subset of test steps is considered to be frequently described if its test steps are described in at least a predetermined proportion of the runs. In yet another example, a certain number and/or a certain proportion of the subsets of test scenarios that are described the most times are considered frequently described. In this example, the subsets of test steps may be ranked according to the number of times they were described in runs of test scenarios, and the top ranked subsets are considered frequently described. For example, the top 5% of the subsets of test steps may be considered frequently described subsets of test steps.

In one embodiment, a subset of test steps is considered frequently described if the test steps included in the subset are described in runs of test scenarios associated with at least a predetermined number of different organizations. For example, the subset of test steps may need to be described in test scenarios run by users from at least five different organizations in order to be considered frequently described.

It is to be noted that a "predetermined number" refers to a fixed number known a priori, or to a number derived according to logic that is known a priori. For example, a threshold for a number of runs may be 10% of the runs (in this case the logic for computing the predetermined number is known a priori, but the actual number is determined at runtime when the number of runs is known).

The subset selector 608 is configured to receive a profile 610 of a first user and, based on the profile 610, to select a certain subset, from among the frequently described subsets of test steps, which is appropriate for the first user. Optionally, the profile 610 indicates test steps that are likely to be relevant to the first user. For example, the profile may include previous runs of test scenarios of the first user and/or list specific transactions executed by the first user and/or an organization to which the first user belong. Optionally, the certain subset contains at least one test step that involves execution of a transaction that is not mentioned in the profile 610. Optionally, the certain subset contains at least one test step that involves a value that is not mentioned in the profile 610.

In one embodiment, the profile 610 describes transactions executed by the first user. The subset selector 608 is configured to select from the subsets of frequently described test steps a certain subset which contains at least one test step that involves a transaction similar to a transaction executed by the first user. Optionally, a subset of test steps that includes at least one test step executed by the first user is considered appropriate for the first user. For example, if based on the profile 610, the first user is known to frequently execute a test step involving creating a new client record, then subsets of test steps involving the test step of creating a new client record may be considered appropriate for the first user.

In one embodiment, similar transactions refer to transactions that behave similarly and/or have essentially the same functionality. For example, a "create" transaction for a material number and a "change" transaction for the material number are similar because they process essentially the same date, e.g., the create transaction introduces the material number and its related properties, and the change transaction manipulates the properties of the material number. In another embodiment, two transactions are similar when one includes a certain option while the other does not include the certain option. In still another embodiment, there are transactions in which most of the steps are the same, and the difference is in the user interface. For example, SAP transaction ST03 and SAP transaction ST03N have a different interface but essentially the same functionality.

In another embodiment, the profile 610 describes values used by the first user during execution of transactions. The subset selector 608 is configured to select from the subsets of frequently described test steps a certain subset that contains at least one test step that involves a value similar to a value used by the first user to execute a transaction. Optionally, a subset of test steps that includes at least one test step that involves a value similar to a value used by the first user is considered appropriate for the first user. For example, if the profile 610 indicates that the first user executes test steps in which the accounting department is frequently the destination for messages, then a subset of test steps that includes a test step which uses the accounting department as a destination for messages may be considered appropriate for the user. It is to be understood that the user in this embodiment may be a tester and/or a production user who executes test steps as part of his/her usual working procedure.

In yet another embodiment, a subset of test steps may be considered appropriate for the first user, if based on the profile 610, it may be determined that the first user executed at least a predetermined number and/or a predetermined proportion, of the test steps in the subset. For example, a subset of test steps may be considered appropriate for the first user if the profile 610 indicates that at least 50% of the test steps in the subset were executed by the first user. Optionally, the at least 50% of the steps are described in various runs of test scenarios. For example, each of the test steps is described in a different run). Optionally, the at least 50% of the steps are described in a single run; that is, there is a certain run corresponding to an instantiation of a test scenario in which the first user executed the at least 50% of the test steps.

In still another embodiment, a subset of test steps may be considered appropriate for the first user, if based on the profile 610, it may be determined that the first user executed test steps that involve at least a predetermined number and/or a predetermined proportion, of the values utilized in test steps belonging to the subset. For example, a subset of test steps may be considered appropriate for the first user if the profile 610 indicates that at least 80% of the values in test steps in the subset were utilized by the first user. Optionally, the at least 80% of the values are described in various runs of test scenarios. For example, each of the values may be described in a different run). Optionally, the at least 80% of the values are described in a single run; that is, there is a certain run corresponding to an instantiation of a test scenario in which the first user utilized the at least 80% of the values while running the test scenario.

The run selector 612 is configured to receive the certain subset of test steps, and to select from among the runs of the test scenarios, a first run of a first test scenario that is associated with a first organization belonging to the different organizations, and a second run of a second test scenario that is associated with a second organization belonging to the different organizations. The first run includes a first subset of test steps that is essentially identical to the certain subset, and the second run includes a second subset of test steps that is essentially identical to the certain subset. Optionally, the first organization and the second organization are different organizations. Optionally, the first user is not associated with any of the first organization and the second organization.

In one embodiment, subset of test steps A is essentially identical to subset of test steps B, if the test steps in A are the same as the test steps in B, but possibly involve different values. For example, A and B involve execution of the same transactions however some of the default values in A might be different from the default values in B.

In another embodiment, subset of test steps A is essentially identical to subset of test steps B, if the test steps in A involve execution of similar transactions to transactions involved in executions of the test steps in B. For example, the transactions executed by test steps from A may be the same type as the transactions executed by test from B (e.g., they perform a similar action or involve similar system components). In another example, most of the transactions executed in test steps in to A are also executed in test steps in B, and vice versa.

The template generator 614 is configured to generate a test scenario template 615 based on the first and second runs. Optionally, the test scenario template 615 identifies a transaction used in the first and second runs, and possible values for running the transaction. Optionally, the identified transaction is a transaction that was executed in both the first and second runs, and the possible values for running the identified transaction are obtained directly from the first and/or second runs, or derived from the first and/or second runs.

In one embodiment, the computer system optionally includes a customization module 616. The customization module 616 is configured to customize the test scenario template 615 for the first user by adding to the test scenario template 615 proprietary data relevant to the first user. Optionally, at least some of the proprietary data if obtained from the profile 610. Additionally, the computer system may include an optional user interface 618 configured to suggest to the first user to run an instantiation of the customized test scenario template.

In one embodiment, the customization module 616 is configured to obtain the proprietary data relevant to the first user from a previously monitored run of test scenario associated with the first user, and substitute a non-empty subset of the removed proprietary data with the obtained value. Optionally, a run may be considered associated with the first user if the run was run by the first user and/or the run is associated with an organization to which the first user belongs. Additionally or alternatively, the customization module 616 may be also configured to obtain the proprietary data relevant to the first user from parsing a manual test scenario associated with the first user for obtaining a value associated with the first user, and substituting a non-empty subset of the removed proprietary data with the obtained value. Optionally, a manual test scenario may be considered associated with the first user if the first user ran an instantiation of the test scenario and/or is supposed to run an instantiation of the test scenario (e.g., according to a testing plan). Additionally or alternatively, the customization module 616 may be also configured to obtain the proprietary data relevant to the first user from analyzing a database of the software system associated with the user to obtain a value associated with the first user, and substituting a non-empty subset of the removed proprietary data with the obtained value.

In another embodiment, the customization module 616 is also configured to: provide the test scenario template 615 to a second user, prompt the second user to provide a missing value, and record an input value provided by the second user. Optionally, the first user and the second user are the same user.

In another embodiment, the computer system optionally includes a monitoring module 602. The monitoring module is configured monitor the users 600 belonging to the different organizations, and to provide activity data 603 obtained from monitoring the users 600 to the test identifier 604.

It is to be noted that different embodiments may implement components of the computer systems illustrated in FIG. 10 and/or FIG. 11 in different ways. For example, in some embodiments one or more of the following may be implemented utilizing the same software modules, and/or software modules running on the same server: the monitoring module 602, the test identifier 604, the subset identifier 606, the subset selector 608, the run selector 612, the template generator 614, the customization module 616, and the user interface 618. Additionally, one or more of the aforementioned components may be implemented on a remote server, such as a cloud-based server. In one example, subset identifier 606 and the subset selector 608 are both implemented as software running on the same server. In another example, the subset identifier 606, the subset selector 608, the runs selector 612, and the template generator 614 are implemented as a cloud-based service that receives runs of test scenarios run by the users 600 belonging to the different organizations, and generates templates that may be offered new users. In this example, the customization module 616 may also be part of the cloud-based service, and may be used to prepare a template to be utilized by users. Optionally, each of the customization module 616 and the run selector 612 may be implemented as modules of the template generator 614.

Figure 12:
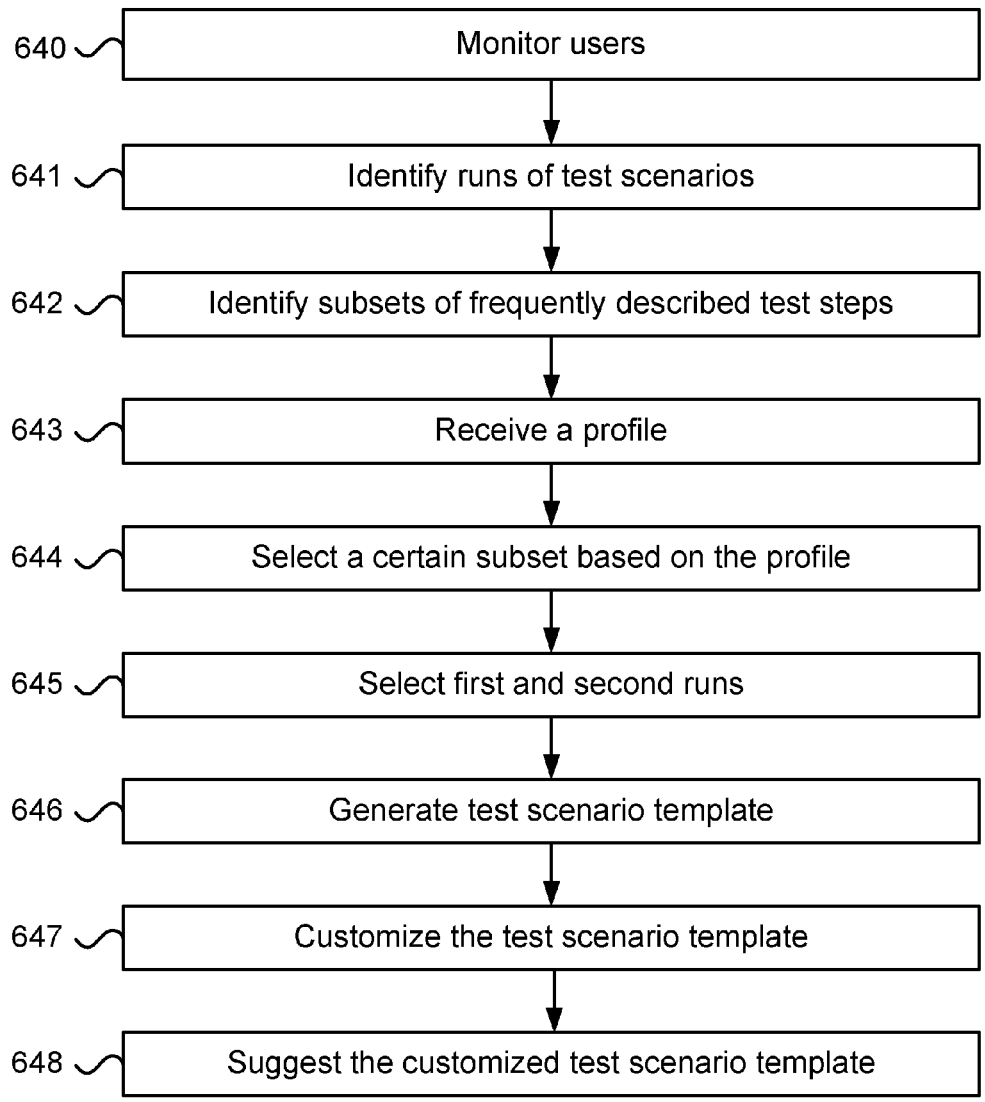
FIG. 12 illustrates one embodiment of a computer implemented method for generating a test scenario template from runs of test scenarios that include a subset of test steps.

FIG. 12 illustrates one embodiment of a computer implemented method for generating a test scenario template from runs of test scenarios that include a subset of test steps. The illustrated embodiment includes the following steps:

In step 641, identifying runs of test scenarios run by users belonging to different organizations on software systems that belong to the different organizations; each run of a test scenario describes test steps.

In step 642, identifying subsets of test steps that are frequently described in the runs of the test scenarios. Optionally, a subset of test steps is frequently described in the runs of the test scenarios if the test steps included in the subset are described in at least a predetermined number of the runs of test the test scenarios. Optionally, a subset of test steps is frequently described in the runs of the test scenarios if the test steps included in the subset are described in runs of test scenarios associated with at least a predetermined number of different organizations.

In step 643, receiving a profile of a first user.

In step 644, selecting, based on the profile, a certain subset, from among the subsets, which is appropriate for the first user.

In step 645, selecting, from among the identified runs, a first run of a first test scenario and a second run of a second test scenario. The first run is associated with a first organization belonging to the different organizations and the second run is associated with a second organization belonging to the different organizations. In addition, the first run includes a first subset of test steps that is essentially identical to the certain subset and the second run includes a second subset of test steps that is essentially identical to the certain subset. Optionally, the first organization and the second organization are different organizations. Optionally, the first user is not associated with any of the first organization and the second organization.

And in step 646, generating a test scenario template based on the first and second subsets of test steps.

In one embodiment, the computer implemented method includes an additional optional step 647, which involves customizing the test scenario template for the first user by adding to the test scenario template proprietary data relevant to the first user. Optionally, customizing the test scenario template involves obtaining a value from a run of a previously monitored test scenario associated with the first user, and substituting a non-empty subset of the removed proprietary data with the obtained value. Alternatively or additionally, customizing the test scenario template may involve parsing a manual test scenario associated with the first user in order to obtain a value associated with the first user, and substituting a non-empty subset of the removed proprietary data with the obtained value. Alternatively or additionally, customizing the test scenario template may involve analyzing a database of the software system associated with the first user to obtain a value associated with the first user, and substituting a non-empty subset of the removed proprietary data with the obtained value.

In one embodiment, customizing the test scenario template in step 647 involves: providing the test scenario template to a second user, prompting the second user to provide a missing value, and recording an input value provided by the first user. Optionally, the first user and the second user may be the same user.

In one embodiment, the computer implemented method includes an additional optional step 648 involving suggesting to the first user to run an instantiation of the customized test scenario template. For example, the user interface 618 may utilized to present the template to the first user.

In one embodiment, the computer implemented method illustrated in FIG. 12 includes an optional step of removing proprietary data associated with at least one of the different organizations from at least one of the runs of test scenarios. Optionally, most output fields of the first and second runs are removed, and as a result, the test scenario template does not include expected values for most test steps. Additionally or alternatively, the computer implemented method may include a step of removing proprietary data that is associated with at least one of the first and second organizations from the template.

In one embodiment, the computer implemented method includes an additional step 640, which involves monitoring the users belonging to different organizations and providing data collected in the monitoring for the identifying of the runs of test scenarios.

In one embodiment, a non-transitory computer-readable medium stores program code that may be used by a computer to generate a test scenario template from runs of test scenarios that include a subset of test steps. The computer includes a processor, and the non-transitory computer-readable medium stores the following program code:

Program code for identifying runs of test scenarios run by users on software systems that belong to different organizations; each run of a test scenario describes test steps.

Program code for identifying subsets of test steps that are frequently described in the runs of the test scenarios.

Program code for receiving a profile of a first user.

Program code for selecting, based on the profile, a certain subset, from among the subsets, which is appropriate for the first user. Optionally, a subset of test steps is frequently described in the runs of the test scenarios if the test steps included in the subset are described in at least a predetermined number of the runs of test the test scenarios. Optionally, a subset of test steps is frequently described in the runs of the test scenarios if the test steps included in the subset are described in runs of test scenarios associated with at least a predetermined number of different organizations.

Program code for selecting, from among the identified runs, a first run of a first test scenario and a second run of a second test scenario. The first run is associated with a first organization belonging to the different organizations and the second run is associated with a second organization belonging to the different organizations. Additionally, the first run involves a first subset of test steps that is essentially identical to the certain subset and the second run involves a second subset of test steps that is essentially identical to the certain subset. Optionally, the first organization and the second organization are different organizations. Optionally, the first user is not associated with any of the first organization and the second organization.

And program code for generating a test scenario template based on the first and second subsets of test steps.

In one embodiment, the non-transitory computer-readable medium optionally stores program code for monitoring activity of the users on software systems belonging to the different organizations and providing data obtained from the monitoring for use in the identifying of the runs of the test scenarios.

In one embodiment, the non-transitory computer-readable medium optionally stores program code for suggesting to the first user to run an instantiation of the customized test scenario template.

In one embodiment, the non-transitory computer-readable medium optionally stores program code for removing proprietary data associated with at least one of the different organizations from at least one of the runs of test scenarios.

In one embodiment, the non-transitory computer-readable medium optionally stores program code for removing proprietary data associated from at least one of the first organization and the second organization from the test scenario template.

In one embodiment, the non-transitory computer-readable medium optionally stores program code for customizing the test scenario template for the user by adding to the test scenario template proprietary data relevant to the user.

Figure 13:
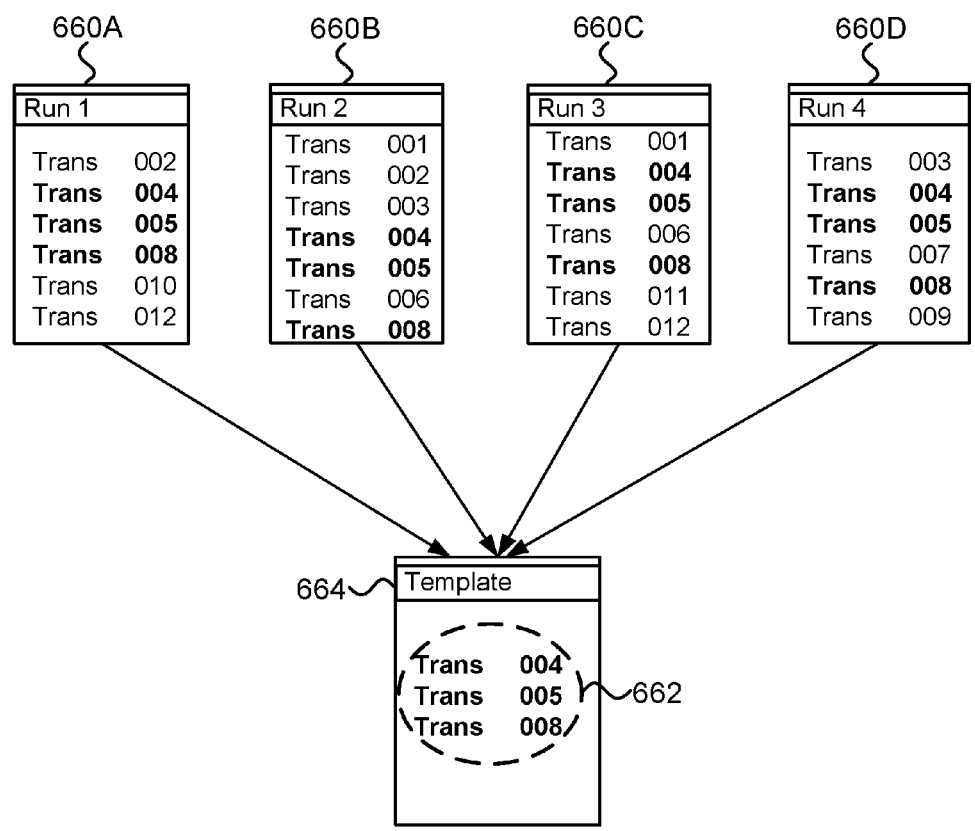
FIG. 13 illustrates generation of a test scenario template from a subset of test steps that is frequently executed as part of running test scenarios.

FIG. 13 illustrates generation of a test scenario template 664 from a subset of test steps 662 that is frequently executed as part of running test scenarios. In this illustration, each test step corresponds to a transaction executed when running a test scenario. Thus, transactions 001 to 012 ("Trans 001" to "Trans 012" in FIG. 13) may be considered to correspond to 12 possible test steps that may be included in the template 664. Runs of test scenarios 660A-D include multiple test steps that involve running subsets of the various transactions 001 to 012. A certain subset 662 of test steps that involve transactions 004,005, and 008 appears in each of the runs 660A-D (these transaction are emphasized in bold in the runs 660A-660D). The portions relevant to the certain subset (are taken from the runs 660A-4 and combined into test scenario template 664. Note that the test scenario template involves running only the common subset of test steps (transactions 004,005, and 008), and no other transactions executed as part of other test steps in the runs 660A-D.

Figure 14:
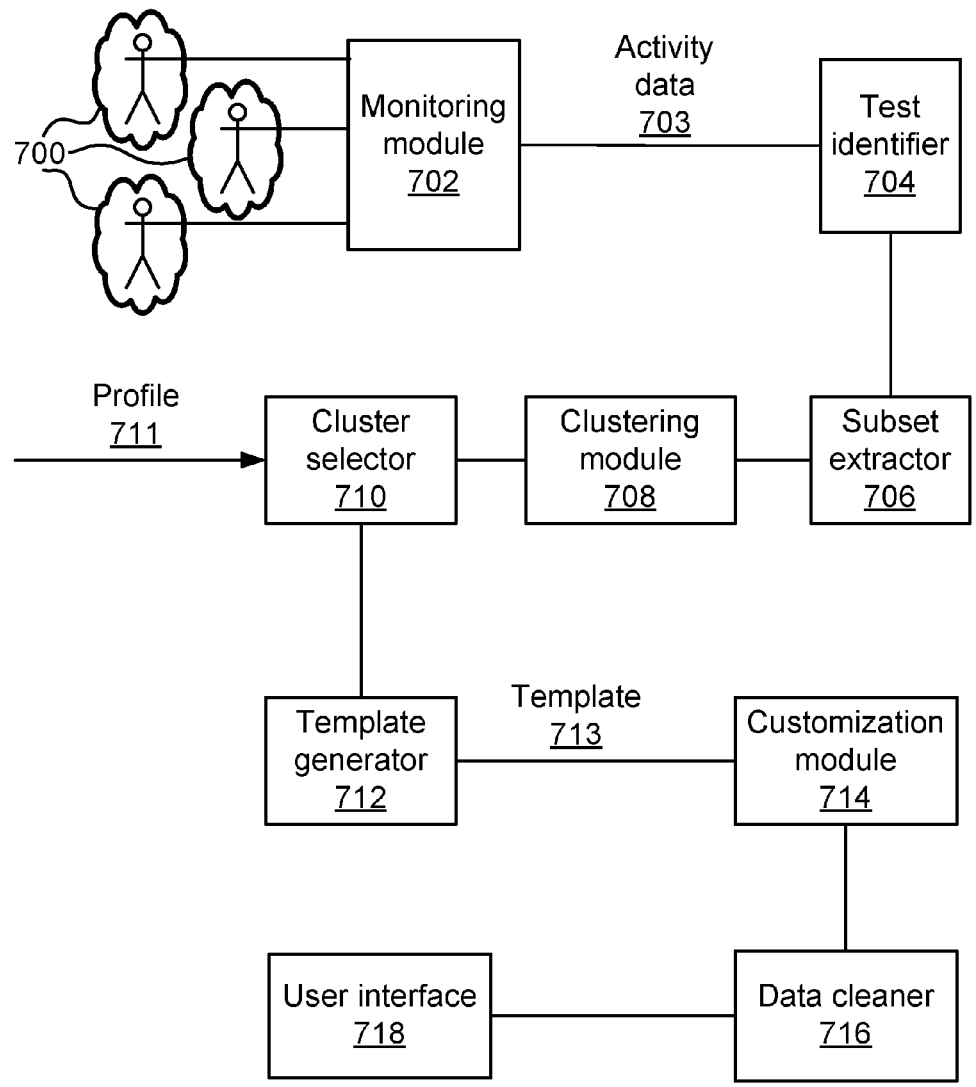
FIG. 14 illustrates one embodiment of a computer system configured to generate a test scenario template from a cluster of similar partial runs of test scenarios.
Figure 15:
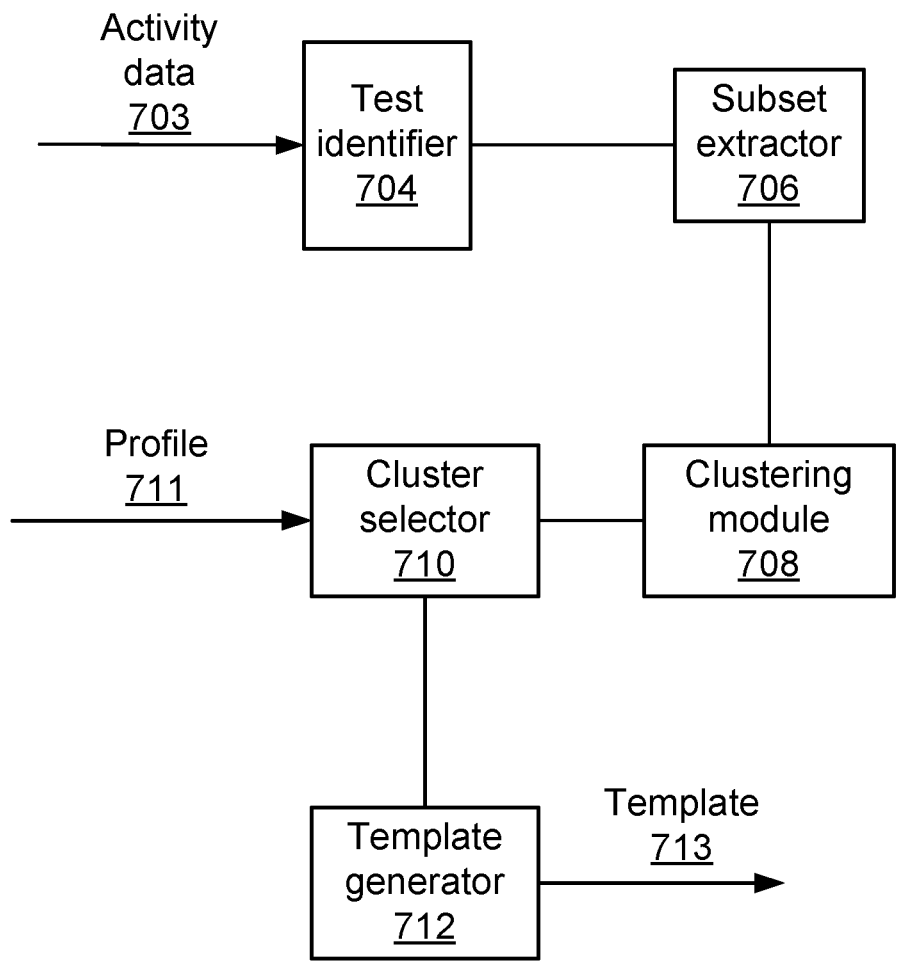
FIG. 15 illustrates one embodiment of a computer system configured to generate a test scenario template from a cluster of similar partial runs of test scenarios.

FIG. 14 and FIG. 15 illustrate embodiments of a computer system configured to generate a test scenario template from a cluster of similar partial runs of test scenarios. The computer system includes at least the test identifier 704, a subset extractor 706, a clustering module 708, a cluster selector 710, and a template generator 712.

The test identifier 704 is configured to identify runs of test scenarios run by users on software systems that belong to different organizations. Optionally, the users belong to different organizations. Optionally, the runs are identified, at least in part, from activity data 703. In one example, the identified runs include at least a first run that was run by a first user belonging to a first organization and a second run that was run by a second user belonging to a second organization, and the first organization is not the second organization and the first user is not the second user.

In one embodiment, a test scenario may be characterized as including test steps, running the test scenario may involve execution of the test steps, and a run of the test scenario may describe the test steps. Optionally, the test identifier 704 determines for at least some of the runs of the test scenarios, at least some of the test steps that are executed while running the test scenarios. Optionally, test steps may be identified by various ways, such as by a name, code, description, and/or serial number. Optionally, each run of the at least some runs, is associated with at least one subset of test steps that were executed in the run.

The subset extractor 706 is configured to receive a run of a test scenario and to generate from the run of the test scenario a partial run of the test scenario by extracting from the run of the test scenario data pertaining to a proper subset of the test steps described in the run. The partial run is a run of a test scenario that includes data from the received run of a test scenario that pertains to the test steps belonging to the proper subset of the test steps. Optionally, the extracted data pertaining to the proper subset also pertains to other test steps that do not belong to the proper subset. For example, at least some of the extracted data includes an input value used for a test step that is not in the proper subset. Optionally, the extracted data is marked as relevant to the proper subset. For example, a file containing a run of a test scenario may be associated with a record indicating certain portions of the file.

In one embodiment, a partial run is generated by parsing the received run of the test scenario and selecting certain portions of the received run to be included in the partial run. Optionally, the certain portions are related to the proper subset of the test steps. Optionally, the certain portions may undergo processing prior to being included in the partial run.

In another embodiment, a partial run is generated by processing data included in the received run of the test scenario; for example, summarizing the received run, converting representation of data in the received run (e.g., from a list of commands to a table of test steps), and/or representing data in the received run using canonical data (e.g., test steps in the received run are described by default or exemplary test steps that are similar to them). Thus, in some cases, the partial run that is generated from the received run may not necessarily contain portions of the received run as they appear in the received run.

In one embodiment, the proper subset of the test steps described in the run has a predetermined size. For example, predetermined size may be two or three. Alternatively, the proper subset may have different sizes under different circumstances. For example, the size may be proportional to the average number of test steps in the runs of test scenarios (e.g., at least 20% of the average number of test steps).

Herein, the term "proper subset" is used as follows: set A is a proper subset of set B if set B includes all elements in set A, and additionally set B includes at least one element that is not in set A.

In one embodiment, the subset extractor 706 receives an indication of which test steps are included in the run of the test scenario. For example, the indication is received from the test identifier 704. Additionally or alternatively, the subset extractor 706 may participate in the identification of at least some of the test steps that belong to the run of the test scenario.

In one embodiment, each run of a test scenario includes a sequence of test steps and the proper subset of the test steps in the run includes a subsequence of the sequence of the test steps in the run. In one example, the subsequence is a prefix of the sequence of test steps or a suffix of the sequence of test steps. In another example, the subsequence is an internal subsequence, which does not include the first or the last test steps in the sequence.

As used herein, a prefix of a sequence is a subsequence that starts with the first test step in the sequence. Similarly, a suffix of a sequence is a subsequence that ends with the last test step in the sequence.

In one embodiment, the subset extractor 706 is configured to generate from the run of the test scenario a number, greater than one, of partial runs of the test scenario. Optionally, each partial run of the number of partial runs is generated from a different proper subset of test steps. Optionally, the number of partial runs that is generated from a run of a test scenario is a fixed predetermined number. Alternatively, the number of partial runs is proportional to the number of test steps in the run of the test scenario. In one example, the number of partial runs is linear in the number of test steps in the run. In another example, the number of partial runs increases quadratically with the number of test steps in the run.

In one embodiment, the proper subset of the test steps described in the run includes at least one test step that is frequently executed when running the test scenarios. Optionally, a test step is considered frequently executed as part of running the test scenarios if the test step is described in at least a predetermined number of the runs of test the test scenarios. Additionally or alternatively, a test step may be considered frequently executed if the test step is described in runs of test scenarios that are associated with at least a predetermined number of different organizations.

The clustering module 708 is configured to receive partial runs of test scenarios generated from the runs of the test scenarios and to cluster the partial runs of the test scenarios to clusters that include similar partial runs. Optionally, the clusters may be of various sizes, and include partial runs of different users belonging to different organizations.

It is to be noted, that partial runs of test scenarios may be treated by system modules essentially the same as runs of a test scenarios would be treated, since the partial runs may include the same type of data as the runs of test scenarios and/or data derived from the runs of the test scenarios. Thus, the partial runs may be clustered utilizing the same approaches used for clustering the runs of test scenarios (e.g., algorithms, vector representation, and similarity functions). Additionally, partial runs may undergo removal of proprietary data, and/or customization, similarly to how runs of test scenarios undergo these processes. Additionally, partial runs may be utilized to generate test scenario templates similarly to how runs of test scenarios may be utilized for that purpose.

The cluster selector 710 is configured to receive a profile 711 of a first user and, based on the profile 711, to select a certain cluster, from among the clusters of partial runs, which is appropriate for the first user. Optionally, the profile 711 indicates test steps that are likely to be relevant to the first user. For example, the profile 711 may include previous runs of test scenarios of the first user and/or list specific transactions executed by the first user and/or an organization to which the first user belong. Optionally, the certain cluster contains a partial run with at least one test step that involves execution of a transaction that is not mentioned in the profile 711. Optionally, the certain cluster contains at least one partial run with a test step that involves a value that is not mentioned in the profile 711.

The template generator 712 is configured to generate a test scenario template 713 based on the first and second runs. Optionally, the test scenario template 713 identifies a transaction used in the first and second runs, and possible values for running the transaction. Optionally, the identified transaction is a transaction that was tested in both the first and second runs, and the possible values for running the identified transaction are obtained directly from the first and/or second runs, or derived from the first and/or second runs.

In one embodiment, the computer system optionally includes a customization module 714. The customization module 714 is configured to customize the test scenario template 713 for the first user by adding to the test scenario template 713 proprietary data relevant to the first user. Optionally, at least some of the proprietary data is obtained from the profile 711. Additionally, the computer system may include an optional user interface 718 configured to suggest to the first user to run an instantiation of the test scenario template.

In one embodiment, the computer system optionally includes a data cleaner 716. The data cleaner 716 is configured to remove from the template proprietary data. Additionally or alternatively, the data cleaner may be configured to remove proprietary data from the partial runs, form the runs of the test scenarios, and/or from the activity data 703. Optionally, the data cleaner 716 is also configured to remove a selected value from a run or a partial run based on at least one of: number of runs of test scenarios in which the value appears, and number of different organizations associated with the runs of the test scenarios in which the value appears. Optionally, most output fields of the first and second partial runs are removed, and as a result, the test scenario template does not include expected values for most test steps.

In another embodiment, the computer system optionally includes a monitoring module 702. The monitoring module 702 is configured monitor the users 700 that belong to the different organizations and to provide the activity data 703 obtained from monitoring the users 700 to the test identifier 704.

In one embodiment, determining whether a cluster of partial runs is suitable for the first user is based on the profile 711. Optionally, the cluster may be considered suitable for the first user if partial runs belonging to the cluster describe at least one test step that is indicated in the profile 711 as being frequently described in runs of test scenarios of the first user. Optionally, a test step is indicated as being frequently described in runs of the first user if the profile 711 indicates that it was executed a large number of times. For example, the test step was executed more than 10 times, and/or in more than 5% of the runs. Optionally, a test step is indicated as being frequently described in runs of the first user if the profile 711 includes a large number of runs of test scenarios that describe the test step as being executed in the test scenarios. For example, the test step is described in 5% of runs that are included in the profile 711 and/or at least 17 different runs included in the profile 711.

In another embodiment, a cluster of partial runs is suitable, based on the profile 711, for the first user if partial runs belonging to the cluster utilize at least one value included in the profile 711 of the first user. For example, if the profile 711 indicates that the first user access an external database, a cluster that includes partial runs that have a test step that involves the same external database (e.g., by reading from it or writing to it), may be considered suitable for the first user.

In yet another embodiment, a cluster of partial runs is suitable, based on the profile 711, for the first user if partial runs belonging to the cluster include a frequently described subset of test steps. Additionally, the profile 711 indicates that at least one test step belonging to the subset is utilized by the first user. For example, the at least one test step is described in runs of test scenarios included in the profile 711. In another example, one or more similar test steps to the at least one test step are described in runs of test scenarios included in the profile 711. Optionally, a subset of test steps may be considered frequently described if the test steps included in the subset are described in at least a predetermined number of the partial runs. For example, the predetermined number may be 10 or 5% of the partial runs. Optionally, a subset of test steps may be considered frequently described if the test steps included in the subset are described in partial runs associated with at least a predetermined number of different organizations. For example, the predetermined number may be 3 or 10% of the different organizations.

It is to be noted that different embodiments may implement components of the computer systems illustrated in FIG. 14 and/or FIG. 15 in different ways. For example, in some embodiments one or more of the following may be implemented utilizing the same software modules, and/or software modules running on the same server: the monitoring module 702, the test identifier 704, the subset extractor 706, the clustering module 708, the cluster selector 710, the template generator 712, the customization module 714, the data cleaner 716, and the user interface 718. Additionally, one or more of the aforementioned components may be implemented on a remote server, such as a cloud-based server.

In one example, subset extractor 706 and the clustering module 708 are both implemented as software running on the same server. Optionally, the clustering module 708 extracts subsets and generates partial runs prior to clustering. In another example, the cluster selector 710 and the template generator 712 are realized by the same software module, which receives the profile 711 and generates the template 713. In another example, the subset extractor 706, the clustering module 708, the cluster selector 710, and the template generator 712 are implemented as a cloud-based service that receives runs of test scenarios run by the users 700 belonging to the different organizations, and generates templates that may be offered new users. In this example, the data cleaner 716 and/or the customization module 714 may also be part of the cloud-based service, and may be used to prepare a template to be utilized by users. Optionally, each of the customization module 714 and the data cleaner 716 may be implemented as modules of the template generator.

In one embodiment, the template 713 undergoes customization by the customization module 714 prior to removal of proprietary data from the template 713 by the data cleaner 716. In another embodiment, the order is reversed: proprietary data is removed from the template 713 by the data cleaner 716, and then the template 713 is customized by the customization module 714. In still another embodiment, customizing the template 713 and removing proprietary data from it are performed by the same software module. Optionally, the software module utilizes the profile 711 to determine which proprietary data needs to be removed from the template 713, and which proprietary data should be added to the template 713 when customizing it.

Figure 16:
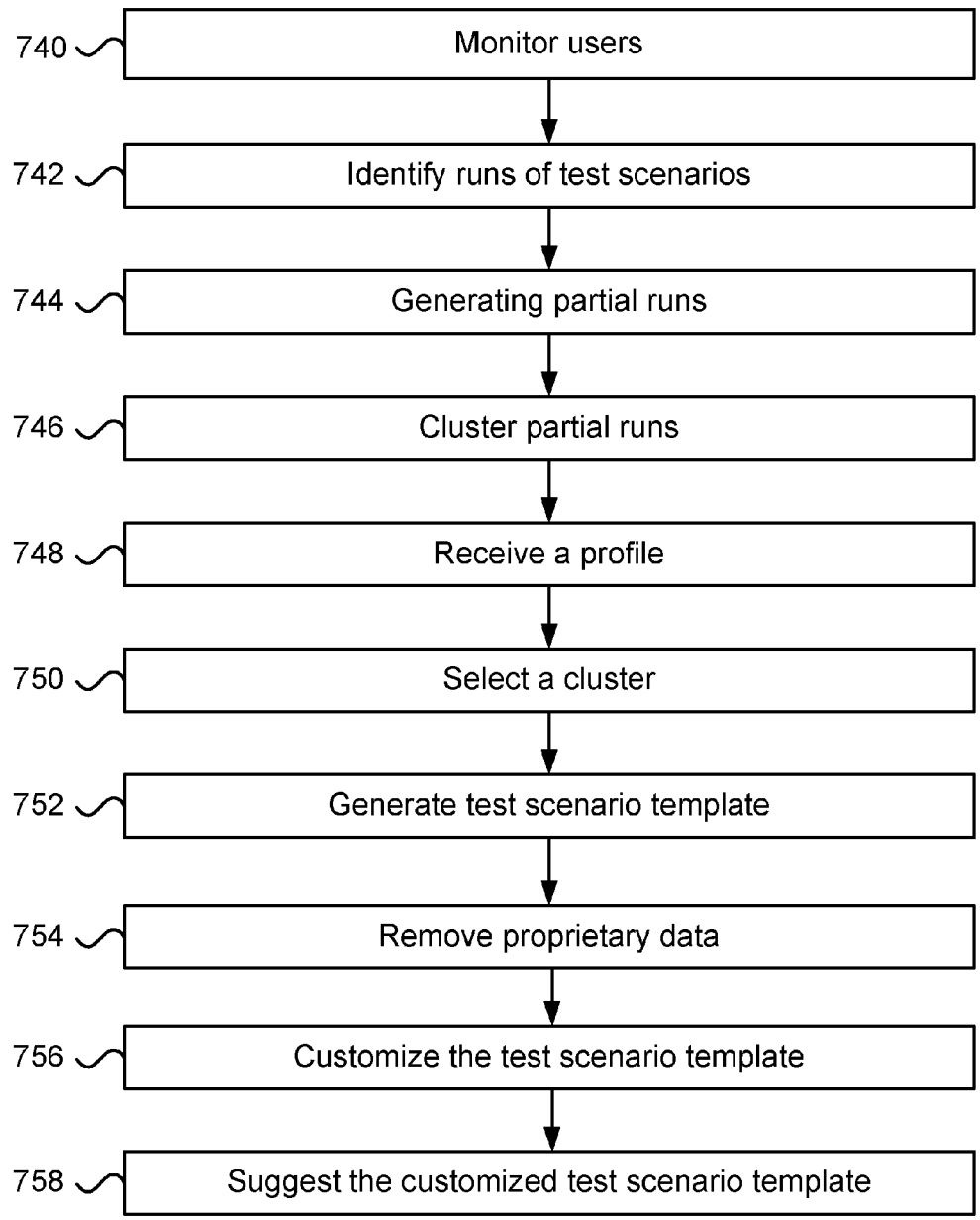
FIG. 16 illustrates one embodiment of a computer implemented method for generating a test scenario template from a cluster of subsets of test steps taken from runs of test scenarios.

FIG. 16 illustrates one embodiment of a computer implemented method for generating a test scenario template from a cluster of subsets of test steps taken from runs of test scenarios. The illustrated embodiment includes the following steps:

In step 742, identifying runs of test scenarios run by users on software systems that belong to different organizations. Each run of the identified runs of a test scenario describes test steps.

In step 744, generating partial runs of the test scenarios by extracting from each run of a test scenario data pertaining to a proper subset of the test steps described in the run. Optionally, a partial run is itself a run of a test scenario. Optionally, a partial run generated from a run of a test scenario includes information taken from the run that pertains to the test steps belonging to the proper subset of the test steps. Optionally, the proper subset of the test steps in the run has a predetermined size, such as two or three. Optionally, each run of a test scenario includes a sequence of test steps and the proper subset of the test steps in the run includes a subsequence of the sequence of the test steps in the run. Optionally, the subsequence is a prefix of the sequence of test steps or a suffix of the sequence of test steps.

In step 746, clustering the partial runs of the test scenarios into clusters of similar partial runs. Optionally, the clustering involves processing one or more of the following logged activities: a list of users who ran the test scenarios, an analysis of access to a database, messages returned from executed transactions, values returned by fields, and procedures utilized by a test scenario.

In step 748, receiving a profile of a first user.

In step 750, selecting, based on the profile, from among the clusters a certain cluster suitable for the first user. Optionally, the certain cluster includes a first partial run of a first test scenario that is associated with a first organization belonging to the different organizations, and a second partial run of a second test scenario that is associated with a second organization belonging to the different organizations.

And in step 752, generating a test scenario template based on the first and second partial runs. Optionally, the test scenario template identifies a transaction used in the first and second partial runs, and possible values for running the transaction. Optionally, at least one of the possible values for running the transaction does not appear in each of the first and second partial runs. Optionally, the test scenario template includes a combination of the possible values, and the combination does not appear in any of the first and second partial runs.

In one embodiment, the computer implemented method optionally includes an additional step 740, which involves monitoring the users belonging to different organizations and providing data collected in the monitoring for the identifying of the runs of test scenarios.

In one embodiment, the computer implemented method optionally includes an additional step 756, which involves customizing the test scenario template for the first user by adding to the test scenario template proprietary data relevant to the first user. In one example, customizing the test scenario template involves obtaining a value from a run of a previously monitored test scenario associated with the first user, and substituting a non-empty subset of the removed proprietary data with the obtained value. In another example, customizing the test scenario template involves parsing a manual test scenario associated with the first user in order to obtain a value associated with the first user, and substituting a non-empty subset of the removed proprietary data with the obtained value. In yet another example, customizing the test scenario template involves analyzing a database of the software system associated with the first user to obtain a value associated with the first user, and substituting a non-empty subset of the removed proprietary data with the obtained value.

In one embodiment, customizing the test scenario template involves: providing the customized test scenario template to a second user, prompting the second user to provide a missing value, and recording an input value provided by the first user. Optionally, the first user and the second user may be the same user.

In one embodiment, the computer implemented method may include an optional step 758 involving suggesting to the first user to run an instantiation of the test scenario template. For example, the user interface 718 may utilized to present the template to the first user.

In one embodiment, the computer implemented method optionally includes step 754, which involves removing proprietary data associated with at least one of the different organizations from at least one of the partial runs of test scenarios. Optionally, most output fields of the first and second partial runs are removed, and as a result, the test scenario template does not include expected values for most test steps. Additionally or alternatively, the computer implemented method may also include a step of removing proprietary data associated with the first organization from the first partial run. Additionally or alternatively, the computer implemented method may also include a step of removing proprietary data associated from at least one of the first organization and the second organization from the test scenario template.

In one embodiment, generating the partial runs in step 744 involves generating from the received run a number greater than one of partial runs of the test scenario; each partial run of the number of partial runs is generated from a different proper subset of test steps. Optionally, the number of partial runs is a fixed predetermined number. Alternatively, the number of partial runs is proportional to number of the test steps in the run of the test scenario.

In one embodiment, clustering partial runs of test scenarios ins step 746 involves processing one or more of the following logged activities: a list of users who ran the test scenarios, an analysis of access to a database, messages returned from executed transactions, values returned by fields, and procedures utilized by a test scenario.

In one embodiment, similar partial runs of test scenarios are characterized by having at least one of: essentially the same fields, essentially the same field values, similar combinations of fields, similar combinations of field values, similar execution of transactions, similar user interactions, similar requests, similar calls to procedures, similar executions.

In one embodiment, the clustering of the partial runs to clusters that include similar partial runs of test scenarios is based on counting the number of similar fields used in screens corresponding to the runs; the more similar fields, the more similar the runs of the test scenarios are considered to be.

In another embodiment, the clustering of the partial runs of test scenarios to clusters that include similar partial runs of test scenarios is based on similarity between order of displaying similar fields in screens corresponding to the runs; the closer the orders, the more similar the runs are considered to be.

In yet another embodiment, the clustering of the partial runs of test scenarios to clusters comprising similar partial runs is based on similarity between executed procedures associated with the test scenarios. Optionally, the clustering is also based on the order of executing the procedures. Optionally, the clustering is also based on transactions executed as part of the runs of test scenarios.

In one embodiment, a non-transitory computer-readable medium stores program code that may be used by a computer to generate a test scenario template from a cluster of similar partial runs of test scenarios. The computer includes a processor, and the non-transitory computer-readable medium stores the following program code:

Program code for identifying runs of test scenarios run by users on software systems that belong to different organizations; each run of a test scenario describes test steps.

Program code for generating partial runs of the test scenarios by extracting from each run of a test scenario data pertaining to a proper subset of the test steps described in the run. Optionally, a partial run is itself a run of a test scenario. Optionally, a partial run generated from a run of a test scenario includes information taken from the run that pertains to the test steps belonging to the proper subset of the test steps. Optionally, the proper subset of the test steps in the run has a predetermined size, such as two or three. Optionally, each run of a test scenario includes a sequence of test steps and the proper subset of the test steps in the run includes a subsequence of the sequence of the test steps in the run. Optionally, the subsequence is a prefix of the sequence of test steps or a suffix of the sequence of test steps.

Program code for clustering the partial runs of the test scenarios into clusters of similar partial runs.

Program code for receiving a profile of a first user.

Program code for selecting, based on the profile, from among the clusters a certain cluster suitable for the first user; the certain cluster comprises a first partial run of a first test scenario that is associated with a first organization belonging to the different organizations, and a second partial run of a second test scenario that is associated with a second organization belonging to the different organizations. Optionally, the first user is not associated with at the first organization and the first user is not associated with the second organization.

And program code for generating a test scenario template based on the first and second partial runs.

In one embodiment, the non-transitory computer-readable medium optionally stores program code for monitoring activity of the users on software systems belonging to the different organizations and providing data obtained from the monitoring to be used in the identifying of the runs of the test scenarios.

In one embodiment, the non-transitory computer-readable medium optionally stores program code for suggesting to the first user to run an instantiation of the test scenario template.

In one embodiment, the non-transitory computer-readable medium optionally stores program code for removing proprietary data associated with at least one of the different organizations from at least one of the runs of test scenarios. Additionally or alternatively, the non-transitory computer-readable medium may optionally store program code for removing proprietary data associated with the first organization from the first partial run. Additionally or alternatively, the non-transitory computer-readable medium may optionally store program code for removing proprietary data associated from at least one of the first organization and the second organization from the test scenario template.

In one embodiment, the non-transitory computer-readable medium optionally stores program code for customizing the test scenario template for the first user by adding to the test scenario template proprietary data relevant to the first user.

In one embodiment, the program code for clustering includes program code for processing one or more of the following logged activities: a list of users who ran the test scenarios, an analysis of access to a database, messages returned from executed transactions, values returned by fields, and procedures utilized by a test scenario.

Monitoring Users and Identifying Runs

Some of the disclosed embodiments involve software systems that may be characterized as being data-oriented large-scale software systems. Examples of data-oriented large-scale software systems include Enterprise Resource Planning (ERP), such as from the following trademarks: SAP, Oracle Application, The Sage Group, Microsoft Dynamics, and SSA Global Technologies; billing systems (also known as revenue management) such as from the following trademarks: Amdocs, Comverse Inc., and Convergys Corporation; service management systems; and portfolio management systems. Installing, upgrading, and/or maintaining such systems require running many tests in order to validate the systems' behavior.

In this disclosure, users are often referred to as being monitored. This monitoring typically concerns activity of the user on a software system being tested. A monitored user may be a human (e.g., performing a certain test) and/or a system module (e.g., a module initiating the running of a certain procedure).

In one embodiment, a test scenario refers to a functional and/or a technical specification for testing a business process and/or one or more transactions. A test scenario may specify how to test one or more business processes, business requirements, test conditions, logical data, and/or expected results of tests.

In one embodiment, runs of test scenarios are identified and/or obtained based on data collected from monitoring users. For example, monitoring of a user may involve collection of data related to inputs provided by a user to a system, along with the transactions that were run, and results of the transactions. This data may be used to identify runs of test scenarios that describe test steps taken by a user and a result of executing the test steps on the software system.

In another embodiment, monitoring a user is done in order to obtain activity data of a user on a software system. The activity data may include data related to inputs provided by the user and/or other sources to the software system, outputs generated by the software system, and/or intermediate values generated by the software system (e.g., temporary files generated by the system, network traffic of the system, and/or content of memory belonging to the system). Optionally, the activity data may be utilized in order to identify runs of test scenarios.

In some embodiments, users perform at least part of their interaction with a software system via a user interface that includes a display that displays screens. Optionally, a screen may refer to a presentation of a certain form through which a user may access, modify and/or enter data. Optionally, a screen includes one or more fields. Optionally, a field may have a certain name and/or identifier. Optionally, a field may have an associated value, which may be referred to herein as a "field value". The field value may or may not be presented on the screen. Optionally, the user is able to edit certain field values, while other field values may not be editable by the user. Optionally, certain field values may be required values, which the user must enter before completing a screen. Optionally, field values from a screen may correspond to one or more database entries. For example, a screen displaying customer details (e.g., name, address, telephone number) may correspond to a record of the customer in a customer database.

In one embodiment, monitoring users involves monitoring certain transactions and/or business processes that were executed by the users, as part of running test scenarios. Optionally, monitoring users may involve monitoring which programs executed by the users, along with invocation values of the users and/or return values of the programs.

In one embodiment, monitoring a user may involve recording and/or processing inputs the user provides to the software system (e.g., via a keyboard, mouse click, visual cue). Additionally or alternatively, the inputs may include digital data transmitted to the system (e.g., a file of digital data). In another example, monitoring a user may involve recording and/or processing outputs generated by the software system. Such outputs may include, values presented on a screen, written in a file, printed, and/or provided in the form of auditory cues. The outputs may be presented to the user and/or provided to other recipients. In yet another example, monitoring a user may involve utilization of internal state data of the software system; data that may not have been directly provided by the user and may also not be directly provided to the user (e.g., memory content, database activities, and/or network traffic).

In some embodiments, users performing tests may be given instructions and/or scripts describing some of the steps involved in a certain test (e.g., which procedures to run, what buttons to push, and/or what values to provide the system). Optionally, such instructions and/or scripts may be given in electronic form (e.g., a computer file or instructions on a screen) and may be recorded and/or processed as part of monitoring a user.

As described in some embodiments in this disclosure, monitoring a user running test scenarios on a software system may be performed by a monitoring module. Optionally, the monitoring module is, and/or utilizes, a software module that interacts with the software system on which the test scenarios are run, in order to obtain data related to activity of the user on the software system. Optionally, the monitoring module is implemented, at least in part, as part of the software system. For example, the monitoring module may include one or more programs that are part of a distribution of the software system. Additionally or alternatively, the monitoring module may be implemented, at least in part, separately from the software system. For example, the monitoring module may include programs that are not part of the software system (e.g., not included in a distribution of the software system). In another example, the monitoring module may include programs that run on hardware that does not run the programs belonging to the software system; e.g., the monitoring module may run programs on different servers than servers on which the software system runs programs. Optionally, the monitoring module is implemented, at least in part, on hardware remote from hardware that runs the software system. For example, a software system may run on hardware located at a certain organization, while the monitoring module may run, at least in part, on remote cloud-based servers that are not associated with the certain organization.

In some embodiments, the monitoring module may receive data from the software system that is intended for the monitoring module (e.g., the software system may explicitly send the monitoring module data describing activity on the software system). Additionally or alternatively, the monitoring module may intercept and/or examine data of the software system that is not intended primarily for the monitoring module. For example, the monitoring module may sniff network traffic that involves message exchange between modules of the software system as part of the normal operation of the software system.

In some embodiments, a run of a test scenario may include identifiers of business processes, transactions, and/or system commands that were executed while running the test scenario. Additionally or alternatively, a run of a test scenario may include values that were provided to a software system (e.g., input values in a screen), values generated by the software system (e.g., outputs from a transaction), and/or internal values of the software system (e.g., intermediate values generated by a transaction). Additionally or alternatively, a run of a test scenario may include state information about systems involved in running the test scenario (e.g., the state of certain system resources, and/or performance data such as CPU load or network congestion), and/or information about a user running the test scenario (e.g., organization affiliation, department, job title, permissions). Optionally, a certain test step, transaction, command or procedure is said to be described and/or included in a run of a test scenario if the run of the test scenario indicates that the certain test step, transaction, command, or procedure was executed as part of running the test scenario. Optionally, examining the run of the test scenario may reveal a value associated with the certain test step, transaction, command, or procedure. Additionally, examining the run of the test scenario may reveal a behavior of the system with respect to the certain test step, transaction, command, or procedure. For example, a run of a test scenario may indicate whether or not a certain transaction, involved in the running of the test scenario, produced an error message.

In one embodiment, identifying a run of a test scenario from data obtained from monitoring one or more users is done as part of the process of monitoring the users. For example, a user may be monitored for a session, which is a certain period of time that corresponds to running of a certain test scenario. Each session may start when the running of the certain test scenario starts (e.g., when a first screen is presented to a user), and may end when the running ends (e.g., after the user enters a last value involved in the test scenario). Thus, any data recorded during the session may be easily identified as belonging to a run of the certain test scenario.

In one embodiment, the action of monitoring a user and the action of identifying a run of a test scenario from data obtained from the monitoring are performed separately. For example, monitoring may generate bulk data corresponding to activity of one or more users. Identifying runs in the bulk data may require parsing the data to identify certain portions of interest, such as transactions executed by each of the users and/or inputs and outputs of each of the users. In one example, identifying runs involves detecting in the data obtained from monitoring signals that denote a start and/or end of a run. Optionally, the signals may be explicit, such as explicit tags in the data that denote a start of running a test and/or end of running a test scenario. Alternatively or additionally, the signals may be implicit. For example, a user entering data after not doing so for a while may signal a start of a run; while having a user stop entering data, and not entering further data for a prolonged period may signal an end of a run. In another example, the fact that a user performs a certain transaction may signal a start of a run, such as entering data in a screen labeled "begin new client record". Similarly, certain transactions may signal an end of a run, such as entering data in a screen labeled "finalize new client". In yet another example, identifying a run of a test scenario may involve selecting certain types of data and/or amounts of data that are to be included in the run. For example, while monitoring a user may involve collection of various types of data, in a certain system, runs of test scenarios may include only descriptions of screens presented to a user while interacting with the certain system. Thus, in this example, identifying runs may involve identifying and retaining descriptions of screens.

The process of identifying runs of test scenarios of a certain user may utilize, in some embodiments, data collected from other users. For example, determining boundaries of a test scenario, such as determining at what screen a run of the test scenario typically starts, and at what screen it ends, may be based on examination of data obtained from multiple users. In the examination of the data, certain common screens that appear in data from multiple users may be detected, and runs of test scenarios may be restricted to begin and/or end with a description of at least one of the common screens. Alternatively or additionally, identifying runs of test scenario run by a certain user, may involve examination of data obtained primarily from monitoring the certain user.

As described in some embodiments in this disclosure, identifying runs of test scenarios run by users on software systems may be performed by a test identifier. In some embodiments, the test identifier receives data from the monitoring module. Optionally, the test identifier and monitoring module are realized by the same software module and/or same hardware. In one example, one program may perform at least some of the operations involved in monitoring the users and identifying the runs. In another example, programs that perform at least some of the operations involved in monitoring the users and identifying the runs of test scenarios, run on the same servers.

In one embodiment, the monitoring module runs, at least in part, on hardware that is different from hardware on which at least some of the actions of the test identifier are performed. For example, a monitoring module that monitors users belonging to a certain organization may run, at least in part, on servers belonging to the certain organization. However, a test identifier, which receives data from the monitoring module, may run on remote servers belonging to, or controlled by, a different organization, such as an organization that provides analysis services to the certain organization.

Crowd Testing Data

Some aspects of this disclosure involve utilization of runs of test scenarios run by users belonging to, or associated with, different organizations. Optionally, a group of users running test scenarios may be referred to as a "crowd" or "crowd users". Optionally, crowd users do not run test scenarios in a coordinated effort, such as users belonging to different organizations that do cooperate to run test scenarios to test a certain software system that belongs to a certain organization, or users making a coordinated effort to test certain aspects of their software systems. Rather, as typically used in this disclosure, the users belonging to the different organizations run test scenarios to test software systems of their respective organizations, and do so essentially independently of each other.

In some embodiments, a first organization and second organization are considered different organizations if the first organization has a different ownership structure (e.g., a different composition of shareholders) than the second organization. Additionally or alternatively, two organizations may be considered different organizations if they have different employees, and/or different members of management.

In one embodiment, a user may be considered to belong to an organization and/or may be considered to be associated with the organization, if the user has a certain relationship with the organization such as being an employee of the organization, a member of the organization, and/or contracted to work for the organization. Additionally or alternatively, a user may belong to an organization, and/or be associated with the organization, if the worker performs work that is directly or indirectly done on behalf of the organization. For example, an employee of a first organization may be considered associated with a second organization if the employee runs, as part of her duties, tests that involve a system of the second organization. As used herein, the terms "associated" and "belongs" may be used interchangeably when referring to a user being associated with an organization or a user belonging to an organization.

Some aspects of this disclosure involve utilization of runs of test scenarios run on software systems belonging to different organizations and/or associated with the different organization. Optionally, a software system may be considered to belong to a certain organization and/or may be considered to be associated with a certain organization if the software system runs, at least in part, on hardware belonging to the organization and/or paid for by the organization (e.g., software running on cloud-based servers billed to the organization). Additionally or alternatively, a software system may be considered to belong to an organization and/or be associated with the organization if a user from the organization runs test scenarios, which run at least in part, on the software system. As used herein, the terms "associated" and "belongs" may be used interchangeably when referring to a software system being associated with an organization or a software system belonging to an organization.

Some embodiments in this disclosure involve monitoring multiple users belonging to different organizations. In some embodiments, each user belongs to a single organization. For example, 100 different users may belong to 30 different organizations; some organizations may have a single user that belongs to them, while other organizations have multiple users that belong to them. In some embodiments, users may belong to more than one organization. For example, 100 different users may belong to 150 different organizations; in this example, some of the users belong to more than one different organization.

In the embodiments, some of the systems on which test scenarios are run may be data-oriented large-scale software systems. Optionally, the software systems are packaged applications having multiple modules. Optionally the software systems may be considered similar to each other if the software systems use in a similar manner one or more modules of the same type (possibly having different versions). Additionally or alternatively, the software systems may be considered similar if they contain one or more modules with a similar function (e.g., modules that manage sales, stocking, or human resources).

In some embodiments, analyzing runs of test scenarios obtained from monitoring running of test scenarios by a crowd of users, on software systems of multiple organizations, may help gain certain insights that may not be easily attained from analysis obtained from runs associated with a single organization. For example, runs of test scenarios obtained from monitoring a crowd may help gain insight into the general applicability of certain test scenarios and/or test steps for testing certain components of the systems, such as modules, business process, and/or transactions. Based on the fact that multiple organizations run test scenarios to test certain components, it may be postulated that a different organization should also run similar test scenarios; this may be especially true if the different organization is in the same field of operations as the multiple organizations.

In some embodiments, analyzing runs of test scenarios obtained from monitoring running of test scenarios on systems of multiple organizations may also help gain insight into the commonality of certain aspects of the systems, as indicated by their reoccurrence in the runs. Such insight may be used, in some embodiments, to deduce whether a certain aspect is particular to a single organization, or a small number of organizations from the multiple organizations. Alternatively, it may be deduced, the certain aspect may be rather general and may be associated with a relatively large portion of the multiple organizations. For example, runs of test scenarios associated with multiple organizations may include a field which is given a value in each run of the test scenarios. If a certain value is entered in a large proportion of the runs (the same certain value is entered in each run of the large proportion or runs), then the value may be considered a default value or a general value. In this case, knowing the certain value may not assist much to identify a specific organization which is associated with a run from which the certain value was taken. However, if a certain value appears only in runs of a single organization, or in a small proportion of the runs, then the value may be considered a unique and/or proprietary value. In this case, knowing the certain value may assist to identify a specific organization which is associated with a run from which the certain value was taken. Thus, in some embodiments, monitoring runs of test scenarios associated with multiple organizations may help discover non organization-specific default values that can be used for running test scenarios of other organizations. Additionally, the same analysis may help identify what data in the runs may be considered proprietary.

Clustering Runs of Test Scenarios

In some embodiments, runs of test scenarios may be clustered. Clustering the runs may involve assigning a run of a test scenario to at most one cluster (e.g., "hard clustering" or partitioning). Alternatively, the clustering may involve assigning a run of a test scenario to one or more clusters. For example, the clustering may be "soft clustering" in which a run of a test scenario may belong to various clusters, possibly with different probabilities or levels of association to each cluster. Optionally, clusters of runs contain runs that are similar to each other.

In one embodiment, runs of test scenarios may be partitioned into clusters based on one or more values from the runs of test scenarios. For example, runs that involve a same start and/or end test step may be placed in the same cluster (e.g., runs that start from the same screen ID and end with an error are placed in the same cluster). In another example, runs that have a certain field (e.g., customer bank account number) are placed in the same cluster.

Clusters of runs of test scenarios may have different characteristics in different embodiments. In one embodiment, a cluster of runs of test scenarios should be of a size that reaches a predetermined threshold. Optionally, the predetermined threshold is greater than one. For example, each cluster should contain at least 3 runs. Optionally, the predetermined threshold is proportional to the number of runs being clustered. For example, each cluster may be required to contain at least 0.1% of the runs of test scenarios being clustered.

Clusters of runs may also be constrained according to the source of the runs belonging to the clusters. In one embodiment, a cluster of runs of test scenarios must include runs of at least a first predetermined number of different users and/or of users belonging to at least a second predetermined number of organizations. Optionally, the first predetermined number is greater than one and/or the second predetermined number is greater than one. In one example, the first predetermined number is 10, and the second predetermined number is 2; thus, each cluster includes at least 10 runs, and not all those runs are associated with the same organization. In another example, the first predetermined number is 5, and the second predetermined number is 5; thus, each cluster needs to contain runs associated with at least 5 organizations.

In one embodiment, ensuring that clusters of runs have certain characteristics, such as a certain size and/or include runs of a certain source, is done by a clustering algorithm that generates the clusters. For example, the clustering algorithm may ensure that each cluster includes runs of test scenarios of at least a predetermined number of users. Alternatively or additionally, ensuring that clusters of runs have certain characteristics may be done after clustering. For example, after clusters are generated, they may be filtered to remove clusters that have a size that is smaller than a predetermined threshold.

In one embodiment, clustering of runs of test scenarios may involve procedures that rely on some runs being similar based on a criterion of similarity. Optionally, a cluster of runs may include similar runs. Optionally, by similar runs it is meant that two runs are similar to each other according to the criterion. Optionally, by similar runs it is meant that at least a certain percentage of the runs belonging to a cluster are similar to each other according to the criterion. For example, a cluster may be considered to include similar runs if 90% of the pairs of runs in the cluster are similar according to the criterion. Optionally, by similar runs it is meant that runs belonging to the cluster are all similar to a representative of the cluster, such as one of the runs belonging to the cluster or an average run of the cluster (e.g., a centroid of the cluster).

The criterion according to which similarity between runs may be established, may have several forms. For example, the criterion for similarity between runs may be that similar runs include at least one of: essentially the same fields, similar combinations of fields, similar execution of transactions, similar user interactions, similar requests, similar test steps, and/or similar calls to procedures. Optionally, similarity between runs of test scenarios may be determined based on properties of their respective test scenarios of which the runs are instantiations; for example, by comparing the test steps used in each test scenario.

In one example, various runs of essentially the same test scenario (e.g., essentially the same testing script) are considered similar. In another example, runs of different test scenarios (e.g., using slightly different testing scripts), may be considered similar if certain similarity criteria are met (e.g., similar fields types or names, similar field values, similar screen content and/or layout, and/or similar return values in the runs). In yet another example, runs of test scenarios are considered similar, if the test scenarios from which they were instantiated are similar (e.g., involve similar screens, similar fields, and/or similar field values).

In one example, at least part of the runs of test scenarios involve software that runs on remote servers such as cloud-based servers. Monitoring a user running a test scenario may involve monitoring the content of the network traffic, such as information exchanged between an input and/or output device of the user and a cloud-based server. In this example, runs of test scenarios may be considered similar if the network traffic associated with them is similar (e.g., it follows a similar exchange sequence, and/or content of the network traffic is similar).

In one embodiment, clustering runs of test scenarios to clusters that include similar runs may be based on counting the number of similar fields used in corresponding screens that are included in the test scenarios; the larger the number of similar fields in the test scenarios, the more similar the runs of the test scenarios are considered to be. Optionally, fields may be considered similar if they include the same type of data. Additionally or alternatively, fields that have the same values are considered similar to each other. In one example, fields that include both the same type of data and the same values are considered more similar to each other than fields that have the same type of data (but different values).

In one embodiment, a type of data of a field is determined according to the context of the field in the screen. For example, if a field is preceded on a screen by the words "amount" or "sum due", the field is considered to be numerical; while if the field is preceded on a screen by the words "address" or "ship to", it is considered to be a string. Additionally or alternatively, the type of data of a field may be determined according to the features of the data structure representing the data. For example, if the field stores data in a variable that holds integers or floating-point values, the type of data is considered to be numerical. However, if the field stores data in an array, or vector of characters, the data type is considered to be a string. Additionally or alternatively, the type of data of a field may be determined according to meta data associated with a screen or database associated with the field. For example, a description of a column, in a database table which is to receive data from a field may be indicative of the type of data. In another example, meta data tags (e.g., XML tags) associated with a screen may indicate the type of data.

In another embodiment, clustering of runs of test scenarios to clusters that include similar runs of test scenarios may be based on similarity between orders of displaying similar fields in corresponding screens. The closer the order of presentation of similar fields in test scenarios, the more similar runs of the test scenarios are considered to be. In one example, test scenarios are represented, at least in part, as a sequence of field types, and/or fields IDs. The similarity between two runs of test scenarios may be determined to be inversely proportional to the number of editing steps that need to be taken to transform one sequence of identifiers to another ("edit distance"); the lower the edit distance between representations of two runs, the more similar they are considered to be (and so are their corresponding runs).

In yet another embodiment, clustering of runs of test scenarios to clusters that include similar runs may be based, at least is part, on similarity between executed procedures that are described in the runs. For example, the larger the overlap in the corresponding sets of procedures performed by each test scenario, the more similar runs of the test scenarios are considered to be. Optionally, the clustering may be further based on the order of the execution of the procedures; the closer the order of execution of procedures in different test scenarios, the more similar runs of the test scenarios are considered to be. In cases in which test scenarios involve execution of essentially the same procedures in essentially the same order, the similarity between runs of the test scenarios may be considered to be high.

In still another embodiment, the clustering of runs of test scenarios to clusters that include similar runs of test scenarios may be based on transactions described as executed in the runs of the test scenarios. For example, test scenarios may be characterized by the individual commands run by the system as part of the test scenario. Runs of test scenarios in which similar commands are executed may be considered similar for the purpose of clustering. Optionally, a cluster of runs that contains runs that have a certain proportion of common transactions executed in all runs in the cluster is considered a cluster of similar runs. For example, if at least 50% of the transactions involved in each run in a cluster appear in all other runs in the cluster, the cluster is considered to be a cluster of similar runs.

Logged activities related to running test scenarios may also be utilized for the purpose of clustering and/or determining similarity between runs of test scenarios. For example, clustering of runs of test scenarios to clusters that include similar runs may be based on one or more of the following logged activities: a list of users who ran the test scenarios, an analysis of access to a database, messages returned from the executed transactions (e.g., valid, warning, or error messages), fields which returned values in the transactions, and/or procedures utilized by the test scenario (e.g., as identified by logs of run time analysis). The clustering may be done according to there being similarity, involving one or more of the aforementioned logged activities, between test scenarios whose runs are assigned to the same cluster. Optionally, logged activities may be represented as feature values that may be put in a vector corresponding to a run. For example, if a certain activity is performed during a run, a vector corresponding to the run has 1 in a certain position, and otherwise there is a 0 in the certain position.

Similarity of runs of test scenarios may be determined, in some embodiments, according to the test scenarios and/or templates from which the runs were instantiated. Optionally, similarity of the test scenarios and/or templates may define similarity of the runs that were instantiated from the test scenarios and/or templates; thus, runs that were instantiated from similar test scenarios and/or templates are placed in the same clusters (e.g., by the clustering module performing the clustering of the runs). Alternatively, similarity of the test scenarios and/or templates may be used as features that assist in determining similarity of runs.

In one embodiment, runs that were instantiated from the same test scenarios and/or the same templates may be considered similar. Optionally, two test scenarios and/or two templates are considered the same if they involve execution of the same test steps, screens, and/or transactions. In one embodiment, two test steps are considered the same if they perform the same exact task and include the same exact associated data, while in another embodiment the two test steps are considered the same if they perform the same task but possibly involving different associated data. For example, a first test step that involves entering a new product that is a screwdriver (with details relevant to a screwdriver) may be considered in the latter embodiment as being the same as a second test step that involves entering a new product that is a hammer (with details relevant to a hammer); however, according to the former embodiment, the first and second test steps may not be the same. Similarly, screens that include field names and field values may be considered the same in one embodiment if the field names and the field values are the same; in another embodiment, the screens may be considered the same if the field names are the same. The same logic may also be applied to transactions; in some examples transactions may be considered the same if they are completely identical, while other transactions may be considered similar if they include some of the same and/or similar elements (e.g., the transactions involve similar screens).

In another embodiment, similarity of test scenarios and/or templates is determined by comparing and/or counting similar elements in the test scenarios and/or templates. If the number and/or proportion of the similar elements reaches a predetermined threshold, then runs instantiated from the test scenarios and/or templates may be considered similar and placed by clustering in the same cluster of runs. For example, if more than 50% of the screens included in two templates are similar, then runs instantiated from the two templates may be placed by clustering in the same cluster.

In yet another embodiment, test scenarios and/or templates from which runs were instantiated may be utilized to generate feature values, which are used to determine similarity of the runs to each other. For example, a vector of features representing a run may include values extracted from a template and/or test scenario from which the run was instantiated.

Clustering of runs of test scenarios to clusters of similar runs may be based on data associated with the runs. Such data may include data describing conditions under which a run was executed. For example, the data may describe aspects of the system (e.g., data involving modules, hardware, and/or software versions). In another example, such data may pertain to a test runner, such as the role (or assumed role) of the tester in an organization, level of skill of the tester, and/or permissions granted to the tester.

In some embodiments, clustering of runs of test scenarios to clusters of similar runs is done, at least in part, according to descriptions related to the systems on which the test scenarios were run. For example, such descriptions may include configuration elements (e.g., configuration files, customization code and/or setup files). Additionally or alternatively, the descriptions may include configuration changes (e.g., addition, deletion, and/or modifications) to the configuration elements. Thus, for example, runs of test scenarios concerning modules with similar configuration files (e.g., the customization files indicate similar default procedures and/or database accesses) may be placed in the same cluster. In another example, runs of test scenarios executed as a response to similar configuration changes (e.g., as determined by the original and/or changed values involved in the configuration changes), may be placed in the same cluster based on their similar configuration changes.

In some embodiments, runs of test scenarios may be represented as vectors of features that may be converted to numerical values. For example, certain dimensions in the feature vectors may correspond to the presence or absence of certain fields, procedures, test steps, and/or transactions in a test scenario (e.g., a value of '1' is given to a feature if a field has a certain value in the test scenario, and '0' otherwise. Alternatively, a value of '1' is given to a certain feature if a certain procedure is called in the test scenario, and '0' otherwise). In another example, certain dimension in the feature vectors contain values of a certain field from a run (e.g., time, data, or price), or are derived from processing one or more field values (e.g., averaging the delivery time from multiple entries of individual delivery times entered in a screen). In yet another example, certain values in a feature vector are assigned numerical values according to categories to which values from the runs belong. For example, a sale may be categorized as "domestic" or "foreign", and accordingly be given a value of "1" or "2" in the feature vector.

Feature vector representations may be utilized in order to compute a degree of similarity between feature vectors of runs of test scenarios. For example, in cases where the feature vectors contain numerical values (or can be converted to numerical values), the distance similarity between vectors representing test scenarios may be computed using one or more of the following established distance metrics: Euclidean distance of various norms, vector dot product, cosine of angle between vectors, Manhattan distance, Mahalanobis distance, Pearson correlation, and Kullback-Leibler divergence.

In one embodiment, a cluster of similar runs includes runs that are represented by similar vectors. Optionally, similar vectors may be characterized in various ways. In one example, similar vectors are vectors whose average pairwise similarity is above a predetermined threshold (e.g., the threshold may be 0.5). Optionally, the average pairwise similarity is determined by computing the average of the dot product of each pair of vectors. In another example, similar vectors are vectors that are all similar to a certain representative vector; e.g., the vectors all within a sphere of a certain Euclidean distance from the representative.

Those skilled in the art may recognize that various clustering algorithms and/or approaches may be used to cluster runs of test scenarios into clusters that include similar runs of test scenarios. For example, the clustering may be done using hierarchical clustering approaches (e.g., bottom-up or top-down approaches) or using partition-based approached (e.g., k-mean algorithms). In addition, some of the test scenarios may have assigned clusters while others may not. In such a case, a semi-supervised clustering approach may be used such as an Expectation-Maximization (EM) algorithm.

In one embodiment, the clustering of the runs of test scenarios to clusters that include similar runs may be done utilizing a classifier that is trained to assign test scenarios to predetermined classes. Optionally, the classifier is trained on labeled training data that includes training data that includes representations of runs of test scenarios (e.g., feature vectors) and labels corresponding to clusters to which the runs are assigned. If the labels in the training data are assigned according to some (possibly arbitrary) notion of similarity between test scenarios, clusters of test scenarios that have the same label assigned by the classifier are likely to contain runs that are similar according to the notion of similarity.

Optionally, runs of test scenarios are labeled according to the module they involve (e.g., "sales", "human resources", "manufacturing"), the type of activities involved in the scenario (e.g., "accessing database", "data entering", "report generating"), fields in the test scenario (e.g., "customer ID", "part number"), properties of the test scenario (e.g., "fast", "many steps", "expensive", "includes private data"), and/or results of a run of the test scenario (e.g., "ok", "error", "access denied—permissions"). Optionally, labels may be constructed from multiple attributes. For example, a run of a test scenario may be labeled as "involve sales, no private data, access corporate database".

Optionally, labels assigned to runs of test scenarios may be generated and/or assigned manually (e.g., by a tester running a test), and/or automatically, e.g., by a procedure that analyzes a test scenario to detect attributes describing it (e.g., what modules and/or procedures it involves).

Those skilled in the art may recognize that there are many algorithms, and/or machine learning-based approaches, that may be used to train a classifier of runs of test scenarios using labeled training data. For example, some examples of the algorithms that may be used include logistic regression, decision trees, support vector machines, and neural network classifiers.

In some embodiments, clusters of runs of test scenarios may be assigned a cohesion rank that describes how close to each other are runs belonging to the cluster. A cohesion rank of a cluster may describe various aspects related to the closeness of runs of test scenarios belonging to a cluster. In one example, similarity of runs of test scenarios is related to the fields included in the screens of the test scenarios; some of the fields may be common to the screens involved in runs belonging to the cluster, and some may not. The cohesion rank may be proportional to the number of fields that are common in the runs belonging to the cluster (e.g., they belong to at least 50% of the runs in the cluster). The cohesion rank can be between two runs of test scenarios or between groups of runs of test scenarios. Optionally, the cohesion rank may be expressed via cluster metrics such as average distance from the cluster centroid or the ratio between the average radius of a cluster (intra-cluster distance) and the average distance between clusters (inter-cluster distance).

Clusters generated in the embodiments (e.g., clusters of runs of similar test scenarios) may be filtered in various ways. Optionally, the filtering may be done in order to reduce the number of clusters that need to be considered and/or retain clusters with a certain desirable property. Optionally, a test scenario template generated from a filtered cluster and/or representing a filtered cluster is not suggested to a user. Alternatively or additionally, a filtered cluster is not utilized for generating a test scenario template and/or does not have a test scenario template to represent it. Optionally, clusters are filtered according to their size. For example, clusters of runs of test scenarios that contain less than a predetermined number of runs are filtered. Optionally, clusters are filtered according to the number of their associations. For example, runs of test scenarios in a cluster may be associated with certain organizations (e.g., each run may be associated with an organization). Clusters containing runs that are associated with too few different organizations may be considered too homogenous and filtered.

Test Scenario Templates

A test scenario template may include various test steps that need to be performed by a user in order to test certain aspects of a system being tested. Optionally, in some embodiments, a test scenario template may be lacking one or more values that need to be provided in order to run a test scenario based on the test scenario template. In such a case, a user running a test scenario based on the template may be required to enter the one or more values that need to be provided, in order to complete the template of the test scenario; alternatively, the one or more values and be calculated and/or guessed. In one example, a test scenario template may describe a test scenario in which an order process is completed; the template may be lacking a customer name and product ID, and in order to run an instantiation of the template, a user may be required to enter the lacking details. In another example, a template may be of a test scenario in which rush shipping is performed; a screen presented to the user may already have the rush shipping box checked, but the user may still need to add details such the client account number and shipping address.

In one embodiment, a template may include certain values from which a user may be required to choose in order to run a test scenario instantiated from the template. For example, a template may have various values for a discount (e.g., 10%, 20%, or 50%); a user needs to choose from in order to complete a transaction that is part of the template. Optionally, the values the user may need to choose from are derived from one or more runs of test scenarios that were used to generate the template. For example, the aforementioned values of the discount are the most popular values found to be used in runs of test scenarios from which the template was generated.

In some embodiments, one or more runs of test scenarios may be used in order to generate a test scenario template to represent them. Optionally, the test scenario template is generated by a template generator module. In one example, the runs of test scenarios may belong to a cluster. Optionally, the test scenario template may identify, for its corresponding cluster, one or more transactions used by test scenarios belonging to the cluster. Additionally or alternatively, the test scenario template may identify a way of using transactions that are part of the test scenarios whose runs belong to the cluster. For example, a template may define the order of programs that are to be called, the type of actions that are to be taken by a user (e.g., what fields to fill, what buttons to push), and/or provide default values to at least some of the fields (e.g., enter default values to some fields that appear on screens that are part of test scenarios generated from the template). Additionally or alternatively, a test scenario template may identify one or more possible values that may be used to run a transaction identified by the template.

It is to be noted that phrases such as "identifies a transaction" involves any type of transaction identification, such as a transaction identification number, a name of a transaction, a description of a transaction, a screenshot of a transaction, computer code of a transaction, and/or any other method that enables a human and/or a computer to link between a possible value and a transaction. Additionally, identifying a transaction may involve noting a transaction identification. In one example, noting a transaction identification involves storing the transaction identification; for example, a template may store transaction identification numbers that are to be executed when running an instantiation of the template. In another example, noting a transaction identification involves providing the transaction identification. For example, upon a query, scanning a template may generate and/or transmit names of transactions that are stored in it.

Generating the template may involve utilizing information from a plurality of runs of test scenarios. For example, one or more test steps, commands, and/or values may be copied from at least one of the plurality of runs of the test scenarios and placed in the template. Additionally or alternatively, information contained in at least some of the plurality of runs may be analyzed in order to determine certain test steps, commands, and/or values are to be used in the template. Note that not all information in the plurality of run of the test scenario needs to be utilized to generate the test scenario template. For example, a test scenario template may include a proper subset of test steps included in certain runs. In another example, certain runs, such as certain runs in a cluster, may be disregarded when generating a template based on other runs in the same cluster.

In some embodiments, template generation may be based on information obtained from one or more test scenarios. Optionally, instantiations of the one or more test scenarios are runs of test scenarios obtained and/or identified from activity data of users. In one example, a test scenario may include a script comprising test steps, and one or more test steps from the script are included in the template. Note that the script may be one various types of media; for example, a hard copy document (e.g., paper), an electronic document (e.g., a Microsoft Word™ or a PDF document), and/or a list of computer commands (e.g., a script for an automatically run test scenario). In another example, a test scenario may include certain values that may be altered by a user running instantiations of the test scenario (e.g., the certain values may be default values). In this example, to generate the template it may be desirable to utilize a certain value from a test scenario, rather than a user-provided value from a run that is an instantiation of the test scenario.

A test scenario template may be generated based on data coming from several sources. In one embodiment, a template is based on automatic test scenarios (e.g., scripts run automatically by a program without any essential human intervention). Additionally, the template may also be based on the runs of the same test scenario. Thus, certain values in the template may come from the test scenarios, while other values may come from the runs. In another example, a template may be based on runs coming from different organizations. The template may contain certain screens coming from a first organization (e.g., as they appeared in runs associated with the first organization), while other screens in the template may come from runs associated with a second organization.

In one embodiment, a test scenario template is generated from a first run of a test scenario run by a first user and a second run of a test scenario run by a second user belonging to a second organization. Optionally, the first and second runs were obtained from monitoring of the first and second users, respectively. Additionally, the first organization may be different from the second organization and the first user is not the second user. The test scenario template generated from the first and second run identifies a transaction used in the first and second runs and one or more possible values for running the transaction. Optionally, additional runs of test scenarios, besides the first and second runs, are used to generate the test scenario template.

In one embodiment, at least one of the possible values for running a transaction in a template generated from first and second runs may be derived from values obtained from the first and/or second runs. Optionally, the at least one of the possible values for running the transaction does not appear in each of the first and second runs. For example, the at least one of the possible values is an average of a first value from the first run, and a second value form the second run, and the first value does not equal the second value. Optionally, the test scenario template includes a combination of the possible values that may be used to run the test scenario template, and the combination does not appear in any of the first and second runs. For example, a combination of possible values involves fields $f_1$ and $f_2$; the first run has values $v_1$ and $u_1$ for the fields $f_1$ and $f_2$, respectively, and the second run has values $v_2$ and $u_2$ for the fields $f_1$ and $f_2$, respectively. In addition, $v_1$ does not equal $v_2$ and $u_1$ does not equal $u_2$. In this example, if the test scenario template has a value $v_1$ for $f_1$ and $u_2$ for $f_2$, then it contains a combination of possible values that does not appear in any of the first and second runs.

In one embodiment, the first and second runs upon which a template is based, may each be manual, semi-automatic, or automatic runs of test scenarios. In one example, a test scenario template is generated from a first run of a first test scenario which is a manual test scenario and a second run of a second test scenario which is an automatic test scenario. In another example, a test scenario template is generated from a first run of a first test scenario and a second run of a second test scenario, and both the first and second runs are automatic.

In another embodiment, the first test scenario and second test scenario are the same test scenario. Thus, the first run and the second run are instantiations of the same test scenario. In this case, despite being runs of the same test scenario, the first and second runs may be different (e.g., due to different inputs provided by a user during their running). Alternatively, the first test scenario and second test scenario may be different test scenarios. Thus, the first run and the second run are runs of different test scenarios; however, the first and second runs may be similar due to similarities (despite being different) between the first and second test scenarios and/or similarities in inputs provided by the user while running the first and second runs).

In one embodiment, generating a test scenario template involves receiving multiple runs (e.g., runs belonging to a cluster of similar runs), and selecting at least a first run and a second run, from among the multiple runs, upon which the template is to be based. Optionally, the first and second runs are selected such that they belong are runs of different users and/or runs of users belonging to different organizations. Optionally, the first and second runs are runs that exhibit, on average a high similarity to the multiple runs (e.g., they are similar to a cluster centroid). Optionally, the first and second runs are selected such that other of multiple runs have a similarity to either the first run or the second run that reaches a predetermined threshold. Optionally, the first and second runs are selected according to a profile, such as a profile of a certain user. Optionally, the profile indicates transactions and/or values typically utilized by the certain user, and the first and second runs that are selected involve transactions and/or values that appear in the profile.

In one embodiment, generating a test scenario template from a cluster of runs of test scenarios involves identifying a representative run of a test scenario for the cluster, and using the representative run of a test scenario as basis for the at least one template.

In one embodiment, generating a test scenario template from a run of a test scenario may involve utilizing information from the run of the test scenario. For example, one or more test steps, commands, and/or values may be copied from the run and placed in the template. Additionally or alternatively, information contained in the run may be analyzed in order to determine certain test steps, commands, and/or values are to be used in the template. Note that not all information in the run of the test scenario needs to be utilized to generate the test scenario template. For example, the template may include a proper subset of test steps included in the run of the test scenario. Optionally, certain information in the run which may be deemed proprietary is not utilized for the template. Additionally or alternatively, certain information in the run which may be deemed proprietary is removed from the template.

In another embodiment, generating a test scenario template from runs of test scenarios (e.g., the runs belong to a cluster of similar runs of test scenarios), may involve utilizing values of a field, as they appear in runs, in order to set the value of the field in the test scenario template.

In one embodiment, the value for the field in the test scenario template is selected from the values of the field in the runs of test scenarios in the cluster. For example, the value of the field in the template is set according to the value of the field in a randomly selected run of a test scenario from the cluster.

In one embodiment, the value for the field in the test scenario template is generated by a function with one or more parameters that are set according to the values of the field in the runs of test scenarios in the cluster. Optionally, the value generated by the function is not a value found in any of the runs belonging to the cluster. For example, in order to fill the field "age" in the template, a distribution of the values of "age" in runs in the cluster may be learned, and then the value in the template may be set according to the expectation of the learned distribution or randomly drawn according to the distribution. In this example, the resulting value of "age" may not be an actual value that appears in any of the runs belonging to the cluster.

Test scenario templates may be suggested to a user so that the user may run an instantiation of the templates on a system to which the user belongs and/or is associated with. Optionally, a template may be generated from one or more runs of test scenarios associated with various organizations to which the user does not belong.

In some embodiments, a user is suggested to run a test scenario template by presenting the user with a suggestion on a user interface. For example, the user interface may be a screen (e.g., monitor, image projected on a screen, and/or augmented/virtual reality display). In another example, the user interface may involve a speaker. Optionally, the user may interact with a system via the user interface in various ways; for example, touch (e.g., via a touch screen), typing (e.g., on a physical and/or virtual keyboard), a hand-operated control device (e.g., a mouse), and/or voice commands. Optionally, the user is given an opportunity to modify via the user interface, data related to the instantiation and presented on the user interface; for example, the user may modify default values, set according to the template, and presented on a screen that is presenting while running an instantiation of the template. Optionally, the user interface may initiate an instantiation of a test scenario template; for example, the user interface may present a first screen of the test scenario template and prompt the user to take a certain action to advance execution of the template.

In one embodiment, a user is recorded while running a certain test scenario. If it is identified that the certain test scenario is similar to a test scenario template (e.g., the certain test scenario involves similar test steps, transactions, and/or values as those involved in the template), it may be suggested to the user to run an instantiation of the test scenario template. Optionally, a suggestion to the user to run an instantiation of the template is made via a user interface.

In another embodiment, a profile of a user is utilized to suggest to the user to run a test scenario template appropriate to the user based on information included in the profile. In one example, the profile may include various information regarding the user and/or an organization to which the user belongs, such as information regarding modules, business processes, and/or transaction utilized by the user and/or organization. In another example, the profile may include runs of the user and/or users belonging to a certain organization, and/or data derived from the runs. In addition to the profile, and/or instead of it, the suggestion of a template to the user may be done according to other factors such as coverage of templates, importance of templates, ranking of templates, and/or connectivity factors of templates, as described in more detail below.

Coverage

In order to validate that certain system elements operate correctly after installation, customization, a change, and/or an upgrade is done to the system—it is often the case that many test scenarios need to be run. In order to validate the system's performance, it is desirable that the test scenarios that are run should cover many elements that may be related to, and/or affected by, the installation, customization, change, and/or upgrade. For example, the elements may include various transactions that may exhibit undesired behavior due to the certain configuration change and/or upgrade; each executed test scenario may be able to be used to test a subset of the transactions that are likely to be affected by the change, and/or update, in order to determine if unwanted system behavior occurs that involves one or more transactions. Therefore, the coverage offered by a set of test scenarios (or test scenario templates), such as which modules, business processes, and/or transactions are evaluated by running a set of test scenarios, becomes an important consideration when selecting which test scenarios to run. Ideally, it would be desirable to obtain as large coverage as possible with test scenarios, however, often restrictions stemming from limited resources for running test scenarios have also to be taken into account.

In one embodiment, coverage refers to a percent of business processes, used by an organization, that are sufficiently tested by test scenarios in relation to the total number of business processes used by an organization or a certain user. For example, if 40% of the business processes run by users of an organization are sufficiently tested by certain test scenarios, then the coverage of the certain test scenarios is 40%. In some cases in order for a module, business process, and/or transaction to be sufficiently tested, more than one aspect of the module, business process, and/or organization needs to be tested. This may involve running multiple tests in order to cover the more than one aspect. For example, different combinations of input data for the same screen need to be provided in order to test various aspects of a certain business process.

In one embodiment, a required coverage for a certain user that runs test scenarios, is received and utilized for suggesting test scenario templates for the user. For example, the required coverage may list certain transactions that need to be evaluated with test scenarios run by the user, and optionally the number of test scenarios that need to be run to evaluate at least some of the transactions. Alternatively or additionally, the required coverage may indicate what percentage of a system's transactions need to be evaluated by the test scenarios. In another example, the required coverage may indicate which business processes, screens, and/or specific fields need to be evaluated by running test scenario.

In one embodiment, achieving a required coverage is done by evaluating a large number of test scenario templates and estimating coverage achieved by individual templates and/or subsets of templates. Following the evaluation, a subset of templates that includes at least one template is suggested to the user in order to achieve the required coverage. Optionally, the suggested subset that includes at least one template is a subset with an essentially minimal number of templates and/or involves performing an essentially minimal number of test steps. It is to be noted that by an "essentially minimal" number it is meant a number close to the absolute minimal possible, for example up to 10% more than the absolute minimum. In some cases, the absolute minimal number of templates may be determined by an exhaustive evaluation of all possible subsets of templates; however, this may prove intractable if a large number of templates are involved.

In one embodiment, calculating the required coverage for a certain user is based on a usage information of a certain user. For example, by analyzing the usage information a list may be prepared of certain modules, business processes, and/or transactions the user frequently utilizes. This list can then be used to guide a search for a certain subset of test scenario templates that tests aspects of items on the list which need to be tested.

Finding a minimal sized subset of template obtaining a desired coverage need not require exhaustive search in every case. Those skilled in the art may recognize that there are structured methods for evaluating a search space of subsets of templates such as branch-and-bound approaches, or A* searches that enable finding the essentially minimal subset without necessarily evaluating all subsets of templates. In addition heuristic search methods may be used, such as simulated annealing, genetic algorithms, and/or random walks in order to quickly find subsets with a small number of templates (but not necessarily minimal). Additionally, optimization algorithms that involve constraint satisfaction may be used to efficiently find an essentially minimal subset.

In one embodiment, a goal of a search for a subset of templates that achieves a certain coverage is to find a subset of templates, which involves a minimal amount of testing time on the user's part. Achieving the required coverage for the certain user involving the shortest testing time for the user may be done by estimating time to achieve a required coverage for the certain user by many templates (e.g., in a search performed in the space of possible subsets of templates). And after evaluating the time it takes to run each of the many templates and/or subsets of templates, suggesting the certain use utilize a subset that includes at least one of the templates, that both achieves the required coverage and requires an essentially minimal time to complete. In this case, the suggested templates are likely to be templates relevant to scenarios that are expected to be used by the certain user, and are likely to be spread to approximately achieve a uniform coverage of the scenarios with the suggested templates.

In some cases, it is useful to refer to a coverage of a test scenario template with respect to a test scenario. In one embodiment, a template is said to cover a certain test scenario if it involves essentially the same test steps as the test scenario. Additionally or alternatively, coverage of a template with respects to a test scenario may be the percentage of test steps of the test scenario that are included in the template. Similarly coverage of a subset of templates with respect to a test scenario may refer to the test steps in the test scenario that are included in at least one of the templates in the subset.

Importance of a test scenario for a certain user may also be an objective that guides the suggestion of a template to the certain user. In one embodiment, test scenario templates that cover a test scenario are estimated to be important are suggested to the certain user before other templates that are estimated to be less important.

There are various ways in which importance of a test scenario may be evaluated. In one example, the importance of a certain test scenario is determined by frequency in which the certain test scenario is used relative to frequency in which other test scenarios are used. Thus, a test scenario often run by the certain user may be deemed significantly more important than a test scenario rarely run by the certain user. In another example, importance of a certain test scenario is determined by characteristics of users that run the certain test scenario, compared to characteristics of users that run other test scenarios. For instance, if a certain test scenario is run primarily by users that hold high positions in an organization's hierarchy, it is likely that the certain test scenario is more important than another test scenario that is used primarily by users on the lower rungs of the organization's hierarchy. In yet another example, importance of a certain test scenario is determined by a financial value associated with the certain test scenario compared to a financial value associated with other test scenarios. For example, a test scenario that involves retaining an unsatisfied customer may be given a high financial value for the organization compared to another transaction which involves sending customers a notice that their order is still pending.

Profile of a User

A profile of a user may include data related to the user, an organization to which the user belongs, and/or activity of the user on a software systems, such as software systems associated with the organization. Optionally, at least some of the data in a profile may be considered proprietary data. Optionally, the proprietary data may identify details regarding the user and/or an organization related to the profile, such as an organization to which the user belongs. In one example, a profile may include proprietary data about the user (e.g., age, address, languages, skills), and/or proprietary data related to a role of the user in the organization (e.g., job title, placement of user in organizational chart, and/or permissions and/or privileges of the user). In another example, the profile may include proprietary data related to the organization to which the user belongs (e.g., field of operation, name and sizes of departments, products and/or services provided by the organization, permissions and/or accounts of the organization, and/or customers and/or suppliers of the organization). In yet another example, proprietary data included in a profile of a user may be indicative of activity of the user. In this example, the activity may have been previously observed and/or recorded (e.g., by monitoring of the user). Additionally or alternatively, the activity may be predicted based on characteristics of an organization to which the user belongs, the position the user holds in the organization, and/or other attributes of the user (e.g., permissions and/or accounts of the user).

In one embodiment, a profile of a user includes data that is indicative of test scenarios relevant to the user and/or templates of test scenarios relevant to the user. For example, the profile may include attributes such as modules used by the user, transactions used by the user (e.g., identifiers of transactions and the number of times they were executed), and/or characteristics derived from activity of the user (e.g., accesses to databases, quantities of network data generated, reports generated by the user). Optionally, a profile of a user may include runs of test scenarios of the user, and/or results of a summary and/or analysis of runs of test scenarios of the user. For example, the profile may include a list of the transactions that are executed often in runs of test scenarios of the user. Optionally, a profile of a user may include information indicative of test scenario templates utilized by a user (e.g., templates which the user ran instantiations of).

A profile of a user may be used in order to suggest to the user to utilize a certain test scenario template. Optionally, the template may be selected from among one or more test scenario templates generated from clusters of runs of test scenarios. For example, given a profile that indicates that a user performs many transactions involving database updates, the system may recommend for the user a template generated from a cluster that contains runs of test scenarios that involve database updates. In another example, if the profile of a user contains samples of runs of test scenario run by the user, the system may suggest to the user to use a template generated from a cluster that contains test scenarios that are similar to a test scenario from which a run in the profile was instantiated. In yet another example, a profile includes state information regarding an organization to which a user belongs, such as the time zone and location of a certain site. This information may be used to suggest a certain template for a user testing a software system at the site. For example, a template that involves a report of a vacation of a user in advance may be relevant to an organization site located in France, but not for a site in the US (where such a practice may not be typically required).

In one embodiment, a profile of a user includes permissions of a user. For example, if a profile indicates that a user has permission to approve vacations, the user may be suggested to run a test scenario instantiated from a template that includes such a task. However, if the user does not have such a permission, then the certain template is irrelevant for the user. In another example, a profile describes a position of the user in the organization hierarchy. In this example, a first user may belong to the marketing department, and thus has permission to enter a new potential client in to the system. A second user may belong to the sales department, and thus can send an offer to a client. Thus, based on the profiles of the users, the system may suggest relevant templates for the users: to the first user a template that involves entering client data, and to the second user a template that involves making an offer to a client, and not vice versa.

In some embodiments, a profile may belong to an organization. For example, it may describe a generic user belonging to the organization. Optionally, a profile of an organization may be utilized to perform initial filtering of test scenario templates for users belonging to the organization. For example, according to a profile of an organization, the organization may not be authorized to run a test scenario instantiated from a certain template (e.g., due to lack of permission). This may make the template irrelevant for each and every user belonging to the organization. However, if the organization is authorized to run an instantiation of the test scenario template, according to the profile of the organization, then a profile of an individual user belonging to the organization may need to be checked in order to determine if the template is relevant to the individual user (e.g., to check whether the user has permission to run a test scenario instantiated from the template). In another example, a profile may indicate a method in which the organization conducts business. For instance, the profile may indicate a policy of making payments for goods. Thus, if the profile indicates that the organization always pays after receiving goods, a template that describes advanced payment for goods is not relevant for any user in that organization.

In one embodiment, a profile of a user may include usage data of an organization to which a user belongs. For example, the profile may describe which modules are relevant to organization. Based on the profile, a user will be suggested templates that are relevant to the organization. Similarly, the profile may describe actions that users belonging to the organization may have permission to perform. For example, if users of an organization are not authorized to access a certain database, a user belonging to the organization will not be provided with a template that includes an access to the certain database.

In some embodiments, a profile of a user and/or an organization may represent usage of transactions by the user and/or users belonging to the organization. Optionally, a profile that represents usage of transactions may be represented in various ways. The profile may include a list of runs of test scenarios, clusters of runs, and/or transactions utilized by the user. Optionally, the usage data may be represented as a vector in which each dimension may correspond to a certain transaction, cluster of runs, and/or template. In one example, if a user utilized a transaction, a value of the vector in a corresponding dimension is 1, otherwise it is 0. In another example, a value of a dimension in the vector that corresponds to a certain cluster of runs is set according to the number of runs in the cluster that were run by the user. Thus, the more the user used transactions with corresponding runs in the certain cluster, the higher the corresponding value in the vector.

Having a vector representation for at least some of the values in a profile makes it easier, in some embodiments, to compare between profiles (e.g., to find similar vectors representing similar profiles of users). Additionally, vector representation of profiles may make it easier to perform mathematical operations, such as vector dot-product or matrix factorization.

A profile of a user may be utilized to customize a test scenario template for the user. For example, by filtering the test scenario template in order for it to be more appropriate for the user. In one embodiment, a profile of the user may be used to determine which test steps, from among the test steps described in a test scenario template, are relevant for the user, and optionally remove test steps that are irrelevant. For example, a profile of the user may indicate that the user does not confirm shipments. A test scenario template, suggested to the user may include several test steps that culminate with a test step involving confirming shipment. In such a case, the last test step may be removed in order to make the test scenario template more appropriate for the user. In one example, a template may include values related to international shipping; however, if the profile of the user indicates that the user runs transactions that only involve domestic shipping, certain values concerning international aspects of the transactions may be removed from the template (e.g., destination country, currency conversion rates). In another example, a template that includes a transaction that is part of an employee evaluation process may include values related managerial assessment of the employee. If the profile of the user indicates that the user is not a manager, then those details may be irrelevant for the user. In this case, the user may receive a template that only includes transactions in which self assessment of the employee are performed. In another embodiment, a profile of the user may be used to determine which values utilized in a test scenario template may be appropriate for the user. Optionally, values deemed irrelevant to the user may be removed from the test scenario template suggested to the user.

Optionally, the user may be requested to provide relevant values instead of the removed irrelevant values. For example, a profile of a user may indicate that the user deals exclusively with domestic customers having domestic addresses. However, a test scenario template may include default values that correspond to foreign addresses. In such a case, the foreign addresses may be removed, and the user may be requested to provide examples of domestic addresses.

Cleaning Proprietary Data

In one embodiment, a test scenario template generated from one or more runs of test scenarios does not include proprietary data captured during the stage of monitoring users that ran the test scenarios. Optionally, the one or more runs of test scenarios belong to a cluster and the test scenario template is generated as a representative of the cluster.

In one embodiment, determination of whether certain data, which appears in a run of a test scenario and/or is obtained from processing data from the run, is proprietary data is based on the repetitiveness of the data in runs of test scenarios. For example, if a certain value appears in only a small proportion of the runs, in runs of a small number of users, and/or runs associated with a small number of organizations, the certain value may be considered proprietary. Conversely, if a certain value is the same in many runs, or in runs of at least a certain proportion and/or number of the users, and/or is associated with at least a certain proportion and/or number of organizations, that value may be considered to be non-proprietary. Optionally, a predetermined proportion is used as a threshold to determine if a certain value is proprietary or not. For example, if a number of different users which ran runs of test scenarios that included the certain value is less than the predetermined threshold, the value is considered proprietary for those users who had runs that included the value. Otherwise, it may be considered non-proprietary (since many users had the value in one of their runs). It is to be noted, that "predetermined" refers to both a fixed value known a priori (e.g., a threshold of 10 users) and/or a value derived from known logic (e.g., 10% of the users).

In one embodiment, data for which one or more of the following is true may be considered proprietary data associated with an organization and/or proprietary data belonging to the organization: the data describes an aspect of the organization and/or a user belonging to the organization; the data appears in a database of the organization; the data appears in a run of a test scenario associated with the organization and/or is derived from the run; and/or the data is generated by a software system associated with the organization. For example, any data on a server belonging to an organization may be considered proprietary data associated with the organization. In another example, any data derived from analysis of runs of test scenarios associated with an organization may be considered proprietary data of the organization. Additionally or alternatively, data for which one or more of the following is true may be considered proprietary data of user and/or proprietary data belonging to the user: the data describes an aspect of a user; the data describes an organization to which the user belongs; the data appears in a database of the user; and/or the data appears in a run of a test scenario run by the user.

It is to be noted that as used herein, a phrase like "proprietary data" may refer to proprietary data of an organization and/or proprietary data of a user. Additionally, phrases like "proprietary values" and "proprietary data" may be used interchangeably in this disclosure.

In one example, proprietary values are removed from a test scenario template generated from a certain cluster (i.e., one or more runs belonging to the certain cluster were utilized to generate the template). Optionally, the proprietary values are removed by a data cleaner module that operates on the generated template. Additionally or alternatively, removal of proprietary data may be done by other modules belonging to the system, such as a template generator, a customization module, a ranking module, and/or a user interface. Optionally, removing the proprietary values involves selecting a value from the template, and removing the selected value from the template if the selected value appears in less than a first predetermined number of runs of test scenarios in the certain cluster. Additionally or alternatively, the selected value may be removed if it appears in runs belonging to the certain cluster that are associated with less than a second predetermined number of different organizations. In this example, both the first predetermined number and the second predetermined number are greater than one. Optionally, the first predetermined number and/or the second predetermined number are proportional to the number of user with runs belonging to the certain cluster and/or the number of organizations associated with runs belonging to the certain cluster. For example, the first predetermined number may be set to be the maximum of two and 10% of the users with runs in the certain cluster.

Determining whether data is proprietary may utilize a profile of a user and/or a profile of an organization. For example, any data that appears in a profile of a user and/or an organization may be considered proprietary and thus not allowed to be included in a template. In another embodiment, the profile may indicate certain data is proprietary (e.g., by placing it a an exclusion list which prohibits utilization of the data in templates).

In one embodiment, testing whether certain data is proprietary is done by querying a database (e.g., a database that contains samples of proprietary data). Additionally or alternatively, the certain data may be submitted to a procedure that evaluates the data to determine whether the data is likely to be proprietary. For example, the procedure may perform semantic and/or syntactic analysis of the data to check whether the certain data has a certain meaning and/or contains certain patterns that indicate that it is likely to be proprietary. For example, the procedure may scan the certain data for strings like "bank account", "address", and/or "social security number".

In another embodiment, a user may provide feedback on certain data which indicates whether the certain data is proprietary. For example, the user may review values of data fields prior to running a test scenario and indicate which values the user considers proprietary. Additionally or alternatively, while a test scenario is running, the user may mark certain data as proprietary (e.g., data the user considers should not be seen by the user or other users). Optionally, the user may provide feedback the certain data via a user interface on which the user is running the test scenario.

In yet another embodiment, determining whether a certain value may be proprietary may be assisted by noting the source, location, and/or data structure that contains the certain value. For example, in certain systems, a value that appears in a checkbox on a screen is likely to be a default value of the system, and thus not likely to be proprietary. However, free text fields on screens are more likely to contain data entered by a user, and are thus likely to be proprietary. In a another example, in which the certain value appears in a drop-down menu in a screen, it might be necessary to determine from the context whether values in the drop-down menu are proprietary or not. Additionally, certain systems may be built in such a way that makes it relatively easy to determine which data is proprietary and which is not. For example, in SAP ERP meta data, which typically includes general (non-proprietary) data, is clearly marked.

In one embodiment, a value in a test scenario template that is considered proprietary is removed from the template. Optionally, the proprietary data is removed by a data cleaner module, a template generator module, a customization module, and/or another module and/or combination of modules. In one example, a value may be deleted from a template; consequently, the template may contain an indication of missing data (corresponding to the deleted value); prior to running a test scenario based on the template and/or during the run of the test scenario, the missing data needs to be provided (e.g., the user is prompted to provide it). Alternatively, a value in a test scenario template that is considered proprietary may be removed from the template by replacing it with a default or "dummy" value.

In one embodiment, proprietary data is not included in a template. For example, a module generating a template and/or a module customizing a template, check whether certain values are proprietary (e.g., by checking whether a certain flag related to the certain values is raised, or by submitting the certain values to a procedure for evaluation). If the certain values are deemed to be proprietary, they are not included in the template.

Proprietary data may be removed from runs of test scenarios at different stages. In one embodiment, the proprietary data is removed from runs of test scenarios as the runs are recorded and/or identified. For example, a "scrubbed" version of runs, which does not contain certain proprietary data, may be the data that is provided to components of the system (e.g., a clustering module and/or template generator). Optionally, determining what proprietary data is may relate to general statistics (e.g., utilization of certain elements and/or values by a certain proportion of organizations).

In another embodiment, proprietary data is removed from runs after clustering of the runs is performed. Optionally, determining what data in the runs should be considered proprietary utilizes the fact that after clustering, clusters contain similar runs. In one example, the fact that runs belong to clusters may enable the identification of certain values that are shared by many runs (which may indicate that the certain values are not proprietary), or shared by a few runs (which may indicate that the certain values are proprietary).

In some embodiments, test scenario templates are generated from one or more runs of test scenarios belonging to a certain cluster. Optionally, the templates are generated in such a way that they are not likely to include data that may be easily traced to specific runs in the certain cluster, users that ran runs belonging to the certain cluster, and/or organizations associated with runs belonging to the certain cluster. In these embodiments, generating a template may involve selecting a value from a run of a test scenario belonging to the certain cluster, checking whether the value appears in at least a first predetermined number of the runs in the certain cluster; checking whether the value appears in runs in the certain cluster that are associated with at least a second predetermined number of different organizations; and if both conditions are positive, enabling the test scenario template to utilize the selected value. Optionally, if at least one of the conditions is negative the test scenario template is not allowed to utilize the selected value.

In one embodiment, removing proprietary data from a test scenario template generated from one or more runs of test scenarios involves removing most output fields from the runs. Consequently, most of the information generated in the runs may be removed. In one example, most of the information output in the runs is considered proprietary, and is therefore removed. Optionally, as a result of removing most of the output fields, the test scenario template does not include expected values for most test steps. Optionally, running an instantiation of the test scenario template may require a user to provide values in most of the test steps.

Customizing a Test Scenario Template

Test scenario templates generated from runs of test scenarios of users belonging to different organizations may not be ideal for a certain user from a certain organization. For example, the templates may include information such as values that do not suite the certain user and/or the certain organization, and/or include certain test steps that are irrelevant for the certain user and/or the certain organization. It therefore may be beneficial to customize test scenario templates for a certain user and/or a certain organization. Optionally, customizing a test scenario template may be done as part of generating the template (e.g., by the template generator), by another module such as a customization module, or a combination of modules.

In some embodiments, customizing a test scenario template involves adding to the test scenario template one or more values that are relevant to a certain user and/or a certain organization. Optionally, the one or more values that are added replace existing values in the template that may be less appropriate for the certain user and/or the certain organization. Optionally, at least some of the values added to the template by the customizing replace proprietary data that has been removed from the template (e.g., by a data cleaner module).

In some embodiments, customizing a test scenario template is done using proprietary data related to a certain user and/or a certain organization. The proprietary data may be directly related to the certain user and/or the certain organization, such as internal organizational data of the certain user and/or the certain organization, and/or data obtained by monitoring the certain user and/or users belonging to the certain organization. Additionally or alternatively, the proprietary data may be of a different user and/or different organization, and based on similarity to the certain user and/or certain organization the proprietary data is assumed to be useful for customizing the template.

Proprietary data used to customize a test scenario template may have various sources. In one embodiment, proprietary data relevant to a certain user, for whom a test scenario template is customized, is obtained by providing the test scenario template to a different user, prompting the different user to provide a missing value, and recording an input value provided by the different user. Alternatively, the same process may be performed with the certain user, i.e., the test scenario template is provided to the certain user, the certain user is prompted to provide a value, and the value provided by the certain user.

In another embodiment, the proprietary data relevant to the certain user for whom the test scenario template is customized is obtained by guiding a user to provide the proprietary data while semiautomatically executing an instantiation of the test scenario template. Optionally, the user providing the proprietary data is the certain user. Providing proprietary data via semiautomatic execution may involve filling a value into a field missing a value in an instantiation of the test scenario template. This may be done by selecting a value from a database related to the certain user and testing whether the selected value is congruous with the field. If the selected value is congruous with the field, filling the field with the selected value. Otherwise, prompting the first user to provide a value for the field missing a value. Optionally, selecting the value utilizes a heuristics-based algorithm that is run on data from multiple organizations. For example, the selection of the value may be based in part on determining how often the value is used by other organizations. Additionally or alternatively, providing proprietary data via semiautomatic execution may involve filling a value into a field missing a value in an instantiation of the test scenario template by identifying users similar to the certain user. Following that, selecting a value from runs of test scenarios of the users similar to the certain user and then testing whether the selected value is congruous with the field. If the selected value is congruous with the field, the field may be filled with the selected value. Otherwise, the certain user may be prompted to provide a value for the field missing a value.

In one embodiment, proprietary data relevant to a certain user, for whom a test scenario template is customized, is obtained by marking locations of values that were removed from the test scenario template, and directing attention of a user to provide data appropriate for the marked locations. Optionally, the user is the certain user for whom the template is customized. Optionally, the values removed from the test scenario template were removed by a data cleaner module.

One source of proprietary data useful for customizing a test scenario template for a certain user may be a profile of the certain user. For example, such a profile may be provided to a module that performs customization of the template. Data in the profile, such as proprietary information related to the user and/or the organization may be inserted into the template. For example, a profile of the certain user may include the user's name, address, job title, and/or employee number; these values may be inserted in their appropriate positions in a customized template in order to save the certain user the time and effort of inserting them when running an instantiation of the template. In another example, the profile of the certain user may include a list of customers the user works with, parts the user frequently orders, and/or contact information of clients the user frequently interacts with. These values may be automatically inserted into a template in order to customize it and make it more relevant to the certain user.

In one embodiment, a profile of a user that is used to customize a test scenario template is a profile of a generic user of an organization. In this case, customizing the template may utilize information that does not identify a specific user. For example, to customize a template the system may use activity data from the profile such as a list of modules that are frequently run, but not use data such as an employee name of a real employee.

Another source of proprietary data useful for customizing a test scenario template for a certain user may be a data generator related to the certain user and/or a certain organization to which the certain user belongs. For example, the data generator may be a program that extracts values from a database related to the certain organization. The database may hold "real world" information such as actual customer orders, which can be used to generate tests that are more relevant.

In one embodiment, customizing a test scenario template for a first user utilizes a customization module and involves obtaining proprietary data relevant to the first user and substituting a non-empty subset of proprietary data removed from the template with the obtained data. Optionally, the obtained data undergoes processing prior to being entered into the template.

In one example, the proprietary data relevant to the first user is obtained from a previously monitored run of test scenario associated with the first user; for instance, the run of the test scenario may have been run by the first user, run by a user associated to an organization to which the first user belongs, and/or a user with a similar organizational role as the first user (e.g., both users are sales managers).

In another example, the proprietary data relevant to the first user is obtained from parsing a manual test scenario associated with the first user in order to obtain a value associated with the first user. For example, the manual test scenario may be a script for running a test that is intended to be used by the first user, a user associated to an organization to which the first user belongs, and/or a user with a similar organizational role as the first user. After obtaining the value associated with the first user, a non-empty subset of the removed proprietary data from the template is substituted with the obtained value.

In yet another example, the proprietary data relevant to the first user is obtained from analyzing a database of the software system associated with the first user to obtain a value associated with the first user. The database may include data on and/or be accessed by the first user, a user associated to an organization to which the first user belongs, and/or a user with a similar organizational role as the first user. After obtaining the value associated with the first user, a non-empty subset of the removed proprietary data from the template is substituted with the obtained value.

In one embodiment, the customization module is also configured to: provide the customized test scenario template to a second user, prompt the second user to provide a missing value, and record an input value provided by the second user. Optionally, the first user and the second user are the same user.

Values used for customization of templates may be obtained, in some embodiments, by exploiting wisdom of the crowd. This "wisdom" may be gained by analyzing runs of users from different organization in order to find certain patterns and common values. In one example, many organizations have a dummy customer entry for testing; for example, a customer named "test". Thus, entering "test" as a user is likely to allow a test scenario to run, so a customization module may try using the customer "test" in a template being customized. In another example, SAP catalog numbers usually start from 1000, and 1000 usually describes a catalog number for tests and not a real number. Thus, when customizing a template, if a catalog number is needed, the value 1000 may be tried. In both of these examples, the knowledge of which default values may be gained by examining runs of users from different organizations. This allows a customization module to discover from the crowd certain values that may not be apparent to whomever is customizing the template.

In embodiments described in this disclosure, after generating a test scenario template from one or more runs of test scenarios (e.g., using a template generator), the template might undergo further processing such as removal of proprietary data, customization, ranking, and/or the template may be suggested to the user. Optionally, the one or more runs of test scenarios belong to a certain cluster of similar runs of test scenarios. FIG. 17A to FIG. 17G illustrate some, but not all, combinations of system modules that may be used in embodiments described in this disclosure to process the template and/or suggest the template to a user.

Figure 17A:
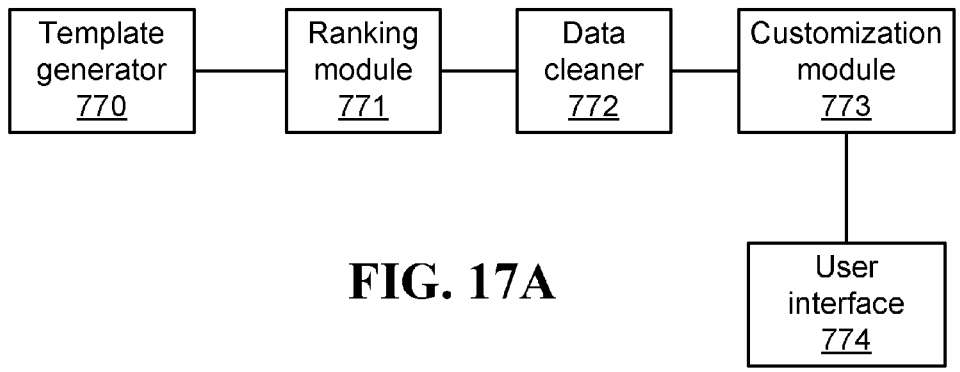
FIG. 17A illustrates a combination of system modules that may be used in embodiments described in this disclosure.

FIG. 17A illustrates a combination of system modules that may be used in embodiments in which a template generator 770 generates a test scenario template from one or more runs of test scenarios. The template is provided to a ranking module 771 that may rank the template, for example, by assigning it a score proportional to its relevancy to a certain user. Optionally, the ranking module 771 receives a profile of a certain user and/or a certain organization and utilizes data from the profile, in order to rank the template. Following that, a data cleaner 772 receives the template and may remove proprietary data from the template. Optionally, the data cleaner 772 receives a profile related to a certain user and/or a certain organization, and utilizes the profile to remove certain proprietary data from the template. After removing proprietary data from the template, the template from which proprietary was removed is provided to a customization module 773 that customizes the template by adding certain data to the template. Optionally, the customization module 773 receives a profile of a certain user and/or a certain organization and adds data from the profile, which relevant to the certain user and/or organization, to the template. The customized template from which proprietary data was removed is then provided to a user interface 774. Optionally, the user interface 774 presents to a user a suggestion to run an instantiation of the customized template from which proprietary data was first removed.

It is to be noted that in this disclosure, though modules may be illustrated in figures as separate elements, in some embodiments, they may be implemented as a single element that performs the functionality of modules. For example, the software module that implements the template generator 770 may also perform the tasks of the data cleaner 772. In another example, the customization module 773 and the data cleaner 772 are realized by the same software programs.

Figure 17B:
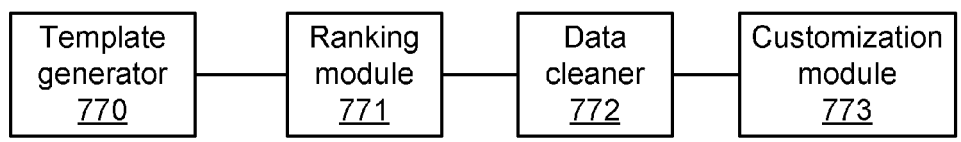
FIG. 17B illustrates a combination of system modules that may be used in embodiments described in this disclosure.

In other embodiments, after being processed by various modules, a template generated by the template generator need not be provided to a user interface. For example, it may be stored in the system for further use. FIG. 17B illustrates a similar portion of a system to the system illustrated in FIG. 17A, however in this system after being subjected to ranking, removal of proprietary data, and customization, a template is not presented to a user via a user interface.

Figure 17C:
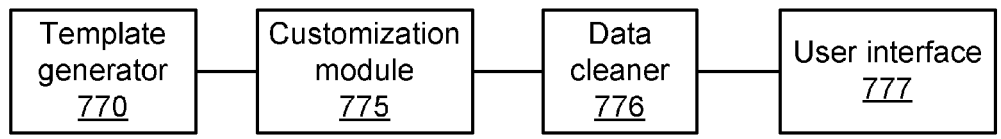
FIG. 17C illustrates a combination of system modules that may be used in embodiments described in this disclosure.
Figure 17D:
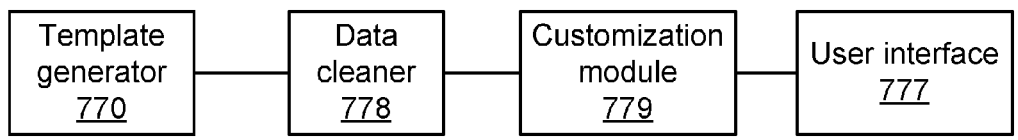
FIG. 17D illustrates a combination of system modules that may be used in embodiments described in this disclosure.

The order in which a template may undergo processing by system modules may differ between embodiments. For example, FIG. 17C illustrates a combination of system modules which includes the template generator 770 which provides a template for customization by a customization module 775. Following the customization, a data cleaner 776 removes proprietary data from the template. The template is then provided to a user interface 777, for example, in order to be suggested to a user. FIG. 17D illustrates a similar system, however in it a template generated by the template generator 770 is first provided to a data cleaner 778. After removing proprietary data from the template, the template is provided to a customization module 779. The customized template may then be presented to a user via the user interface 777.

Figure 17E:
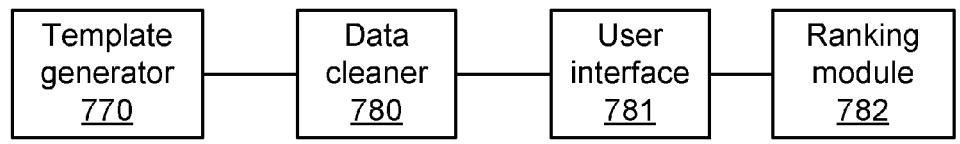
FIG. 17E illustrates a combination of system modules that may be used in embodiments described in this disclosure.
Figure 17F:
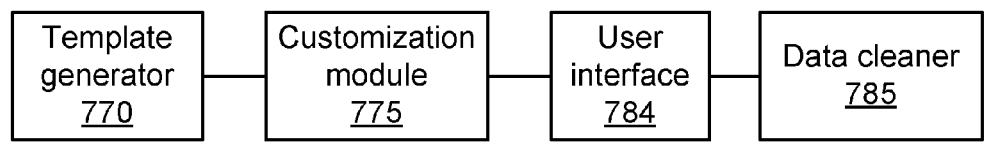
FIG. 17F illustrates a combination of system modules that may be used in embodiments described in this disclosure.

In some embodiments, a user interface is not necessarily used to suggest templates to a user; it may be utilized by other system modules to perform their task. FIG. 17E illustrates a combination of system modules that may be utilized in embodiments, in which a ranking module 782 and a data cleaner 780 interact with a user interface 781. For example, the data cleaner 780 may present a template generated by the template generator 770 to a user on the user interface 781, in order for the user to mark and/or approve certain proprietary data the data cleaner found in the template. Additionally, the ranking module 782 may present a ranking of the template in order for the user to verify the ranking and/or edit it. Optionally, the user may then determine what is to be done with the template (e.g., should the user run it, save it for later, and/or discard it). FIG. 17F illustrates a combination of system modules that may be utilized in embodiments, in which a customization module 775 utilizes a user interface to perform customization of a template. For example, data that was added to a template generated by the template generator 770 is presented to a user on a user interface 784 for approval and/or editing. Following that, the template may be subjected to removal of proprietary data by a data cleaner 785. For example, the proprietary data may be added by the user via the user interface 784.

Figure 17G:
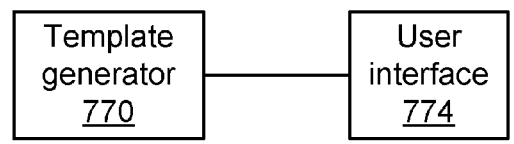
FIG. 17G illustrates a combination of system modules that may be used in embodiments described in this disclosure.

In some embodiments, a template that is generated by a template generator does not undergo additional processing by system modules. For example, as illustrated in FIG. 17G, after being generated by the template generator 770, the template may be sent to the user interface 774 (e.g., to be suggested to a user).

While some of the above embodiments may be described in the general context of program components that execute in conjunction with an application program that runs on an operating system on a computer, which may be a personal computer, those skilled in the art will recognize that aspects may also be implemented in combination with other program components. Program components may include routines, programs, modules, data structures, and other types of structures that perform particular tasks or implement particular abstract data types. Moreover, the embodiments may be practiced with other computer system configurations, such as: cloud computing, a client-server model, grid computing, peer-to-peer, hand-held devices, multiprocessor systems, microprocessor-based systems, programmable consumer electronics, minicomputers, and/or mainframe computers. The embodiments may also be practiced in a distributed computing environment where tasks are performed by remote processing devices that are linked through a communication network. In a distributed computing environment, program components may be located in both local and remote computing and/or storage devices. Some of the embodiments may also be practiced in the form of a service, such as infrastructure as a service (IaaS), platform as a service (PaaS), software as a service (SaaS), and/or network as a service (NaaS).

Embodiments may be implemented as a computer implemented method, a computer system, and/or as a non-transitory computer-readable medium. The non-transitory computer-readable medium comprises program code which provides, or participates in providing, instructions to a processor. The non-transitory computer-readable medium may be implemented, for example, via one or more of a volatile computer memory, a non-volatile memory, a hard drive, a flash drive, a magnetic data storage, an optical data storage, and/or any other type of a tangible computer memory to be invented that is not transitory signals per se. The program code may be updated and/or downloaded to the non-transitory computer-readable medium via a communication network such as the Internet.

Herein, a predetermined value, such as a predetermined threshold, may be a fixed value and/or a value determined any time before performing a calculation that compares a certain value with the predetermined value. A value may also be considered to be a predetermined value when the logic, used to determine whether a threshold that utilizes the value is reached, is known before start of performing computations to determine whether the threshold is reached.

In this description, references to "one embodiment" mean that the feature being referred to may be included in at least one embodiment of the invention. Moreover, separate references to "one embodiment" or "some embodiments" in this description do not necessarily refer to the same embodiment. Additionally, references to "one embodiment" and "another embodiment" may not necessarily refer to different embodiments, but may be terms used, at times, to illustrate different aspects of an embodiment.

The embodiments of the invention may include any variety of combinations and/or integrations of the features of the embodiments described herein. Although some embodiments may depict serial operations, the embodiments may perform certain operations in parallel and/or in different orders from those depicted. Moreover, the use of repeated reference numerals and/or letters in the text and/or drawings is for the purpose of simplicity and clarity and does not in itself dictate a relationship between the various embodiments and/or configurations discussed. The embodiments are not limited in their applications to the details of the order or sequence of steps of operation of methods, or to details of implementation of devices, set in the description, drawings, or examples. Moreover, individual blocks illustrated in the figures may be functional in nature and therefore may not necessarily correspond to discrete hardware elements.

While the methods disclosed herein have been described and shown with reference to particular steps performed in a particular order, it is understood that these steps may be combined, sub-divided, and/or reordered to form an equivalent method without departing from the teachings of the embodiments. Accordingly, unless specifically indicated herein, the order and grouping of the steps is not a limitation of the embodiments. Furthermore, methods and mechanisms of the embodiments will sometimes be described in singular form for clarity. However, some embodiments may include multiple iterations of a method or multiple instantiations of a mechanism unless noted otherwise. For example, when a processor is disclosed in one embodiment, the scope of the embodiment is intended to also cover the use of multiple processors. Certain features of the embodiments, which may have been, for clarity, described in the context of separate embodiments, may also be provided in various combinations in a single embodiment. Conversely, various features of the embodiments, which may have been, for brevity, described in the context of a single embodiment, may also be provided separately or in any suitable sub-combination. Embodiments described in conjunction with specific examples are presented by way of example, and not limitation. Moreover, it is evident that many alternatives, modifications, and variations will be apparent to those skilled in the art. It is to be understood that other embodiments may be utilized and structural changes may be made without departing from the scope of the embodiments. Accordingly, this disclosure is intended to embrace all such alternatives, modifications, and variations that fall within the spirit and scope of the appended claims and their equivalents.

What is claimed is:

1. A computer system having a processor, the system configured to generate a test scenario template from a cluster of similar partial runs of test scenarios, the system comprising:
    a test identifier configured to identify runs of test scenarios run by users on software systems that belong to different organizations; wherein each run of a test scenario describes test steps;
    a subset extractor configured to: receive a run of a test scenario, and to generate from the received run a partial run of the test scenario by extracting from the received run data pertaining to a proper subset of the test steps described in the received run;
    a clustering module configured receive partial runs of test scenarios generated from the runs of the test scenarios and to cluster the partial runs into clusters of similar partial runs;
    a cluster selector configured to receive a profile of a first user and, based on the profile, to select from the clusters a certain cluster suitable for the first user; wherein the certain cluster comprises a first partial run of a first test scenario that is associated with a first organization belonging to the different organizations, and a second partial run of a second test scenario that is associated with a second organization belonging to the different organizations; wherein the first organization has a different composition of shareholders than the second organization; and
    a template generator configured to generate a test scenario template based on the first and second partial runs.

2. The computer system of claim 1, further comprising a monitoring module configured to monitor activity of the users on software systems belonging to the different organizations and to provide data obtained from monitoring the activity of the users to the test identifier; and wherein the proper subset includes two to four test steps.

3. The computer system of claim 1, wherein each run of a test scenario comprises a sequence of test steps and the proper subset of the test steps in the run comprises a subsequence of the sequence of the test steps in the run.

4. The computer system of claim 1, wherein the certain cluster suitable for the first user comprises partial runs describing at least one test step that is indicated in the profile as being frequently described in runs of test scenarios of the first user.

5. The computer system of claim 1, wherein the certain cluster suitable for the first user comprises partial runs describing a frequently described subset of test steps, and the profile indicates that at least one test step belonging to the subset is utilized by the first user.

6. The computer system of claim 5, wherein the frequently described subset of test steps comprises test steps that are described in partial runs associated with at least a predetermined number (greater than one) of different organizations.

7. The computer system of claim 1, wherein the clustering module is configured to process one or more of the following logged activities: a list of users who ran the test scenarios, an analysis of access to a database, messages returned from executed transactions, values returned by fields, and procedures utilized by a test scenario.

8. A computer implemented method for generating a test scenario template from a cluster of similar partial runs of test scenarios, comprising:
    identifying runs of test scenarios run by users on software systems that belong to different organizations; wherein each run of a test scenario describes test steps;
    generating partial runs of the test scenarios by extracting from each run of a test scenario data pertaining to a proper subset of the test steps described in the run;
    clustering the partial runs of the test scenarios into clusters of similar partial runs;
    receiving a profile of a first user;
    selecting, based on the profile, from among the clusters a certain cluster suitable for the first user; wherein the certain cluster comprises a first partial run of a first test scenario that is associated with a first organization belonging to the different organizations, and a second partial run of a second test scenario that is associated with a second organization belonging to the different organizations; wherein the first organization has a different composition of shareholders than the second organization; and
    generating a test scenario template based on the first and second partial runs.

9. The computer implemented method of claim 8, wherein each run of a test scenario comprises a sequence of test steps and the proper subset of the test steps in the run comprises a subsequence of the sequence of the test steps in the run.

10. The computer implemented method of claim 8, wherein the certain cluster suitable for the first user comprises partial runs describing a frequently described subset of test steps, and the profile indicates that at least one test step belonging to the subset is utilized by the first user.

11. The computer implemented method of claim 10, wherein the frequently described subset of test steps comprises test steps that are described in at least a predetermined number (greater than one) of the partial runs.

12. The computer implemented method of claim 10, wherein the frequently described subset of test steps comprises test steps that are described in partial runs associated with at least a predetermined number (greater than one) of different organizations.

13. The computer implemented method of claim 8, further comprising generating from the run at least two partial runs, each generated from a different proper subset of test steps.

14. The computer implemented method of claim 8, wherein the clustering involves processing one or more of the following logged activities: a list of users who ran the test scenarios, an analysis of access to a database, messages returned from executed transactions, values returned by fields, and procedures utilized by a test scenario.

15. The computer implemented method of claim 8, wherein similar partial runs of test scenarios are characterized by having at least one of: essentially same fields, essentially same field values, similar combinations of fields, similar combinations of field values, similar execution of transactions, similar user interactions, similar requests, similar calls to procedures, similar executions.

16. The computer implemented method of claim 8, wherein the clustering of the partial runs of the test scenarios to clusters comprising similar partial runs of test scenarios is based on counting number of similar fields used in screens corresponding to the runs; wherein the more similar fields, the more similar the runs of the test scenarios are considered to be.

17. The computer implemented method of claim 8, wherein the clustering of the partial runs of test scenarios to clusters comprising similar partial runs of test scenarios is based on similarity between order of displaying similar fields in screens corresponding to the runs; wherein the closer the orders, the more similar the runs are considered to be.

18. The computer implemented method of claim 8, wherein the clustering of the partial runs of test scenarios to clusters comprising similar partial runs of test scenarios is based on similarity between executed procedures associated with the test scenarios.

19. A non-transitory computer-readable medium for use in a computer to generate a test scenario template from a cluster of similar partial runs of test scenarios; the computer comprises a processor, and the non-transitory computer-readable medium comprising:
  program code for identifying runs of test scenarios run by users on software systems that belong to different organizations; wherein each run of a test scenario describes test steps;
  program code for generating partial runs of the test scenarios by extracting from each run of a test scenario data pertaining to a proper subset of the test steps described in the run;
  program code for clustering the partial runs of the test scenarios into clusters of similar partial runs;
  program code for receiving a profile of a first user;
  program code for selecting, based on the profile, from among the clusters a certain cluster suitable for the first user; wherein the certain cluster comprises a first partial run of a first test scenario that is associated with a first organization belonging to the different organizations, and a second partial run of a second test scenario that is associated with a second organization belonging to the different organizations; wherein the first organization has a different composition of shareholders than the second organization; and
  program code for generating a test scenario template based on the first and second partial runs.

20. The non-transitory computer-readable medium of claim 19, further comprising program code for suggesting to the first user to run an instantiation of the test scenario template.

* * * * *